(12) United States Patent
Hawks et al.

(10) Patent No.: US 12,037,291 B2
(45) Date of Patent: Jul. 16, 2024

(54) LEACHED DIAMOND ELEMENTS AND LEACHING SYSTEMS, METHODS AND ASSEMBLIES FOR PROCESSING DIAMOND ELEMENTS

(71) Applicant: US Synthetic Corporation, Orem, UT (US)

(72) Inventors: Joshua Adam Hawks, Saratoga Springs, UT (US); Ryan LeRoy Woodland, Eagle Mountain, UT (US); Jason Keith Wiggins, Draper, UT (US); David Paul Miess, Highland, UT (US); Mark Pehrson Chapman, Provo, UT (US); Trevor Allen Olsen, Pleasant Grove, UT (US); Trent Neil Butcher, Sandy, UT (US); Michael James Gleason, Orem, UT (US); Matthew Sinclair Brown, Provo, UT (US); Julie Ann Kidd, North Ogden, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 18/126,968

(22) Filed: Mar. 27, 2023

(65) Prior Publication Data
US 2023/0250026 A1  Aug. 10, 2023

Related U.S. Application Data

(60) Continuation of application No. 17/061,419, filed on Oct. 1, 2020, now Pat. No. 11,618,718, which is a
(Continued)

(51) Int. Cl.
*C04B 35/52* (2006.01)
*C04B 35/622* (2006.01)
(Continued)

(52) U.S. Cl.
CPC ............ *C04B 35/52* (2013.01); *C04B 35/622* (2013.01); *E21B 10/567* (2013.01); *F16C 33/043* (2013.01)

(58) Field of Classification Search
CPC ..... C04B 35/52; C04B 35/622; E21B 10/567; F16C 33/043
See application file for complete search history.

(56) References Cited

U.S. PATENT DOCUMENTS 3,136,615 A   6/1964  Bovenkerk
3,141,746 A   7/1964  De Lai
(Continued)

FOREIGN PATENT DOCUMENTS

EP   0196777 A1   10/1986
EP   0300699 A2   1/1989
(Continued)

OTHER PUBLICATIONS

Hong, S. et al.; "Dissolution Behavior of Fine Particles of Diamond Under High Pressure Sintering Conditions;" Journal of Material Science Letters 10; pp. 164-166; 1991.
(Continued)

*Primary Examiner* — Alicia J Weydemeyer
*Assistant Examiner* — Laura B Figg
(74) *Attorney, Agent, or Firm* — BKRIP LLC

(57) ABSTRACT

Method of processing a polycrystalline diamond element may include laser ablating at least a portion of a polycrystalline diamond element to form a laser-shaped surface and exposing at least a portion of the laser-shaped surface to a leaching solution to define a leached polycrystalline diamond volume and an unleached polycrystalline diamond volume.

20 Claims, 26 Drawing Sheets

Related U.S. Application Data division of application No. 14/178,251, filed on Feb. 11, 2014, now Pat. No. 10,807,913.

(51) Int. Cl.
*E21B 10/567* (2006.01)
*F16C 33/04* (2006.01)

(56) References Cited

U.S. PATENT DOCUMENTS

| | | |
|---|---|---|
| 3,233,988 A | 2/1966 | Wentorf |
| 3,745,623 A | 7/1973 | Wentorf |
| 4,108,614 A | 8/1978 | Mitchell |
| 4,151,686 A | 5/1979 | Lee |
| 4,224,380 A | 9/1980 | Bovenkerk |
| 4,255,165 A | 3/1981 | Dennis |
| 4,268,276 A | 5/1981 | Bovenkerk |
| 4,288,248 A | 9/1981 | Bovenkerk |
| 4,303,442 A | 12/1981 | Hara |
| 4,311,490 A | 1/1982 | Bovenkerk |
| 4,373,593 A | 2/1983 | Phaal |
| 4,387,287 A | 6/1983 | Marazzi |
| 4,410,054 A | 10/1983 | Nagel |
| 4,412,980 A | 11/1983 | Tsuji |
| 4,468,138 A | 8/1984 | Nagel |
| 4,481,016 A | 11/1984 | Campbell |
| 4,486,286 A | 12/1984 | Lewin |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal |
| 4,556,403 A | 12/1985 | Almond |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall |
| 4,605,343 A | 8/1986 | Hibbs, Jr. |
| 4,606,738 A | 8/1986 | Hayden |
| 4,621,031 A | 11/1986 | Scruggs |
| 4,636,253 A | 1/1987 | Nakai |
| 4,645,977 A | 2/1987 | Kurokawa |
| 4,662,348 A | 5/1987 | Hall |
| 4,664,705 A | 5/1987 | Horton |
| 4,670,025 A | 6/1987 | Pipkin |
| 4,707,384 A | 11/1987 | Schachner |
| 4,726,718 A | 2/1988 | Meskin |
| 4,731,296 A | 3/1988 | Kikuchi |
| 4,738,322 A | 4/1988 | Hall |
| 4,766,040 A | 8/1988 | Hillert |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson |
| 4,802,539 A | 2/1989 | Hall |
| 4,807,402 A | 2/1989 | Rai |
| 4,811,801 A | 3/1989 | Salesky |
| 4,828,582 A | 5/1989 | Frushour |
| 4,844,185 A | 7/1989 | Newton, Jr. |
| 4,854,405 A | 8/1989 | Stroud |
| 4,861,350 A | 8/1989 | Phaal |
| 4,871,377 A | 10/1989 | Frushour |
| 4,899,922 A | 2/1990 | Slutz |
| 4,913,247 A | 4/1990 | Jones |
| 4,919,220 A | 4/1990 | Fuller |
| 4,940,180 A | 7/1990 | Martell |
| 4,943,488 A | 7/1990 | Sung |
| 4,944,772 A | 7/1990 | Cho |
| 4,976,324 A | 12/1990 | Tibbitts |
| 4,997,049 A | 3/1991 | Tank |
| 5,011,514 A | 4/1991 | Cho |
| 5,016,718 A | 5/1991 | Tandberg |
| 5,027,912 A | 7/1991 | Juergens |
| 5,030,276 A | 7/1991 | Sung |
| 5,092,687 A | 3/1992 | Hall |
| 5,096,465 A | 3/1992 | Chen |
| 5,116,568 A | 5/1992 | Sung |
| 5,120,327 A | 6/1992 | Dennis |
| 5,127,923 A | 7/1992 | Bunting |
| 5,135,061 A | 8/1992 | Newton, Jr. |
| 5,154,245 A | 10/1992 | Waldenstrom |
| 5,176,720 A | 1/1993 | Martell |
| 5,186,725 A | 2/1993 | Martell |
| 5,199,832 A | 4/1993 | Meskin |
| 5,205,684 A | 4/1993 | Meskin |
| 5,213,248 A | 5/1993 | Horton |
| 5,238,074 A | 8/1993 | Tibbitts |
| 5,264,283 A | 11/1993 | Waldenstrom |
| 5,337,844 A | 8/1994 | Tibbitts |
| 5,355,969 A | 10/1994 | Hardy |
| 5,364,192 A | 11/1994 | Damm |
| 5,368,398 A | 11/1994 | Damm |
| 5,370,195 A | 12/1994 | Keshavan |
| 5,379,853 A | 1/1995 | Lockwood |
| 5,439,492 A | 8/1995 | Anthony |
| 5,447,208 A | 9/1995 | Lund |
| 5,460,233 A | 10/1995 | Meany |
| 5,464,068 A | 11/1995 | Najafi-Sani |
| 5,468,268 A | 11/1995 | Tank |
| 5,480,233 A | 1/1996 | Cunningham |
| 5,496,638 A | 3/1996 | Waldenstro/ m |
| 5,496,639 A | 3/1996 | Connell |
| 5,505,748 A | 4/1996 | Tank |
| 5,510,193 A | 4/1996 | Cerutti |
| 5,523,121 A | 6/1996 | Anthony |
| 5,524,719 A | 6/1996 | Dennis |
| 5,544,713 A | 8/1996 | Dennis |
| 5,560,716 A | 10/1996 | Tank |
| 5,607,024 A | 3/1997 | Keith |
| 5,620,302 A | 4/1997 | Garrison |
| 5,620,382 A | 4/1997 | Cho |
| 5,624,068 A | 4/1997 | Waldenstrom |
| 5,645,617 A | 7/1997 | Frushour |
| 5,653,300 A | 8/1997 | Lund |
| 5,667,028 A | 9/1997 | Truax |
| 5,718,948 A | 2/1998 | Ederyd |
| 5,722,497 A | 3/1998 | Gum |
| 5,722,499 A | 3/1998 | Nguyen |
| 5,759,216 A | 6/1998 | Kanada |
| 5,776,615 A | 7/1998 | Wong |
| 5,833,021 A | 11/1998 | Mensa-Wilmot |
| 5,875,862 A | 3/1999 | Jurewicz |
| 5,897,942 A | 4/1999 | Karner |
| 5,944,129 A | 8/1999 | Jensen |
| 5,954,147 A | 9/1999 | Overstreet |
| 5,967,250 A | 10/1999 | Lund |
| 5,979,578 A | 11/1999 | Packer |
| 6,009,963 A | 1/2000 | Chaves |
| 6,063,333 A | 5/2000 | Dennis |
| 6,123,612 A | 9/2000 | Goers |
| 6,126,741 A | 10/2000 | Jones |
| 6,145,608 A | 11/2000 | Lund |
| 6,193,001 B1 | 2/2001 | Eyre |
| 6,234,261 B1 | 5/2001 | Evans |
| 6,248,447 B1 | 6/2001 | Griffin |
| 6,269,894 B1 | 8/2001 | Griffin |
| 6,290,726 B1 | 9/2001 | Pope |
| 6,315,065 B1 | 11/2001 | Yong |
| 6,332,503 B1 | 12/2001 | Pessier |
| 6,344,149 B1 | 2/2002 | Oles |
| 6,367,568 B2 | 4/2002 | Steinke |
| 6,410,085 B1 | 6/2002 | Griffin |
| 6,435,058 B1 | 8/2002 | Matthias |
| 6,481,511 B2 | 11/2002 | Matthias |
| 6,528,159 B1 | 3/2003 | Kanada |
| 6,544,308 B2 | 4/2003 | Griffin |
| 6,550,556 B2 | 4/2003 | Middlemiss |
| 6,562,462 B2 | 5/2003 | Griffin |
| 6,585,064 B2 | 7/2003 | Griffin |
| 6,589,640 B2 | 7/2003 | Griffin |
| 6,592,985 B2 | 7/2003 | Griffin |
| 6,601,662 B2 | 8/2003 | Matthias |
| 6,739,214 B2 | 5/2004 | Griffin |
| 6,749,033 B2 | 6/2004 | Griffin |

(56) References Cited

U.S. PATENT DOCUMENTS

| | | |
|---|---|---|
| 6,793,681 B1 | 9/2004 | Pope |
| 6,797,326 B2 | 9/2004 | Griffin |
| 6,861,098 B2 | 3/2005 | Griffin |
| 6,878,447 B2 | 4/2005 | Griffin |
| 6,892,836 B1 | 5/2005 | Eyre |
| 6,904,984 B1 | 6/2005 | Estes |
| 6,935,444 B2 | 8/2005 | Lund |
| 6,962,214 B2 | 11/2005 | Hughes |
| 6,991,049 B2 | 1/2006 | Eyre |
| 7,350,601 B2 | 4/2008 | Belnap |
| 7,377,341 B2 | 5/2008 | Middlemiss |
| 7,493,973 B2 | 2/2009 | Keshavan |
| 7,506,698 B2 | 3/2009 | Eyre |
| 7,517,589 B2 | 4/2009 | Eyre |
| 7,568,534 B2 | 8/2009 | Griffin |
| 7,608,333 B2 | 10/2009 | Eyre |
| 7,730,977 B2 | 6/2010 | Achilles |
| 7,740,673 B2 | 6/2010 | Eyre |
| 7,754,333 B2 | 7/2010 | Eyre |
| 7,757,785 B2 | 7/2010 | Zhang |
| 7,757,791 B2 | 7/2010 | Belnap |
| 7,866,418 B2 | 1/2011 | Bertagnolli |
| 8,020,642 B2 | 9/2011 | Lancaster |
| 8,147,572 B2 | 4/2012 | Eyre |
| 8,172,012 B2 | 5/2012 | Achilles |
| 8,297,382 B2 | 10/2012 | Bertagnolli |
| 8,309,050 B2 | 11/2012 | Keshavan |
| 8,323,367 B1 | 12/2012 | Bertagnolli |
| 8,328,891 B2 | 12/2012 | Zhang |
| 8,469,121 B2 | 6/2013 | Lancaster |
| 8,596,387 B1 | 12/2013 | Sani |
| 2005/0115744 A1 | 6/2005 | Griffin |
| 2005/0129950 A1 | 6/2005 | Griffin |
| 2005/0139397 A1 | 6/2005 | Achilles |
| 2005/0230156 A1 | 10/2005 | Belnap |
| 2005/0263328 A1 | 12/2005 | Middlemiss |
| 2006/0060390 A1 | 3/2006 | Eyre |
| 2006/0060391 A1 | 3/2006 | Eyre |
| 2006/0086540 A1 | 4/2006 | Griffin |
| 2006/0162969 A1 | 7/2006 | Belnap |
| 2007/0039762 A1 | 2/2007 | Achilles |
| 2007/0181348 A1 | 8/2007 | Lancaster |
| 2007/0187155 A1 | 8/2007 | Middlemiss |
| 2009/0152016 A1 | 6/2009 | Eyre |
| 2010/0266816 A1 | 10/2010 | Eyre |
| 2011/0023375 A1 | 2/2011 | Sani |
| 2011/0056141 A1 | 3/2011 | Miess |
| 2012/0247029 A1 | 10/2012 | Eyre |
| 2013/0068538 A1* | 3/2013 | DiGiovanni ........... B24D 18/00 175/432 |
| 2013/0263519 A1 | 10/2013 | Lin |
| 2014/0166371 A1 | 6/2014 | Whittaker |
| 2015/0284827 A1 | 10/2015 | Can |
| 2016/0312541 A1 | 10/2016 | Feehily |

FOREIGN PATENT DOCUMENTS

| | | |
|---|---|---|
| EP | 0329954 A2 | 8/1989 |
| EP | 0500253 A1 | 8/1992 |
| EP | 0585631 A1 | 3/1994 |
| EP | 0595630 A1 | 5/1994 |
| EP | 0612868 A1 | 8/1994 |
| EP | 0617207 A2 | 9/1994 |
| EP | 0787820 A2 | 8/1997 |
| EP | 0860515 A1 | 8/1998 |
| EP | 1190791 A2 | 3/2002 |
| GB | 1349385 A | 4/1974 |
| GB | 2048927 A | 12/1980 |
| GB | 2268768 A | 1/1994 |
| GB | 2323398 A | 9/1998 |
| GB | 2418215 A | 3/2006 |
| GB | 2422394 A | 7/2006 |
| JP | S5935066 A | 2/1984 |
| JP | S59219500 A | 12/1984 |
| JP | S6167740 A | 4/1986 |
| JP | S61125739 A | 6/1986 |
| JP | S6355161 A | 3/1988 |
| JP | S6369971 A | 3/1988 |
| JP | H0762468 A | 3/1995 |
| JP | H07156003 A | 6/1995 |
| JP | H11245103 A | 9/1999 |
| JP | 2000087112 A | 3/2000 |
| RU | 2034937 C1 | 5/1995 |
| RU | 566439 A1 | 1/2000 |
| WO | 1993023204 A1 | 11/1993 |
| WO | 1996034131 A1 | 10/1996 |
| WO | 2000028106 A1 | 5/2000 |
| WO | 2004040095 A1 | 5/2004 |
| WO | 2004106003 A1 | 12/2004 |
| WO | 2004106004 A1 | 12/2004 |
| WO | 2012145586 A1 | 10/2012 |
| WO | 2015086767 A1 | 6/2015 |

OTHER PUBLICATIONS

Nakamura, T. et al.; Study on theHeat Deterioration Mechanism of Sintered Diamond; Program and Abstracts of the 27th High Pressure Conference of Japan; Oct. 13-15, 1986; Sapporo.

* cited by examiner

LEACHED DIAMOND ELEMENTS AND LEACHING SYSTEMS, METHODS AND ASSEMBLIES FOR PROCESSING DIAMOND ELEMENTS

This application is a continuation of U.S. patent application Ser. No. 17/061,419, filed Oct. 1, 2020, for "LEACHED SUPERABRASIVE ELEMENTS AND LEACHING SYSTEMS, METHODS AND ASSEMBLIES FOR PROCESSING SUPERABRASIVE ELEMENTS," which application is a divisional of U.S. patent application Ser. No. 14/178,251, filed Feb. 11, 2014, for "LEACHED SUPERABRASIVE ELEMENTS AND LEACHING SYSTEMS, METHODS AND ASSEMBLIES FOR PROCESSING SUPERABRASIVE ELEMENTS," the disclosure of which is hereby incorporated herein in its entirety by this reference.

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems. Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

As mentioned above, conventional superabrasive materials have found utility as bearing elements, which may include bearing elements utilized in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron, that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst. In addition to dissolving carbon and graphite, the metal-solvent catalyst may also carry tungsten, tungsten carbide, and/or other materials from the substrate into the PCD layer of the cutting element.

The presence of the metal-solvent catalyst and/or other materials in the diamond table may reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, it is desirable to remove a metal-solvent catalyst from a PCD material in situations where the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

During conventional leaching of a PCD table, exposed surface regions of the PCD table are immersed in a leaching solution until interstitial components, such as a metal-solvent catalyst, are removed to a desired depth from the exposed surface regions. Following leaching, an interface, or leach boundary, between a leached portion and an unleached portion of the PCD table is often oriented in a direction that is parallel to a surface of the PCD table. For example, the leach boundary of a PCD cutting element may be disposed a selected distance away from a wear region (e.g., cutting edge, cutting face, side surface) of a cutting element such that, when the cutting element is mounted to a drill bit, the leach boundary is not continuously forced against a material, such as a rock formation, during drilling. However, as the PCD table of the cutting element is worn down through use over time, a wear region of the PCD table may eventually intersect the leach boundary, resulting in undesired spalling, cracking, and/or thermal damage at or near the leach boundary during drilling. Such damage to the PCD table may reduce the effectiveness and usable life of the PCD cutting element.

SUMMARY

The instant disclosure is directed to exemplary leached superabrasive elements and leaching systems, methods, and assemblies for processing superabrasive elements. According to at least one embodiment, a polycrystalline diamond element may comprise a polycrystalline diamond table having a body of bonded diamond particles with interstitial regions, a first volume of the body comprising an interstitial material within the interstitial regions and a second volume of the body having a lower concentration of interstitial material within the interstitial regions than the first volume. The polycrystalline diamond element may also have an element face and a peripheral surface extending around an outer periphery of the element face. The first volume may be located adjacent to a central portion of the element face and the second volume may be located adjacent to the peripheral surface.

According to at least one embodiment, a boundary region between the first volume and the second volume may extend from the peripheral surface to the element face. The polycrystalline diamond element may also comprise a chamfer extending between the element face and the peripheral surface. The second volume may be adjacent to the chamfer. In some embodiments, the polycrystalline diamond element may be centered about a central axis and a percentage ratio of a diameter of the central portion of the element face defined by the first volume to a diameter of an intersection of the element face and the chamfer, relative to the central axis, may be greater than about 10%. The depth, in a direction perpendicular to the chamfer, of the second volume from the chamfer may be greater than a depth, in a direction perpendicular to the element face, of the second volume from the element face. In at least one embodiment, a boundary region between the first volume and the second volume may extend from about an intersection of the peripheral surface and the chamfer to about an intersection of the element face and the chamfer.

According to various embodiments, a percentage ratio of a diameter of the central portion of the element face defined by the first volume to a diameter of the peripheral surface of the polycrystalline diamond element, relative to a central axis, may be greater than about 10%. The percentage ratio of the diameter of the central portion of the element face defined by the first volume to the diameter of the peripheral surface of the polycrystalline diamond element, relative to the central axis, may be between about 15% to about 40%. In some embodiments, the percentage ratio of the diameter of the central portion of the element face defined by the first volume to the diameter of the peripheral surface of the polycrystalline diamond element, relative to the central axis, may be between about 20% to about 35%.

According to at least one embodiment, the first volume may define a concave region at a boundary region between the first volume and the second volume. The central portion of the element face may be defined by the first volume and an outer portion of the element face surrounding the central portion of the element face may be defined by the second volume. The element face may be substantially defined by the first volume. The polycrystalline diamond element may also comprise a substrate adjacent to a side of the polycrystalline diamond table disposed apart from the element face.

According to at least one embodiment, a method of processing a polycrystalline diamond element may comprise forming a concave region in a polycrystalline diamond element, exposing at least a portion of the concave region to a leaching solution, and removing at least a portion of the polycrystalline diamond material that was exposed to the leaching solution from the polycrystalline diamond element. In various embodiments, following removing the polycrystalline diamond material from at least the portion of the polycrystalline diamond element, the polycrystalline diamond element may comprise an element face, a peripheral surface extending around an outer periphery of the element face, and a chamfer extending between the element face and the peripheral surface.

In some embodiments, exposing the region of the polycrystalline diamond element to the leaching solution may comprise removing an interstitial material from a first volume of the polycrystalline diamond element to a first depth. Removing the polycrystalline diamond material from at least the portion of the polycrystalline diamond element may further comprise removing the polycrystalline diamond material to a second depth approximately equal to or greater than the first depth.

In additional embodiments, a method of processing a polycrystalline diamond element may comprise forming a masking layer over at least a portion of a polycrystalline diamond element, and exposing the polycrystalline diamond element to a leaching solution such that the leaching solution contacts at least a portion of the masking layer. The masking layer may be formed over at least a central portion of the element face.

In some embodiments, the masking layer may be formed over a substantial portion of the element face. The masking layer may be substantially impermeable to the leaching solution. In at least one embodiment, the masking layer may comprise a first masking portion and the method may further comprise forming a second masking portion formed over a separate portion of the polycrystalline diamond element than the first masking portion. The second masking portion may be at least partially soluble in the leaching solution. According to certain embodiments, exposing the polycrystalline diamond element to the leaching solution may further comprise exposing the second masking portion to the leaching solution for a time sufficient to degrade at least a portion of the second masking portion such that the leaching solution contacts part of the polycrystalline diamond element previously covered by the second masking portion. The masking layer may degrade in the leaching solution.

Features from any of the disclosed embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
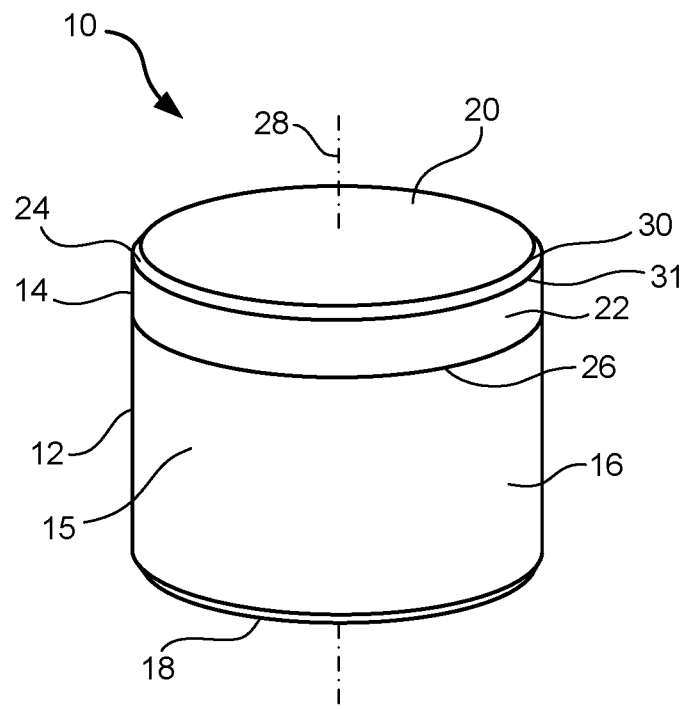
FIG. 1 is a perspective view of an exemplary superabrasive element according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary leached superabrasive elements and leaching systems, methods, and assemblies for processing superabrasive elements. Such superabrasive elements may be used as cutting elements for use in a variety of applications, such as drilling tools, machining equipment, cutting tools, and other apparatuses, without limitation. Superabrasive elements, as disclosed herein, may also be used as bearing elements in a variety of bearing applications, such as thrust bearings, radial bearings, and other bearing apparatuses, without limitation.

The terms "superabrasive" and "superhard," as used herein, may refer to any material having a hardness that is at least equal to a hardness of tungsten carbide. For example, a superabrasive article may represent an article of manufacture, at least a portion of which may exhibit a hardness that is equal to or greater than the hardness of tungsten carbide. The term "cutting," as used herein, may refer to machining processes, drilling processes, boring processes, and/or any other material removal process utilizing a cutting element and/or other cutting apparatus, without limitation.

Figure 2:
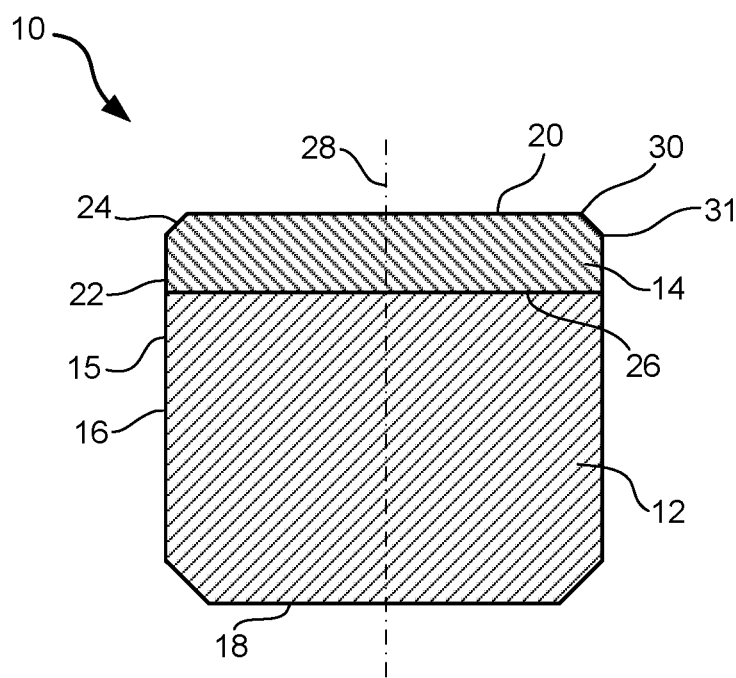
FIG. 2 is a cross-sectional side view of an exemplary superabrasive element according to at least one embodiment.

FIGS. 1 and 2 illustrate an exemplary superabrasive element 10 according to at least one embodiment. As illustrated in FIGS. 1 and 2, superabrasive element 10 may comprise a superabrasive table 14 affixed to or formed upon a substrate 12. Superabrasive table 14 may be affixed to substrate 12 at interface 26, which may be a planar or nonplanar interface. Superabrasive element 10 may comprise a rear surface 18, a superabrasive face 20, and a peripheral surface 15. In some embodiments, peripheral surface 15 may include a substrate side surface 16 formed by substrate 12 and a superabrasive side surface 22 formed by superabrasive table 14. Rear surface 18 may be formed by substrate 12.

Superabrasive element 10 may also comprise a chamfer 24 (i.e., sloped or angled) formed by superabrasive table 14. Chamfer 24 may comprise an angular and/or rounded edge formed at the intersection of superabrasive side surface 22 and superabrasive face 20. Any other suitable surface shape may also be formed at the intersection of superabrasive side surface 22 and superabrasive face 20, including, without limitation, an arcuate surface (e.g., a radius, an ovoid shape, or any other rounded shape), a sharp edge, multiple chamfers/radii, a honed edge, and/or combinations of the foregoing. At least one edge may be formed at the intersection of chamfer 24 and superabrasive face 20 and/or at the intersection of chamfer 24 and superabrasive side surface 22. For example, cutting element 10 may comprise one or more cutting edges, such as an edge 30 and/or or an edge 31. Edge 30 and/or edge 31 may be formed adjacent to chamfer 24 and may be configured to be exposed to and/or in contact with a mining formation during drilling.

In some embodiments, superabrasive element 10 may be utilized as a cutting element for a drill bit, in which chamfer 24 acts as a cutting edge. The phrase "cutting edge" may refer, without limitation, to a portion of a cutting element that is configured to be exposed to and/or in contact with a subterranean formation during drilling. In at least one embodiment, superabrasive element 10 may be utilized as a bearing element (e.g., with superabrasive face 20 acting as a bearing surface) configured to contact oppositely facing bearing elements.

According to various embodiments, superabrasive element 10 may also comprise a substrate chamfer formed by substrate 12. For example, a chamfer comprising an angular and/or rounded edge may be formed by substrate 12 at the intersection of substrate side surface 16 and rear surface 18. Any other suitable surface shape may also be formed at the intersection of substrate side surface 16 and rear surface 18, including, without limitation, an arcuate surface (e.g., a radius, an ovoid shape, or any other rounded shape), a sharp edge, multiple chamfers/radii, a honed edge, and/or combinations of the foregoing.

Superabrasive element 10 may comprise any suitable size, shape, and/or geometry, without limitation. According to at least one embodiment, at least a portion of superabrasive element 10 may have a substantially cylindrical shape. For example, superabrasive element 10 may comprise a substantially cylindrical outer surface surrounding a central axis 28 of superabrasive element 10, as illustrated in FIGS. 1 and 2. Substrate side surface 16 and superabrasive side surface 22 may, for example, be substantially cylindrical and may have any suitable diameters relative to central axis 28, without limitation. According to various embodiments, substrate side surface 16 and superabrasive side surface 22 may have substantially the same outer diameter relative to central axis 28.

Substrate 12 may comprise any suitable material on which superabrasive table 14 may be formed. In at least one embodiment, substrate 12 may comprise a cemented carbide material, such as a cobalt-cemented tungsten carbide material and/or any other suitable material. In some embodiments, substrate 12 may include a suitable metal-solvent catalyst material, such as, for example, cobalt, nickel, iron, and/or alloys thereof. Substrate 12 may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Superabrasive table 14 may be formed of any suitable superabrasive and/or superhard material or combination of materials, including, for example PCD. According to additional embodiments, superabrasive table 14 may comprise cubic boron nitride, silicon carbide, polycrystalline diamond, and/or mixtures or composites including one or more of the foregoing materials, without limitation.

Superabrasive table 14 may be formed using any suitable technique. According to some embodiments, superabrasive table 14 may comprise a PCD table fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., $sp^3$-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution. Polycrystalline diamond elements, such as those disclosed in U.S. Pat. Nos. 7,866,418 and 8,297,382, the disclosure of each of which is incorporated herein, in its entirety, by this reference, may have magnetic properties in at least some regions as disclosed therein and leached regions in other regions as disclosed herein.

Following sintering, various materials, such as a metal-solvent catalyst, remaining in interstitial regions within the as-sintered PCD body may reduce the thermal stability of superabrasive table 14 at elevated temperatures. In some examples, differences in thermal expansion coefficients between diamond grains in the as-sintered PCD body and a metal-solvent catalyst in interstitial regions between the diamond grains may weaken portions of superabrasive table 14 that are exposed to elevated temperatures, such as temperatures developed during drilling and/or cutting operations. The weakened portions of superabrasive table 14 may be excessively worn and/or damaged during the drilling and/or cutting operations.

Removing the metal-solvent catalyst and/or other materials from the as-sintered PCD body may improve the heat resistance and/or thermal stability of superabrasive table 14, particularly in situations where the PCD material may be exposed to elevated temperatures. A metal-solvent catalyst and/or other materials may be removed from the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of superabrasive table 14. Removing a metal-solvent catalyst from the as-sintered PCD body may reduce damage to the PCD material of superabrasive table 14 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, chemical and/or gaseous leaching may be used to remove a metal-solvent catalyst from the as-sintered PCD body up to a desired depth from a surface thereof. The as-sintered PCD body may be leached by immersion in an acid or acid solution, such as aqua regia, nitric acid, hydrofluoric acid, or subjected to another suitable process to remove at least a portion of the metal-solvent catalyst from the interstitial regions of the PCD body and form superabrasive table 14 comprising a PCD table. For example, the as-sintered PCD body may be immersed in an acid solution for about 2 to about 7 days (e.g., about 3, 5, or 7 days) or for a few weeks (e.g., about 4 weeks) depending on the process employed.

Even after leaching, a residual, detectable amount of the metal-solvent catalyst may be present in the at least partially leached superabrasive table 14. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superabrasive table 14 unleached. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, superabrasive table 14 may comprise a volume of PCD material that is at least partially free or substantially free of a metal-solvent catalyst.

The plurality of diamond particles used to form superabrasive table 14 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes) without limitation. Different sizes of diamond particle may be disposed in different locations within a polycrystalline diamond volume, without limitation. According to at least one embodiment, disposing different sizes of diamond particles in different locations may facilitate control of a leach depth, as will be described in greater detail below.

Figure 3:
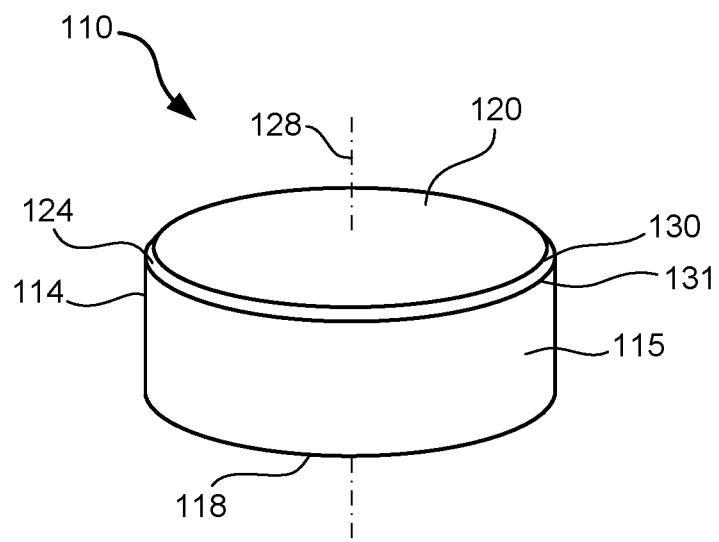
FIG. 3 is a perspective view of an exemplary superabrasive element according to at least one embodiment.
Figure 4:
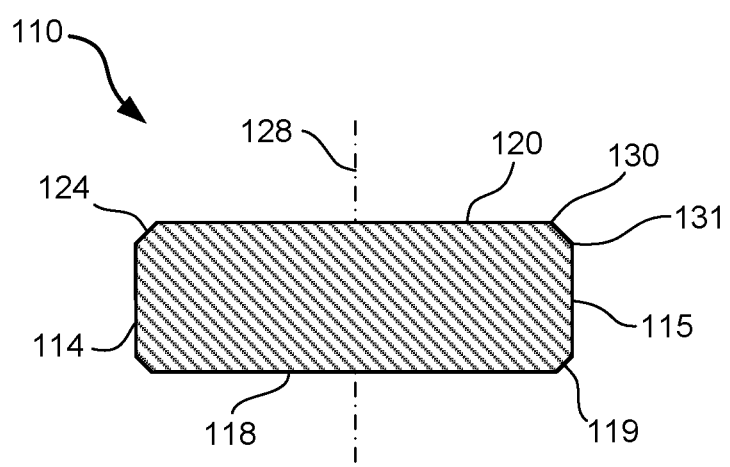
FIG. 4 is a cross-sectional side view of an exemplary superabrasive element according to at least one embodiment.

FIGS. 3 and 4 illustrate an exemplary superabrasive element 110 according to various embodiments. Superabrasive element 110 may comprise a superabrasive table 114 that is not attached to a substrate. As shown in FIGS. 3 and 4, superabrasive element 110 may include a rear surface 118, a superabrasive face 120, and a peripheral surface 115 formed by superabrasive table 114. Superabrasive element 110 may also comprise a chamfer 124 (i.e., sloped or angled) and/or any other suitable surface shape at the intersection of peripheral surface 115 and superabrasive face 120, including, without limitation, an arcuate surface (e.g., a radius, an ovoid shape, or any other rounded shape), a sharp edge, multiple chamfers/radii, a honed edge, and/or combinations of the foregoing. At least one edge, such as an edge 130 and/or or an edge 131, may be formed at the intersection of chamfer 124 and each of superabrasive face 120 and peripheral surface 115, respectively. Peripheral surface 115 of superabrasive element 110 may radially surround a central axis 128 of superabrasive element 110.

According to various embodiments, superabrasive element 110 may also comprise a rear chamfer 119. For example, a rear chamfer 119 comprising an angular and/or rounded edge may be formed by superabrasive element 110 at the intersection of peripheral surface 115 and rear surface 118. Any other suitable surface shape may also be formed at the intersection of peripheral surface 115 and rear surface 118, including, without limitation, an arcuate surface (e.g., a radius, an ovoid shape, or any other rounded shape), a sharp edge, multiple chamfers/radii, a honed edge, and/or combinations of the foregoing.

Superabrasive element 110 may be formed using any suitable technique, including, for example, HPHT sintering, as described above. In some examples, superabrasive element 110 may be created by first forming a superabrasive element 10 that includes a substrate 12 and a superabrasive table 14, as detailed above in reference to FIGS. 1 and 2. Once superabrasive element 10 has been produced, superabrasive table 14 may be separated from substrate 12 to form superabrasive element 110. For example, prior to or following leaching, superabrasive table 14 may be separated from substrate 12 using any suitable process, including a lapping process, a grinding process, a wire-electrical-discharge machining ("wire EDM") process, or any other suitable material-removal process, without limitation.

According to some embodiments, superabrasive element 110 may be processed and utilized either with or without an attached substrate. For example, following leaching, superabrasive element may be secured directly to a cutting tool, such as a drill bit, or to a bearing component, such as a rotor or stator. In various embodiments, following processing, superabrasive element 110 may be attached to a substrate. For example, rear surface 118 of superabrasive element 110 may be brazed, welded, soldered, threadedly coupled, and/or otherwise adhered and/or fastened to a substrate, such as tungsten carbide substrate or any other suitable substrate, without limitation. Polycrystalline diamond elements having pre-sintered polycrystalline diamond bodies including an infiltrant, such as those disclosed in U.S. Pat. No. 8,323,367, the disclosure of which is incorporated herein, in its entirety, by this reference, may be leached a second time as disclosed herein after reattachment of the pre-sintered polycrystalline diamond bodies.

Figure 5:
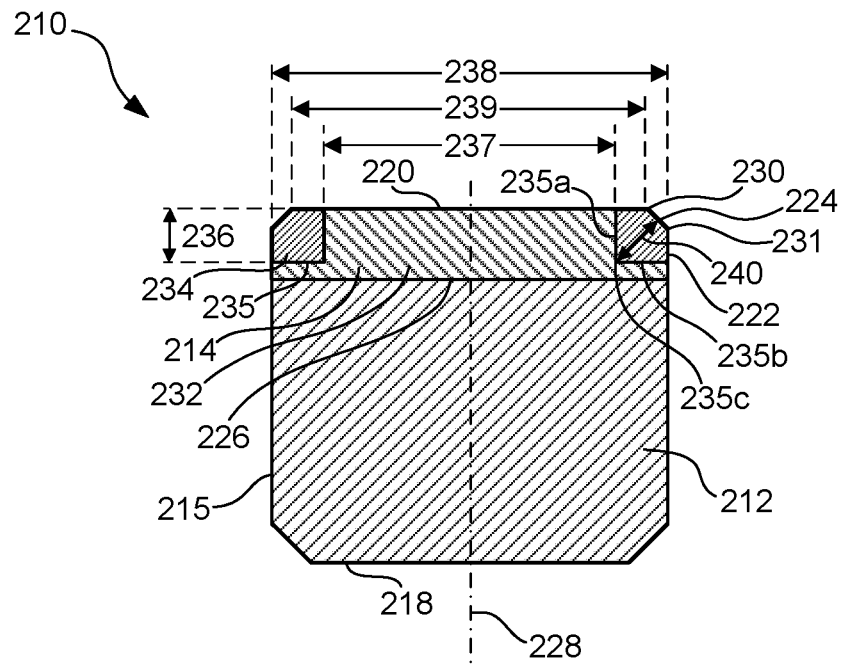
FIG. 5 is a cross-sectional side view of an exemplary superabrasive element according to at least one embodiment.
Figure 6:
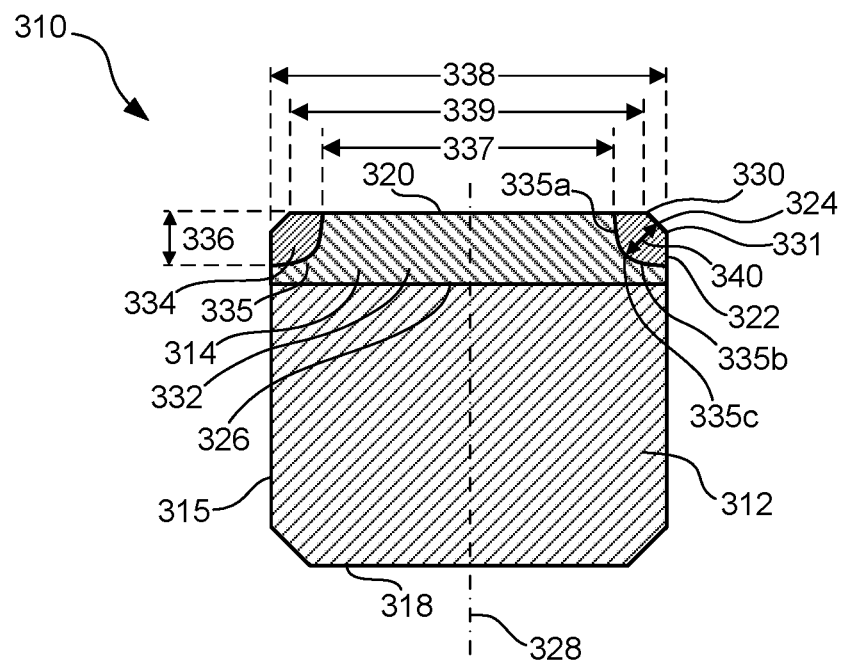
FIG. 6 is a cross-sectional side view of an exemplary superabrasive element according to at least one embodiment.

FIGS. 5 and 6 illustrate exemplary superabrasive elements that include leached volumes according to some embodiments. As shown in FIG. 5, a superabrasive element 210 may include a substrate 212 and a superabrasive table 214 together forming a rear surface 218, a superabrasive face 220, and a peripheral surface 215. Superabrasive table 214 may also form a chamfer 224 and one or more cutting edges, such as edge 230 and edge 231, adjacent to chamfer 224. Superabrasive table 214 may be affixed to substrate 212 at interface 226, which may be a planar or nonplanar interface.

As illustrated in FIG. 5, superabrasive table 214 may include a first volume 232 comprising an interstitial material and a second volume 234 having a lower concentration of the interstitial material than first volume 232. For example, superabrasive table 214 may comprise a polycrystalline diamond material having a matrix defining interstitial regions including one or more interstitial materials. Portions of superabrasive table 214, such as second volume 234 may be leached or otherwise processed to remove interstitial materials, such as a metal-solvent catalyst, from the interstitial regions. Second volume 234 may be created during leaching of superabrasive table 214 according to any suitable leaching technique. For example, portions of superabrasive element 210 may be masked and/or otherwise covered during at least a part of a leaching process to prevent a leaching solution from contacting selected portions of superabrasive element 210 (see, e.g., FIGS. 15-18). In some embodiments, superabrasive element 210 may first be leached, after which portions of superabrasive element 210 may be removed to modify the shape of first volume 232 and/or second volume 234 according to one or more methods discussed herein (see, e.g., FIGS. 7-14).

A boundary region 235 may extend between first volume 232 and second volume 234 so as to border at least a portion of first volume 232 and second volume 234. Boundary region 235 may include amounts of an interstitial material varying between an amount of the interstitial material in first volume 232 and an amount of the interstitial material in second volume 234. In other embodiments, the boundary may be well defined (i.e., boundary region 235 may be thin compared to a depth of second volume 234). As illustrated in FIG. 5, first volume 232 may be located adjacent to a central portion of superabrasive face 220. For example, first volume 232 may be disposed about central axis 228. First volume 232 may extend between interface 226 and superabrasive face 220, with first volume 232 forming at least a portion of superabrasive face 220 such that the central portion of superabrasive face 220 located about central axis 228 is defined by first volume 232, as shown in FIG. 5. In additional embodiments, first volume 232 and superabrasive face 220 may be separated by a thin layer of leached polycrystalline diamond material located adjacent to a central region of superabrasive face 220 (see, e.g., FIG. 11).

Second volume 234 may be formed around at least a portion of first volume 232. For example, second volume 234 may comprise an annular volume surrounding at least a portion of first volume 232 such that the outer portion of superabrasive face 220 relative to central axis 228 is defined by second volume 234. As shown in FIG. 5, second volume 234 may be located adjacent to superabrasive face 220 and/or superabrasive chamfer 224 so as to at least partially surround a portion of first volume 232, such as a portion of first volume 232 adjacent to superabrasive face 220. Second volume 234 may additionally be located adjacent to peripheral surface 215. Second volume 234 may be separated from interface 226 adjacent to substrate 212 so as to prevent corrosion of substrate 212 by a leaching solution used to form second volume 234.

First volume 232, second volume 234, and boundary region 235 may be formed to any suitable size and/or shape within superabrasive table 214, without limitation. For example, boundary region 235 may extend along a generally straight, angular, curved, and/or variable (e.g., zigzag, undulating) profile between first volume 232 and second volume 234. In various embodiments, boundary region 235 may comprise a relatively narrow region between first volume 232 and second volume 234, while boundary region 235 may optionally comprise a relatively wider region between first volume 232 and second volume 234. For example, boundary region 235 may extend from superabrasive side surface side surface 222 to superabrasive face 220.

According to some embodiments, boundary region 235 may comprise a first boundary portion 235a extending inward from superabrasive face 220 and a second boundary portion 235b extending inward from superabrasive side surface 222. For example, as shown in FIG. 5, first boundary portion 235a may extend in a direction that is substantially perpendicular to superabrasive face 220. Additionally, second boundary portion 235b may extend in a direction that is substantially perpendicular to superabrasive side surface 222. First boundary portion 235a and second boundary portion 235b may also extend in any other suitable directions, without limitation. First boundary portion 235a and second boundary portion 235b may intersect at a boundary junction 235c. As illustrated in FIG. 5, boundary junction 235c may be disposed at a depth 240 relative to chamfer 224. Depth 240 may be measured, for example, in a direction perpendicular to chamfer 224.

As shown in FIG. 5, second volume 234 may have a depth 236 from superabrasive face 220 in a direction substantially perpendicular to superabrasive face 220. Second volume 234 may comprise a generally annular-shaped volume defined between a first diameter 237 and a second diameter 238 surrounding central axis 228. The portion of first volume 232 surrounded by second volume 234 may be generally defined by first diameter 237. Second diameter 238 may represent a diameter of peripheral surface 215. Additionally, edge 230 formed at the intersection of chamfer 224 and superabrasive face 220 may be located at a third diameter 239 relative to central axis 228. The generally annular-shaped second volume 234 may comprise a generally ring-shaped volume that is not perfectly symmetric but is irregular in one or more dimensions (as will be discussed in greater detail below with reference to FIGS. 27A and 27B).

According to various embodiments, a percentage ratio of first diameter 237 to second diameter 238 may be greater than approximately 10%. For example, a percentage ratio of first diameter 237 to second diameter 238 may be between approximately 10% and approximately 50% (e.g., approximately 10%, 15%, 20%, 25%, 30%, 35%, 40%, 45%, or 50%). In another example, a percentage ratio of first diameter 237 to second diameter 238 may be between approximately 30% and approximately 95% (e.g., approximately 30%, 35%, 40%, 45%, 50%, 55%, 60%, 65%, 70%, 75%, 80%, 85%, 90%, or 95%). Additionally, according to at least one embodiment, a percentage ratio of first diameter 237 to third diameter 239 may be greater than approximately 10%. For example, a percentage ratio of first diameter 237 to third diameter 239 may be between approximately 10% and approximately 50% (e.g., approximately 10%, 15%, 20%, 25%, 30%, 35%, 40%, 45%, or 50%). In another example, a percentage ratio of first diameter 237 to third diameter 239 may be between approximately 30% and approximately 95% (e.g., approximately 30%, 35%, 40%, 45%, 50%, 55%, 60%, 65%, 70%, 75%, 80%, 85%, 90%, or 95%).

Second volume 234 may be leached to any suitable depth from superabrasive face 220, chamfer 224, and/or superabrasive side surface 222, without limitation. According to some embodiments, second volume 234 may have a leach depth greater than or equal to approximately 200 µm as measured in a substantially perpendicular direction from at least one of superabrasive face 220, chamfer 224, and/or superabrasive side surface 222. In various embodiments, second volume 234 may have a leach depth between approximately 200 µm and approximately 1200 µm (e.g., approximately 200 µm, 250 µm, 300 µm, 350 µm, 400 µm, 450 µm, 500 µm, 550 µm, 600 µm, 650 µm, 700 µm, 750 µm, 800 µm, 850 µm, 900 µm, 950 µm, 1000 µm, 1050 µm, 1100 µm, 1150 µm, or 1200 µm) as measured in a substantially perpendicular direction from at least one of superabrasive face 220, chamfer 224, and/or superabrasive side surface 222. According to at least one embodiment, a depth 240 of second volume 234 as measured from a center portion of chamfer 224 and/or from boundary junction 235c in a direction perpendicular to chamfer 224 may be between approximately 200 µm and 700 µm. According to various embodiments, a percentage ratio of the difference between second diameter 238 and first diameter 237 (i.e., first diameter 237 subtracted from second diameter 238) to depth 236 of second volume 234 may be between approximately 70% and approximately 130% (e.g., approximately 70%, 80%, 90%, 100%, 110%, 120%, or 130%). For example, a percentage ratio of the difference between a second diameter 238 of 4500 µm and a first diameter 237 of 3700 µm to a depth 236 of 700 µm may be 114% based on the calculation ((4500 µm−3700 µm)/700 µm)*100%.

Superabrasive elements 210 having superabrasive table 214 comprising first volume 232 and second volume 234 may exhibit properties of increased thermal stability, fatigue resistance, strength, and/or wear resistance. Such properties may be enhanced by the shape, size, and/or locations of first volume 232, second volume 234, and/or boundary region 235 of superabrasive table 214. Accordingly, the superabrasive element configuration illustrated in FIG. 5, as well as other configurations illustrated and described herein, may provide significant resistance to undesired spalling, cracking, and/or thermal damage of superabrasive portions, such as superabrasive table 214, of the superabrasive elements during drilling.

FIG. 6 shows an exemplary superabrasive element 310 according to at least one embodiment. As shown in FIG. 6, a superabrasive element 310 may include a substrate 312 and a superabrasive table 314 together forming a rear surface 318, a superabrasive face 320, and a peripheral surface 315. Superabrasive table 314 may also form a chamfer 324 and one or more cutting edges, such as edge 330 and edge 331, adjacent to chamfer 324. Superabrasive table 314 may be affixed to substrate 312 at interface 326, which may be a planar or nonplanar interface.

As illustrated in FIG. 6, superabrasive table 314 may include a first volume 332 comprising an interstitial material and a second volume 334 having a lower concentration of the interstitial material than first volume 332. Portions of superabrasive table 314, such as second volume 334 may be leached or otherwise processed to remove interstitial materials, such as a metal-solvent catalyst, from the interstitial regions. Second volume 334 may be created during leaching of superabrasive table 314 according to any suitable leaching technique. For example, portions of superabrasive element 310 may be masked and/or otherwise covered during at least a part of a leaching process to prevent a leaching solution from contacting selected portions of superabrasive element 310 (see, e.g., FIGS. 15-18). In some embodiments, superabrasive element 310 may first be leached, after which portions of superabrasive element 310 may be removed to modify the shape of first volume 332 and/or second volume 334 according to one or more methods discussed herein (see, e.g., FIGS. 7-14).

A boundary region 335 may extend between first volume 332 and second volume 334. Boundary region 335 may include amounts of metal-solvent catalyst varying between an amount of metal-solvent catalyst in first volume 332 and an amount of metal-solvent catalyst in second volume 334. As illustrated in FIG. 6, first volume 332 may be located adjacent to a central portion of superabrasive face 320. For example, first volume 332 may be disposed about central axis 328. First volume 332 may extend between interface 326 and superabrasive face 320 with first volume 332 forming at least a portion of superabrasive face 320 such that the central portion of superabrasive face 320 located about central axis 328 is defined by first volume 332, as shown in FIG. 6. In some embodiments, first volume 332 and superabrasive face 320 may be separated by a thin layer of leached polycrystalline diamond material located adjacent to a central region of superabrasive face 320 (see, e.g., FIG. 11).

Second volume 334 may be formed around at least a portion of first volume 332. For example, second volume 334 may comprise an annular volume surrounding at least a portion of first volume 332 such that an outer portion of superabrasive face 320 relative to central axis 328 is defined by second volume 334. As shown in FIG. 6, second volume 334 may be located adjacent to superabrasive face 320 and/or superabrasive chamfer 324 so as to at least partially surround a portion of first volume 332 that is also adjacent to superabrasive face 320. Second volume 334 may additionally be located adjacent to peripheral surface 315. Second volume 334 may be separated from interface 326 adjacent to substrate 312 so as to prevent corrosion of substrate 312 by a leaching solution used to form second volume 334.

First volume 332, second volume 334, and boundary region 335 may be formed to any suitable size and/or shape within superabrasive table 314, without limitation. For example, boundary region 335 may extend along a generally straight, angular, curved, and/or variable (e.g., zigzag, undulating) profile between first volume 332 and second volume 334. In various embodiments, boundary region 335 may comprise a relatively narrow region between first volume 332 and second volume 334, while boundary region 335 may optionally comprise a relatively wider region between first volume 332 and second volume 334. For example, boundary region 335 may extend from superabrasive side surface side surface 322 to superabrasive face 320, as shown in FIG. 5. According to some embodiments, boundary region 335 may comprise a first boundary portion 335a extending inward from superabrasive face 320 and a second boundary portion 335b extending inward from superabrasive side surface 322.

For example, as shown in FIG. 6, first boundary portion 335a may extend inward from superabrasive face 320 along a sloping and/or arcuate profile. Additionally, second boundary portion 335b may extend inward from superabrasive side surface 322 along a sloping and/or arcuate profile. First boundary portion 335a and second boundary portion 335b may also extend in any other suitable directions, without limitation. First boundary portion 335a and second boundary portion 235b may intersect at a boundary junction 335c. As illustrated in FIG. 6, boundary junction 335c may be disposed at a depth 340 relative to chamfer 324. Depth 340 may be measured, for example, in a direction perpendicular to chamfer 324.

As shown in FIG. 6, second volume 334 may have a depth 336 from superabrasive face 320 in a direction substantially perpendicular to superabrasive face 320. Second volume 334 may comprise a generally annular-shaped volume defined between a first diameter 337 and a second diameter 338 surrounding central axis 328. The portion of first volume 332 surrounded by second volume 334 may be generally defined by first diameter 337. Second diameter 338 may represent a diameter of peripheral surface 215. Additionally, edge 330 formed at the intersection of chamfer 324 and superabrasive face 320 may be located at a third diameter 339 relative to central axis 328.

According to various embodiments, a percentage ratio of first diameter 337 to second diameter 338 may be greater than approximately 10%. For example, a percentage ratio of first diameter 337 to second diameter 338 may be between approximately 10% and approximately 50% (e.g., approximately 10%, 15%, 20%, 25%, 30%, 35%, 40%, 45%, or 50%). In another example, a percentage ratio of first diameter 337 to second diameter 338 may be between approximately 30% and approximately 95% (e.g., approximately 30%, 35%, 40%, 45%, 50%, 55%, 60%, 65%, 70%, 75%, 80%, 85%, 90%, or 95%). Additionally, according to at least one embodiment, a percentage ratio of first diameter 337 to third diameter 339 may be greater than approximately 10%. For example, a percentage ratio of first diameter 337 to third diameter 339 may be between approximately 10% and approximately 50% (e.g., approximately 10%, 15%, 20%, 25%, 30%, 35%, 40%, 45%, or 50%). In another example, a percentage ratio of first diameter 337 to third diameter 339 may be between approximately 30% and approximately 95% (e.g., approximately 30%, 35%, 40%, 45%, 50%, 55%, 60%, 65%, 70%, 75%, 80%, 85%, 90%, or 95%).

Second volume 334 may be leached to any suitable depth from superabrasive face 320, chamfer 324, and/or superabrasive side surface 322, without limitation. According to some embodiments, second volume 334 may have a leach depth greater than or equal to approximately 200 μm as measured in a substantially perpendicular direction from at least one of superabrasive face 320, chamfer 324, and/or superabrasive side surface 322. In various embodiments, second volume 334 may have a leach depth between approximately 200 μm and approximately 1200 μm (e.g., approximately 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, 1000 μm, 1050 μm, 1100 μm, 1150 μm, or 1200 μm) as measured in a substantially perpendicular direction from at least one of superabrasive face 320, chamfer 324, and/or superabrasive side surface 322. According to at least one embodiment, a depth 340 of second volume 334 as measured from a center portion of chamfer 324 and/or from boundary junction 335c in a direction perpendicular to chamfer 324 may be between approximately 200 μm and 700 μm. According to various embodiments, a percentage ratio of the difference between second diameter 338 and first diameter 337 (i.e., first diameter 337 subtracted from second diameter 338) to depth 336 of second volume 334 may be between approximately 70% and approximately 130% (e.g., approximately 70%, 80%, 90%, 100%, 110%, 120%, or 130%). For example, a percentage ratio of the difference between a second diameter 338 of 4500 μm and a first diameter 337 of 4100 μm to a depth 336 of 500 μm may be 80% based on the calculation ((4500 μm−4100 μm)/500 μm)*100%.

Superabrasive elements 310 having superabrasive table 314 comprising first volume 332 and second volume 334 may exhibit properties of increased thermal stability, fatigue resistance, strength, and/or wear resistance. Such properties may be enhanced by the shape, size, and/or locations of first volume 332, second volume 334, and/or boundary region 335 of superabrasive table 314. Accordingly, the superabrasive element configuration illustrated in FIG. 6, as well as other configurations illustrated and described herein, may provide significant resistance to undesired spalling, cracking, and/or thermal damage of superabrasive portions, such as superabrasive table 314, of the superabrasive elements during drilling.

Figure 7:
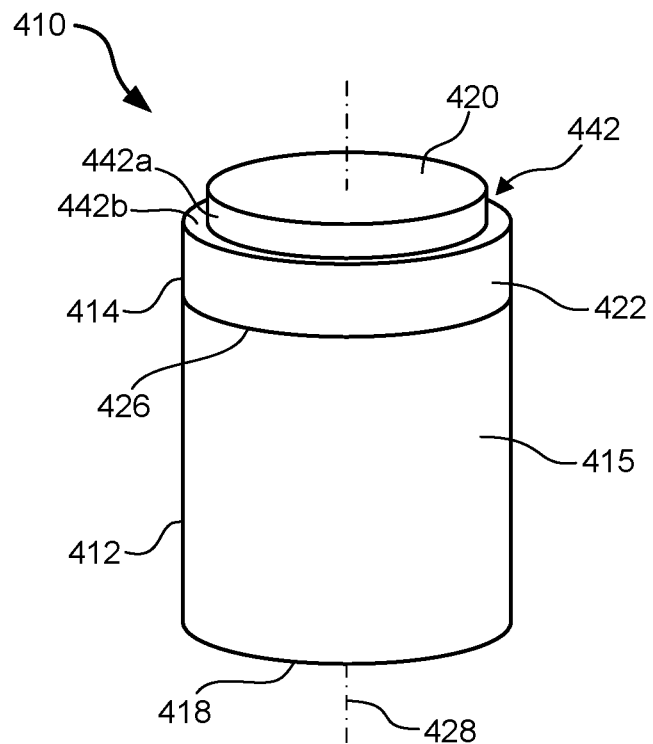
FIG. 7 is a perspective view of an exemplary superabrasive element according to at least one embodiment.
Figure 8:
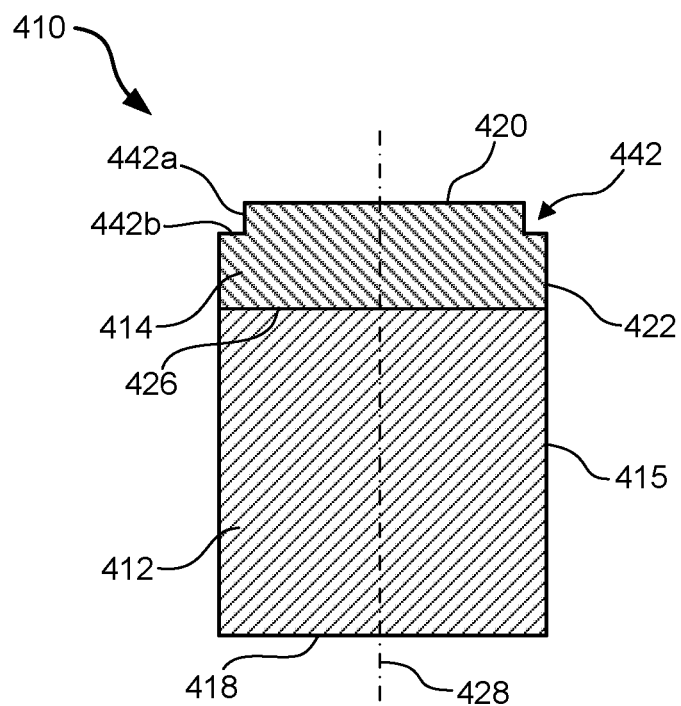
FIG. 8 is a cross-sectional side view of an exemplary superabrasive element according to at least one embodiment.

FIGS. 7-11 illustrate a superabrasive element at various stages of leaching and processing according to at least one embodiment. FIG. 7 is a perspective view of a superabrasive element 410 and FIG. 8 is a cross-sectional view of superabrasive element 410 prior to leaching. As shown in FIGS. 7 and 8, superabrasive element 410 may include a substrate 412 and a superabrasive table 414 together forming a rear surface 418, a superabrasive face 420, and a peripheral surface 415. Superabrasive table 414 may be affixed to substrate 412 at interface 426, which may be a planar or nonplanar interface. Prior to exposure to a leaching agent, superabrasive table 414 may comprise an unleached volume of superabrasive material, such as a polycrystalline diamond body containing a metal-solvent catalyst disposed in interstitial regions.

Superabrasive element 410 may be formed to include a peripheral recess 442 defined in superabrasive table 414 and extending circumferentially around at least a peripheral portion of superabrasive table 414. For example, peripheral recess 442 may be defined between superabrasive face 420 and superabrasive side surface 422. Peripheral recess 442 may be formed in superabrasive element 410 using any suitable technique, without limitation. According to at least one embodiment, peripheral recess 442 may be formed during sintering of a diamond particle volume to form superabrasive table 414 comprising a polycrystalline diamond material. For example, a container surrounding the diamond particle volume during sintering, such as a sintering can, may include an interior protrusion or feature for molding peripheral recess 442 in superabrasive element 410. In additional embodiments, peripheral recess 442 may be formed following sintering of superabrasive element 410. For example, peripheral recess 442 may be formed by machining, laser ablation, grinding, and/or otherwise removing selected portions of superabrasive table 414 of superabrasive element 410. Portions of superabrasive table 414 may be removed through, for example, milling, grinding, lapping, centerless grinding, turning, and/or any other suitable mechanical and/or chemical processing technique. Material may be removed from superabrasive table 414 to form peripheral recess 442 or any geometrical feature by using any suitable technique, including, by way of example, laser cutting or ablation, electrical discharge machining, electro-chemical erosion, water jet cutting, and/or abrasive water jet machining.

Peripheral recess 442 may comprise any desired shape, without limitation. For example, peripheral recess 442 may be defined by angular, straight, and/or arcuate surface portions of superabrasive table 414. In at least one embodiment, peripheral recess 442 may be defined by a first surface portion 442a and a second surface portion 442b intersecting first surface portion 442a. Peripheral recess 442 may be formed circumferentially about a portion of superabrasive table 414 that is adjacent to superabrasive face 420, as shown in FIG. 7. Peripheral recess 442 may, for example, be generally centered about central axis 428.

Figure 9A:
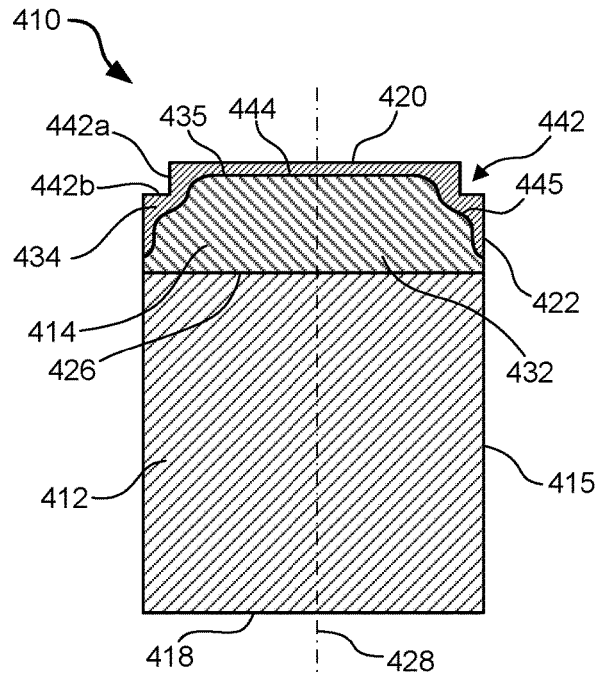
FIG. 9A is a cross-sectional side view of an exemplary superabrasive element according to at least one embodiment.
Figure 9B:
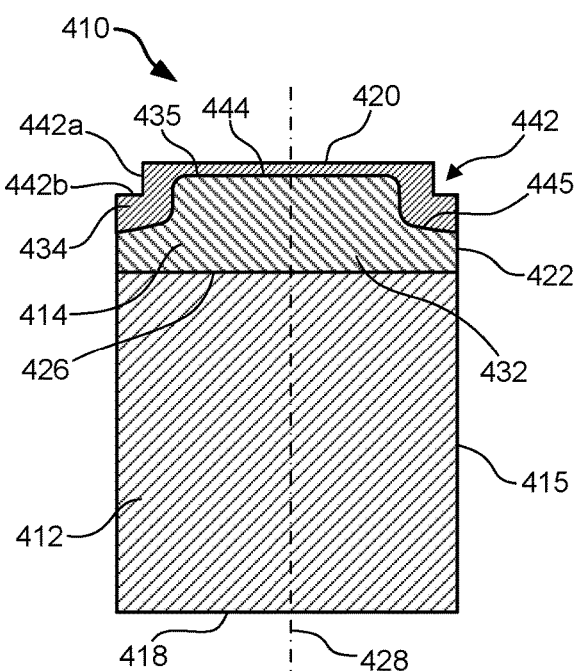
FIG. 9B is a cross-sectional side view of an exemplary superabrasive element according to at least one embodiment.

FIGS. 9A and 9B illustrate superabrasive element 410 following exposure to a leaching agent, such as a corrosive leaching solution. As shown in FIGS. 9A and 9B, a peripheral recess 442 may result in a generally sloped and/or undulating leach profile in portions of superabrasive table 414 near peripheral recess 442. Leach depths of superabrasive table may be relatively deeper in portions of superabrasive table 414 adjacent to an intersection of first surface portion 442a and superabrasive face 420 and/or portions of superabrasive table 414 adjacent to an intersection of second surface portion 442b and superabrasive side surface 422. Such leach depths may define a generally sloping leach profile between superabrasive side surface 422 and a region of superabrasive table 414 near superabrasive face 420.

As shown in FIGS. 9A and 9B, leaching superabrasive element 410 may produce a first volume 432 (i.e., unleached volume) comprising an interstitial material, such as a metal-solvent catalyst, and a second volume 434 (i.e., leached volume) having a lower concentration of the interstitial material than first volume 432. A boundary region 435 may extend between first volume 432 and second volume 434. Boundary region 435 may include amounts of an interstitial material varying between an amount of the interstitial material in first volume 432 and an amount of the interstitial material in second volume 434. In other embodiments, the boundary may be well defined (i.e., boundary region 435 may be thin compared to a depth of second volume 434). As illustrated in FIGS. 9A and 9B, at least a portion of boundary region 435, such as sloped boundary portion 445, may generally slope between superabrasive side surface 422 and a region of superabrasive table 414 near superabrasive face 420 at an oblique angle relative to central axis 428. Additionally, at least a portion of boundary region 435 adjacent to superabrasive face 420, such as a central boundary portion 444 of boundary region 435 disposed about central axis 428, may extend in a direction generally parallel to superabrasive face 420.

In some embodiments, as shown, for example, in FIG. 9B, boundary region 435 may have a different profile shape and/or may intersect a different portion of superabrasive side surface 422 in comparison with boundary region 435 illustrated in FIG. 9A. Additionally, second volume 434 shown in FIG. 9B may have a greater leach depth relative to various portions of superabrasive table 412, such as peripheral recess 442, than second volume 434 shown in FIG. 9A. Any combination of features, methods, or embodiments described herein (e.g., leachability, masking, removing material prior to and/or following leaching) may be utilized to form the different second volumes 434 and boundary regions 435 illustrated in FIGS. 9A and 9B.

The present invention contemplates selectively removing portions (e.g., leached regions) of the diamond table to tailor the shape and/or size of the remaining leached regions of the diamond table.

Figure 10:
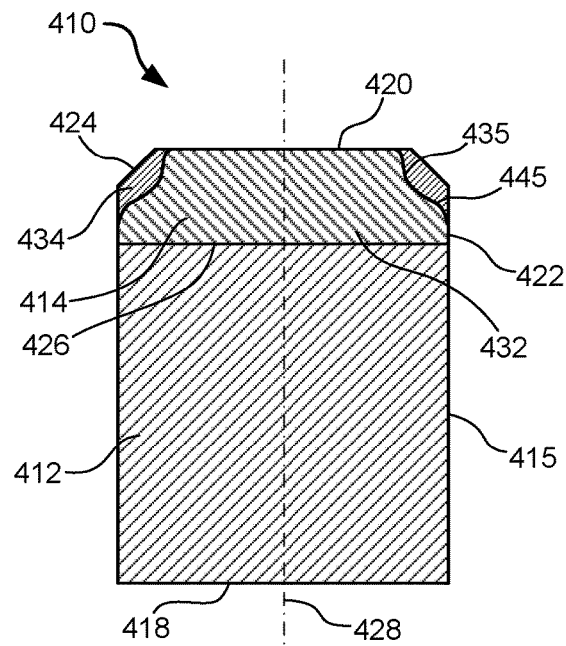
FIG. 10 is a cross-sectional side view of an exemplary superabrasive element according to at least one embodiment.

FIG. 10 illustrates superabrasive element 410 following further processing of the previously leached superabrasive element 410 (see FIGS. 9A and 9B) to remove portions of exterior material from superabrasive element 410. According to various embodiments, superabrasive element 410 may be further processed using any suitable material removal technique, without limitation. For example, portions of superabrasive element 410 may be smoothed and/or polished using any suitable mechanical, chemical, electrical, and/or laser processing technique, including grinding, lapping, milling, polishing, and/or any other suitable mechanical processing technique. By way of example, U.S. Pat. Nos. 5,967,250; 6,145,608; 5,653,300; 5,447,208; and 5,944,129, the disclosure of each of which is incorporated herein, in its entirety, by this reference, disclose superabrasive elements having smoothed surface portions.

According to at least one embodiment, material may be removed from at least a region adjacent to superabrasive face 420, first surface portion 442a, and/or second surface portion 442b of superabrasive table 414. Material may also be removed from at least a region adjacent to peripheral surface 415, such as a region adjacent to superabrasive side surface 422. As shown in FIG. 10, sufficient material may be removed from superabrasive table 414 that peripheral recess 442 is no longer defined in superabrasive table 414. Additionally, according to various embodiments, a superabrasive chamfer 424 may be formed on a portion of superabrasive table 414 between superabrasive face 420 and superabrasive side surface 422.

Boundary region 435 located between first volume 432 and second volume 434 may extend along any suitable profile within superabrasive table 414. For example, as illustrated in FIG. 10, a sloped boundary portion 445 of boundary region 435 may extend between superabrasive face 420 and superabrasive side surface 422 along any suitable profile, including, for example, a generally straight, angular, curved, and/or variable (e.g., zigzag, undulating) profile. According to at least one embodiment, superabrasive element 410 may be processed such that boundary region 435 intersects superabrasive face 420. Accordingly, as shown in FIG. 10, first volume 432 may be located directly adjacent to a central portion of superabrasive face 420. For example, first volume 432 may be disposed about central axis 428. First volume 432 may extend between interface 426 and superabrasive face 420, with first volume 432 forming at least a portion of superabrasive face 420 such that at least the central portion of superabrasive face 420 located about central axis 428 is defined by first volume 432.

Figure 11:
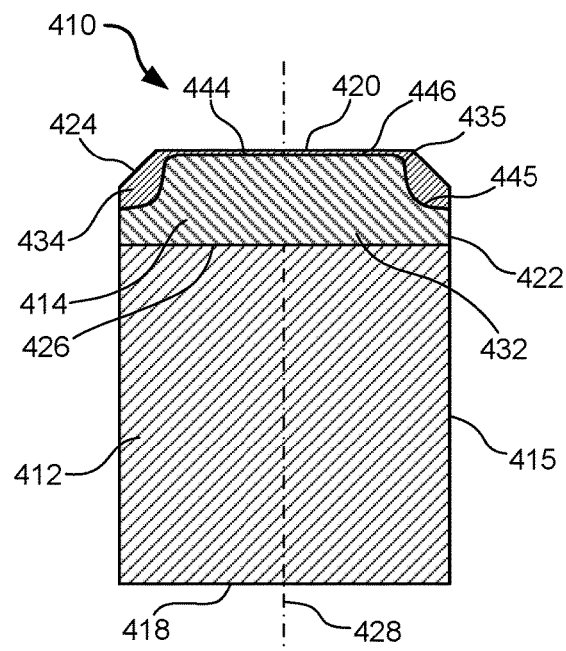
FIG. 11 is a cross-sectional side view of an exemplary superabrasive element according to at least one embodiment.

In some embodiments, material may be removed from superabrasive element 410 such that first volume 432 and superabrasive face 420 are separated by a thin layer comprising a portion of second volume 434. For example, as illustrated in FIG. 11, a thin layer portion 446 of second volume 434 may extend adjacent to at least a portion of superabrasive face 420 so that first volume 432 is at least partially separated from superabrasive face 420 by thin layer portion 446.

Any portion and/or portions of second volume 434 as shown in FIGS. 9A and 9B may remain after removing other portions of the diamond table. Such a configuration may form a desirable size and/or shape of the remaining leached region(s) of the diamond table. As shown, for example, in FIG. 11, boundary region 435 may have a different profile shape and/or may intersect a different portion of superabrasive side surface 422 in comparison with boundary region 435 illustrated in FIG. 10. Any combination of features, methods, or embodiments described herein (e.g., leachability, masking, removing material prior to and/or following leaching) may be utilized to form the boundary regions 435 illustrated in FIGS. 10 and 11. In some embodiments, superabrasive element 410 illustrated in FIG. 11 may be formed by processing superabrasive element 410 illustrated in FIG. 9B. According to at least one embodiment, additional material may be removed from the outer periphery (i.e., outer peripheral surface 415) of superabrasive element 410 illustrated in FIG. 11 in comparison with superabrasive element 410 illustrated in FIG. 10.

While FIGS. 7-9 described in detail above illustrate a peripheral recess 442 formed between superabrasive face 420 and peripheral surface 415 and a leach profile within superabrasive element 410 resulting from such a configuration, peripheral recess 442 may optionally be formed to any suitable size, shape, and/or location so as to obtain a desired leach profile.

Figure 12A:
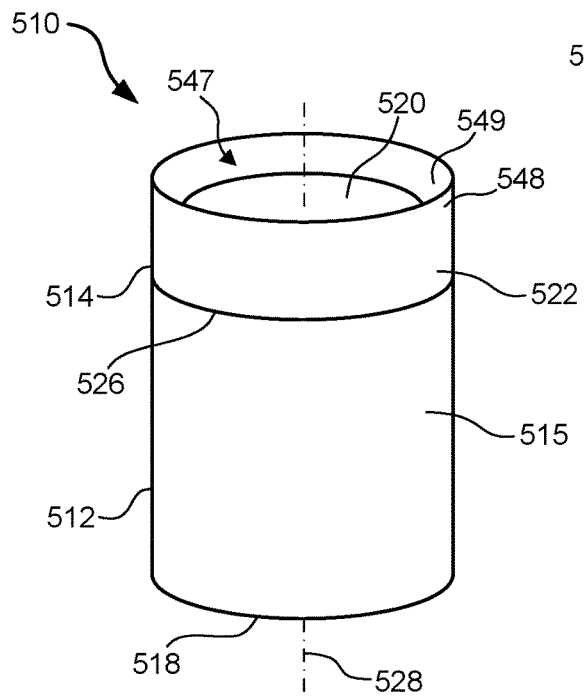
FIG. 12A is a perspective view of an exemplary superabrasive element according to at least one embodiment.
Figure 12B:
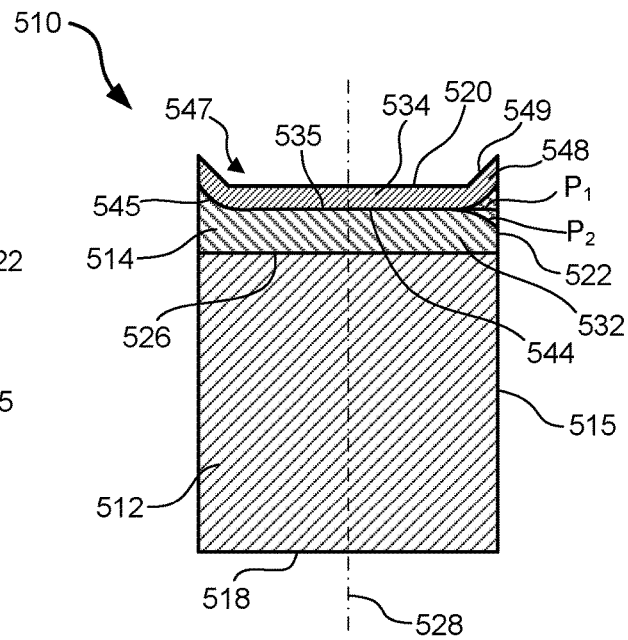
FIG. 12B is a cross-sectional side view of an exemplary superabrasive element according to at least one embodiment.

FIGS. 12A-13 illustrate additional superabrasive elements at various stages of leaching and processing according to certain embodiments. FIGS. 12A and 12B show a superabrasive element 510, and FIG. 13 shows superabrasive element 510 following processing to remove portions of superabrasive element 510. As shown in FIGS. 12A-13, superabrasive element 510 may include a substrate 512 and a superabrasive table 514 together forming a rear surface 518, a superabrasive face 520, and a peripheral surface 515. Superabrasive table 514 is bonded to substrate 512 along interface 526, which may be a planar or nonplanar interface. Prior to exposure to a leaching agent, superabrasive table 514 may comprise an unleached volume of superabrasive material, such as a polycrystalline diamond body containing a metal-solvent catalyst disposed in interstitial regions.

Superabrasive element 510 may be formed to include a central recess 547 defined in at least a portion of superabrasive table 514. For example, central recess 547 may be defined by a top portion of superabrasive table 514. According to at least one example, as shown in FIGS. 12A and 12B, central recess 547 may be defined by superabrasive face 520 and a peripheral rim 548 extending circumferentially around at least a portion of central recess 547. Peripheral rim 548 may slope upward and radially outward from superabrasive face 520. For example, peripheral rim 548 may comprise a sloped surface 549 sloping obliquely from superabrasive face 520 and intersecting superabrasive side surface 522. Central recess 547 may optionally be formed to any other suitable size, shape, and/or configuration within superabrasive table 514 so as to obtain a desired leach profile, without limitation.

Central recess 547 may be formed in superabrasive element 510 using any suitable technique. According to at least one embodiment, central recess 547 may be formed during sintering of a diamond particle volume to form superabrasive table 514. For example, a container surrounding the diamond particle volume during sintering, such as a sintering can, may include an interior protrusion, feature, or insert (e.g., h-BN, graphite, a material suitable for use in a polycrystalline diamond sintering gasket, or other suitable material) within the sintering can for molding central recess 547 in superabrasive element 510. In additional embodiments, central recess 547 may be formed following sintering of superabrasive element 510. For example, central recess 547 may be formed by machining and/or otherwise removing selected portions of superabrasive table 514 of superabrasive element 510. Portions of superabrasive table 514 may be removed through, for example, milling, grinding, turning, drilling, and/or any other suitable mechanical and/or chemical processing technique. Material also may be removed from superabrasive table 514 using any other suitable technique, including, by way of example, laser cutting, electrical discharge machining, electro-chemical erosion, water jet cutting, and/or abrasive water jet machining.

As illustrated in FIG. 12B, following exposure to a leaching agent, superabrasive table 514 may include a first volume 532 (i.e., unleached volume) comprising an interstitial material, such as a metal-solvent catalyst, and a second volume 534 (i.e., leached volume) having a lower concentration of the interstitial material than first volume 532. A boundary region 535 may extend between first volume 532 and second volume 534. Boundary region 535 may include amounts of an interstitial material varying between an amount of the interstitial material in first volume 532 and an amount of the interstitial material in second volume 534. In other embodiments, the boundary may be well defined (i.e., boundary region 535 may be thin compared to a depth of second volume 534). As illustrated in FIG. 12B, boundary region 535 may include a central boundary portion 544 and a sloped boundary portion 545. Sloped boundary portion 545 may generally slope between superabrasive side surface 522 and central boundary portion 544 at an oblique angle relative to central axis 528. For example, at least a portion of sloped boundary portion 545 may slope in a direction generally parallel to sloped surface 549, while a portion of sloped boundary portion 545 may follow a generally arcuate profile at an intersection of sloped boundary portion 545 and central boundary portion 544.

In some embodiments, boundary region 535 may have different profile shapes and/or may intersect different portions of superabrasive side surface 522. For example, as illustrated in FIG. 12B, boundary region 535 may alternatively be formed to follow profile $P_1$, $P_2$, and/or any other suitable profile, without limitation. Any combination of features, methods, or embodiments described herein (e.g., leachability, masking, removing material prior to and/or following leaching) may be utilized to form various boundary region 535 profiles.

Figure 13A:
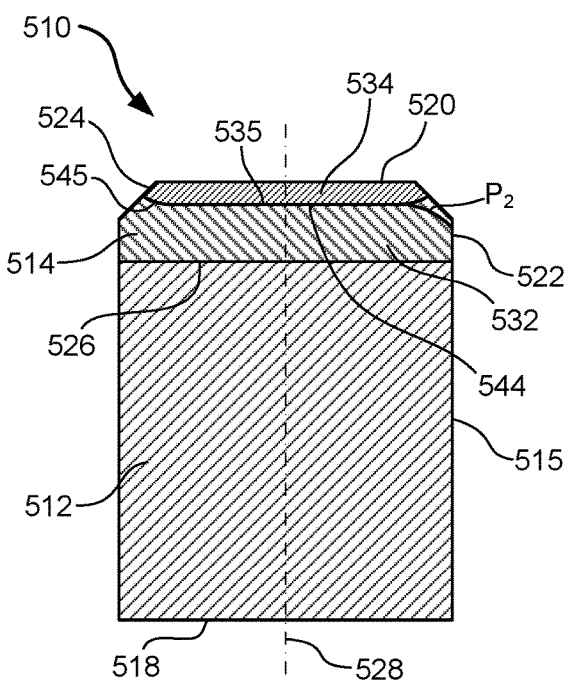
FIG. 13A is a cross-sectional side view of an exemplary superabrasive element according to at least one embodiment.
Figure 13B:
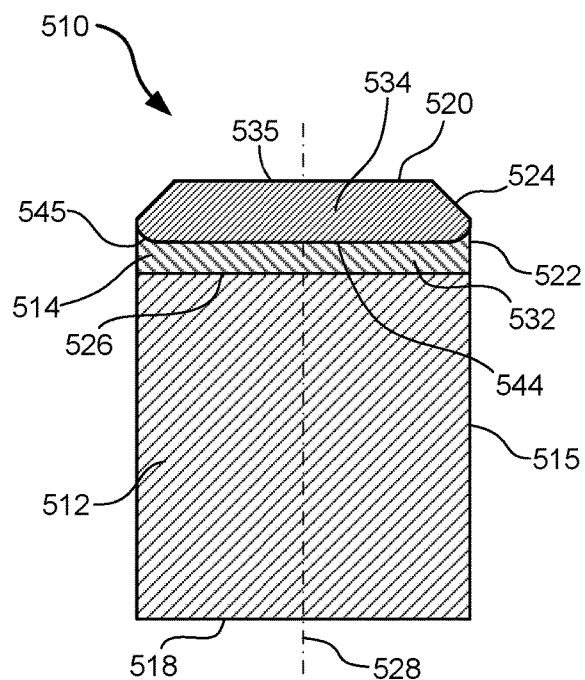
FIG. 13B is a cross-sectional side view of an exemplary superabrasive element according to at least one embodiment.

FIGS. 13A and 13B illustrate superabrasive element 510 following further processing of the previously leached superabrasive element 510 to remove portions of exterior material from superabrasive element 510. According to various embodiments, superabrasive element 510 may be further processed using any suitable material removal technique, without limitation. For example, portions of superabrasive element 510 may be smoothed and/or polished using any suitable mechanical, chemical, electrical, and/or laser processing technique, including grinding, lapping, milling, polishing, and/or any other suitable mechanical processing technique.

According to at least one embodiment, material may be removed from at least regions adjacent to superabrasive face 520. Material may also be removed from at least a region adjacent to peripheral surface 515, such as a region adjacent to superabrasive side surface 522. Peripheral rim 548 extending from superabrasive face 520, as illustrated in FIGS. 12A and 12B, may be removed so that superabrasive face 520 is the top-most surface of superabrasive element 510. As shown in FIGS. 13A and 13B, a superabrasive chamfer 524 may be formed on a portion of superabrasive table 514 between superabrasive face 520 and superabrasive side surface 522.

Boundary region 535 located between first volume 532 and second volume 534 may extend along any suitable profile within superabrasive table 514. For example, as illustrated in FIG. 13A, sloped boundary portion 545 of boundary region 535 may extend between superabrasive chamfer 524 and central boundary portion 544 along any suitable profile, including, for example, a generally straight, angular, curved, and/or variable (e.g., zigzag, undulating) profile. According to at least one embodiment, superabrasive element 510 may be processed such that boundary region 535 intersects superabrasive chamfer 524 and/or a surface region adjacent to superabrasive chamfer 524 (e.g., superabrasive side surface 522). Accordingly, as shown in FIG. 13A, second volume 534 may be located directly adjacent to a central portion of superabrasive face 520. For example, second volume 534 may be disposed about central axis 528. A portion of first volume 532, such as a portion adjacent to superabrasive chamfer 524, may peripherally surround at least a portion of second volume 534.

In some embodiments, as illustrated in FIG. 13B, sloped boundary portion 545 of boundary region 535 may extend between superabrasive side surface 522 and central boundary portion 544 along any suitable profile, including, for example, a generally straight, angular, curved, and/or variable (e.g., zigzag, undulating) profile. According to at least one embodiment, superabrasive element 510 may be processed such that boundary region 535 intersects superabrasive side surface 522 below superabrasive chamfer 524.

Figure 14A:
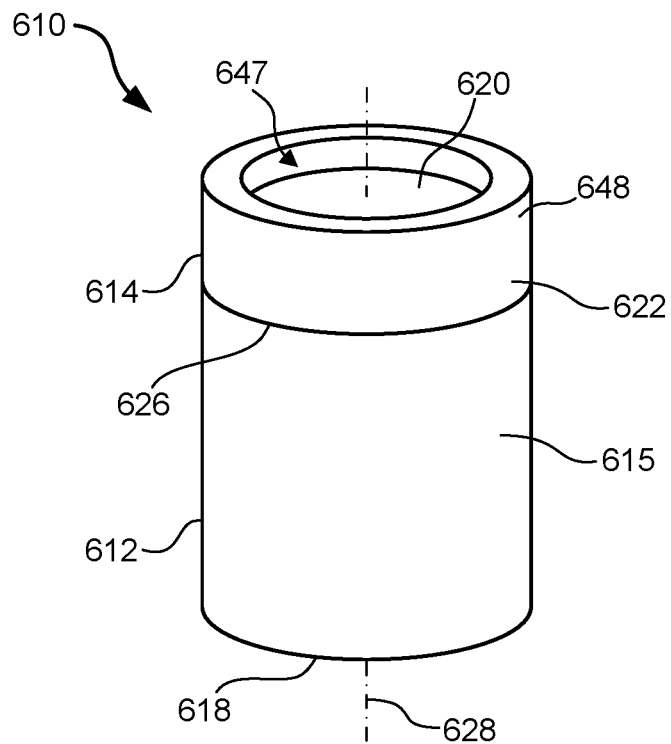
FIG. 14A is a perspective view of an exemplary superabrasive element according to at least one embodiment.
Figure 14B:
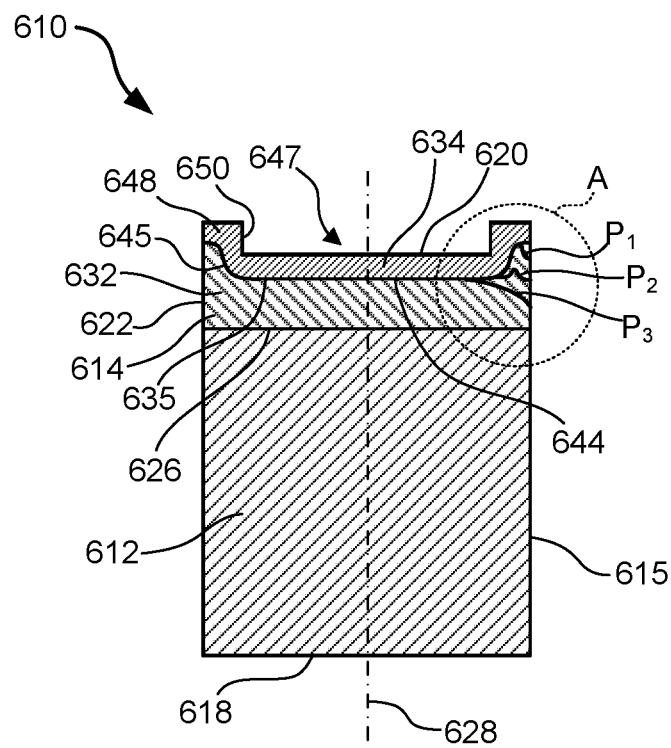
FIG. 14B is a cross-sectional side view of an exemplary superabrasive element according to at least one embodiment.

FIGS. 14A-14F illustrate a superabrasive element 610 according to various embodiments. As shown in FIGS. 14A and 14B, superabrasive element 610 may include a substrate 612 and a superabrasive table 614 together forming a rear surface 618, a superabrasive face 620, and a peripheral surface 615. Superabrasive table 614 is bonded to substrate 612 along interface 626, which may be a planar or nonplanar interface. Prior to exposure to a leaching agent, superabrasive table 614 may comprise an unleached volume of superabrasive material, such as a polycrystalline diamond body containing a metal-solvent catalyst disposed in interstitial regions. The region labeled "A" corresponds to a portion of superabrasive element 610, as illustrated in each of FIGS. 14D-14F, following further processing in accordance with one or more methods described herein.

Superabrasive element 610 may be formed to include a central recess 647 defined in at least a portion of superabrasive table 614. Central recess 647 may be defined by a top portion of superabrasive table 614. According to at least one example, as shown in FIGS. 14A and 14B, central recess 647 may be defined by superabrasive face 620 and a peripheral rim 648 extending circumferentially around at least a portion of central recess 647. According to various embodiments, peripheral rim 648 may slope upward from superabrasive face 620. For example, peripheral rim 648 may comprise a side surface 650 extending upward from superabrasive face 620. In some embodiments, side surface 650 may extend in a direction generally parallel to central axis 628 and/or generally perpendicular to superabrasive face 620. Central recess 647 may comprise any desired shape, without limitation.

Central recess 647 may be formed in superabrasive element 610 using any suitable technique, without limitation. According to at least one embodiment, central recess 647 may be formed during sintering of a diamond particle volume to form superabrasive table 614. For example, a container surrounding the diamond particle volume during sintering, such as a sintering can, may include an interior protrusion, feature, or insert (e.g., h-BN, graphite, a material suitable for use in a polycrystalline diamond sintering gasket, or other suitable material) within the sintering can for molding central recess 647 in superabrasive element 610. In additional embodiments, central recess 647 may be formed following sintering of superabrasive element 610. For example, central recess 647 may be formed by machining, laser ablation, grinding, and/or otherwise removing selected portions of superabrasive table 614 of superabrasive element 610. Portions of superabrasive table 614 may be removed through, for example, milling, grinding, lapping, centerless grinding, turning, drilling, and/or any other suitable mechanical and/or chemical processing technique. Material may be removed from superabrasive table 614 using any other suitable technique, including, by way of example, laser cutting or ablation, electrical discharge machining, electrochemical erosion, water jet cutting, and/or abrasive water jet machining.

As illustrated in FIG. 14B, following exposure to a leaching agent, superabrasive table 614 may include a first volume 632 (i.e., unleached volume) comprising an interstitial material, such as a metal-solvent catalyst, and a second volume 634 (i.e., leached volume) having a lower concentration of the interstitial material than first volume 632. A boundary region 635 may extend between first volume 632 and second volume 634. Boundary region 635 may include amounts of an interstitial material varying between an amount of the interstitial material in first volume 632 and an amount of the interstitial material in second volume 634. In other embodiments, the boundary may be well defined (i.e., boundary region 635 may be thin compared to a depth of second volume 634). As illustrated in FIG. 14B, boundary region 635 may include a central boundary portion 644 and a peripheral boundary portion 645. Peripheral boundary portion 645 may generally slope between superabrasive side surface 622 and central boundary portion 644 at an oblique angle relative to central axis 628. A portion of peripheral boundary portion 645 may follow a generally arcuate profile at an intersection of peripheral boundary portion 645 and central boundary portion 644.

In some embodiments, boundary region 635 may have different profile shapes and/or may intersect different portions of superabrasive side surface 622. For example, as illustrated in FIG. 14B (see also FIG. 14F), boundary region 635 may alternatively be formed to follow profile $P_1$, $P_2$, $P_3$, and/or any other suitable profile, without limitation. Any combination of features, methods, or embodiments described herein (e.g., leachability, masking, removing material prior to and/or following leaching) may be utilized to form various boundary region 635 profiles.

Figure 14C:
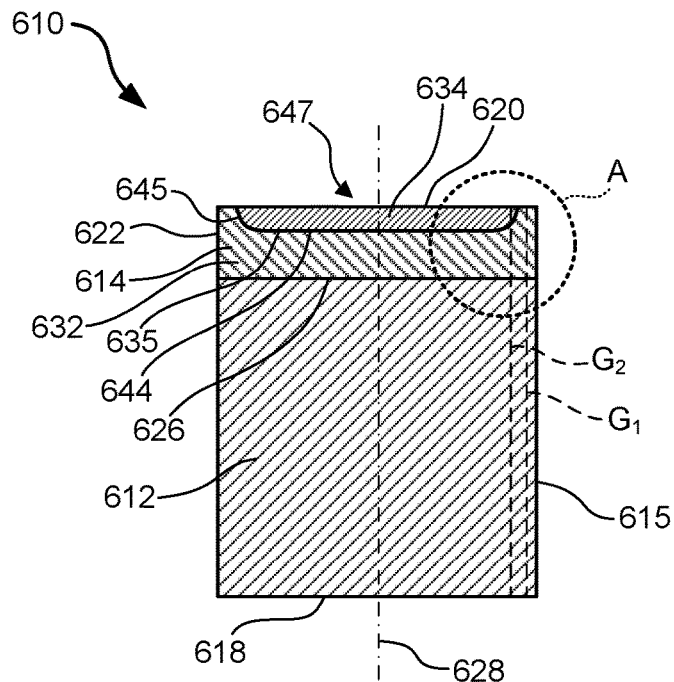
FIG. 14C is a cross-sectional side view of an exemplary superabrasive element according to at least one embodiment.

According to various embodiments, superabrasive element 610 may be further processed using any suitable material removal technique, without limitation. For example, portions of superabrasive element 610 may be smoothed and/or polished using any suitable mechanical, chemical, electrical, and/or laser processing technique, including grinding, lapping, milling, polishing, and/or any other suitable mechanical processing technique. According to at least one embodiment, as illustrated in FIG. 14C, material may be removed from at least regions adjacent to superabrasive face 620. For example, peripheral rim 648 extending from superabrasive face 620, as illustrated in FIGS. 14A and 14B, may be removed so that superabrasive face 620 is the top-most portion of superabrasive element 610. In some embodiments, as shown in FIG. 14C, following removal of peripheral rim 648, superabrasive face 620 may comprise a substantially planar face extending to superabrasive side surface 622. Additionally, peripheral boundary portion 645 may intersect superabrasive face 620. In additional embodiments, peripheral boundary portion 645 may intersect superabrasive side surface 622.

Material may also be removed from at least a region adjacent to peripheral surface 615, such as a region adjacent to superabrasive side surface 622, prior to and/or following removal of material from regions adjacent to superabrasive face 620. For example, FIG. 14C shows exemplary depths $G_1$ and $G_2$ to which material may be removed from peripheral surface 615 of superabrasive element 610.

Figure 14D:
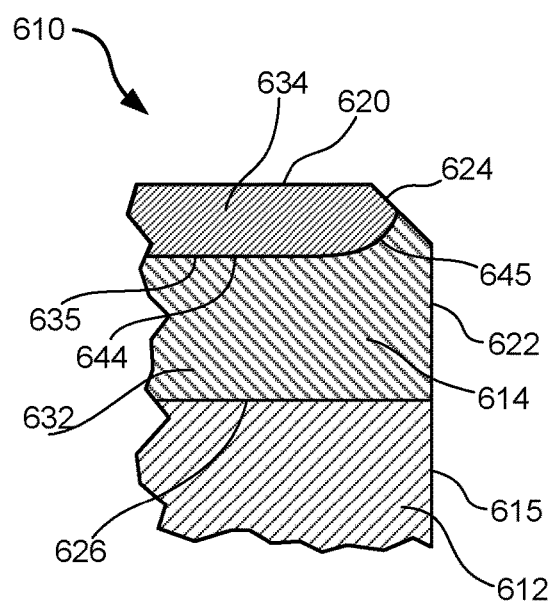
FIG. 14D is a cross-sectional side view of a portion of an exemplary superabrasive element according to at least one embodiment.

According to at least one embodiment, as shown in FIG. 14D, material may be removed from a periphery of superabrasive element 610 to a depth $G_1$. Additionally, a superabrasive chamfer 624 may be formed on a portion of superabrasive table 614 between superabrasive face 620 and superabrasive side surface 622. As illustrated in FIG. 14D, peripheral boundary portion 645 may intersect superabrasive chamfer 624. Peripheral boundary portion 645 may extend from superabrasive chamfer 624 to central boundary portion 644, which may extend generally parallel to superabrasive face 620.

Figure 14E:
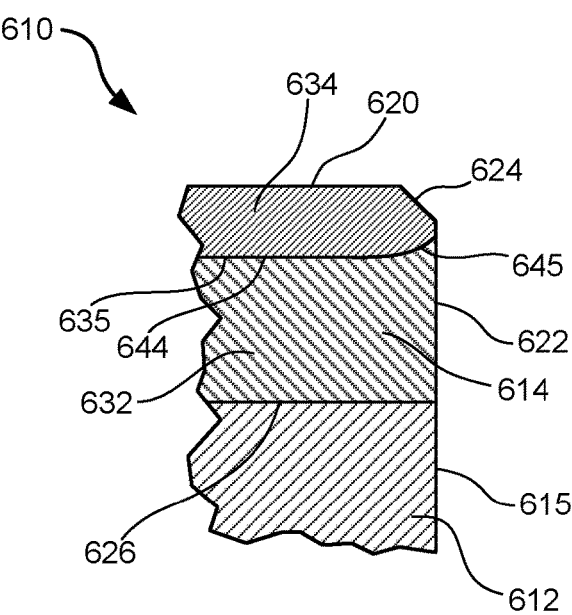
FIG. 14E is a cross-sectional side view of a portion of an exemplary superabrasive element according to at least one embodiment.

According to some embodiments, as shown in FIG. 14E, material may be removed from a periphery of superabrasive element 610 to a depth $G_2$, which is deeper than depth $G_1$ shown in FIG. 14C. Additionally, a superabrasive chamfer 624 may be formed on a portion of superabrasive table 614 between superabrasive face 620 and superabrasive side surface 622. As illustrated in FIG. 14E, peripheral boundary portion 645 may intersect superabrasive side surface 622 at a region below superabrasive chamfer 624. Peripheral boundary portion 645 may extend from superabrasive side surface 622 to central boundary portion 644, which may extend generally parallel to superabrasive face 620.

Figure 14F:
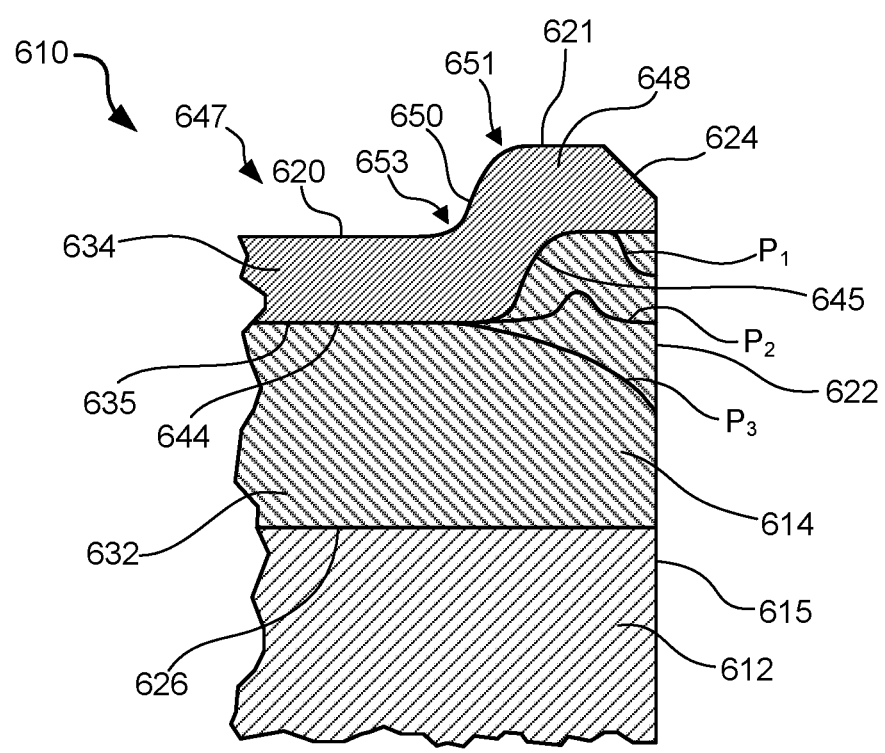
FIG. 14F is a cross-sectional side view of a portion of an exemplary superabrasive element according to at least one embodiment.

In some embodiments, at least a portion of peripheral rim 648 may be left extending from superabrasive face 620 so as to define central recess 647 in superabrasive table 614 following processing of superabrasive element 610. For example, as shown in FIG. 14F, subsequent to leaching of superabrasive element 610, portions of peripheral rim 648 may be processed to form rounded corners 651 and 653 and superabrasive chamfer 624. For example, a convex corner at the intersection of a forward end 621 of peripheral rim 648 and side surface 650 may be processed to form rounded corner 651, and a concave corner at the intersection of superabrasive face 620 and side surface 650 may be processed to form rounded corner 653. Rounded corner 651 and/or rounded corner 653 may be formed by machining, laser ablation, grinding, and/or otherwise removing selected portions of superabrasive table 614 of superabrasive element 610. Portions of superabrasive table 614 may be removed through, for example, milling, grinding, centerless grinding, turning, drilling, and/or any other suitable mechanical and/or chemical processing technique. Material may be removed from superabrasive table 614 using any other suitable technique, including, by way of example, laser cutting or ablation, electrical discharge machining, electro-chemical erosion, water jet cutting, and/or abrasive water jet machining. Additionally, a superabrasive chamfer 624 may be formed on a portion of superabrasive table 614 between superabrasive face 620 and superabrasive side surface 622. In additional embodiments, rounded corners 651 and 653 and/or superabrasive chamfer 624 may be formed on superabrasive table 614 prior to leaching.

As illustrated in FIG. 14F, boundary region 635 may alternatively be formed to follow profile $P_1$, $P_2$, $P_3$, and/or any other suitable profile, without limitation. Any combination of features, methods, or embodiments described herein (e.g., leachability, masking, removing material prior to and/ or following leaching) may be utilized to form various boundary region 635 profiles.

FIGS. 15A-17 show exemplary superabrasive elements 10 coated with masking layers. According to various embodiments, portions of superabrasive element 10 may be coated or otherwise covered with one or more masking layers that prevent and/or delay a leaching agent from contacting selected regions of superabrasive element 10 during leaching. For example, a first masking layer 752 and a second masking layer 754 may be formed on or disposed abutting at least a portion of superabrasive element 10.

Figure 15A:
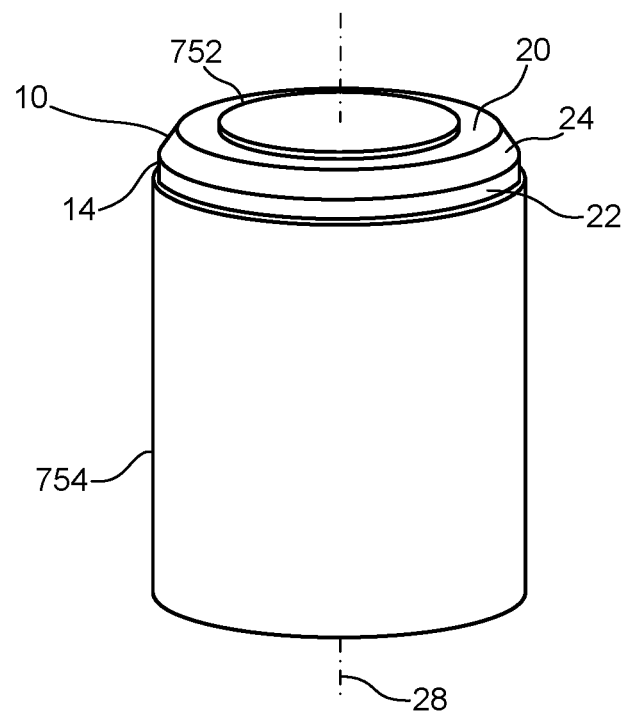
FIG. 15A is a perspective view of an exemplary superabrasive element coated with a masking layer according to at least one embodiment.
Figure 15B:
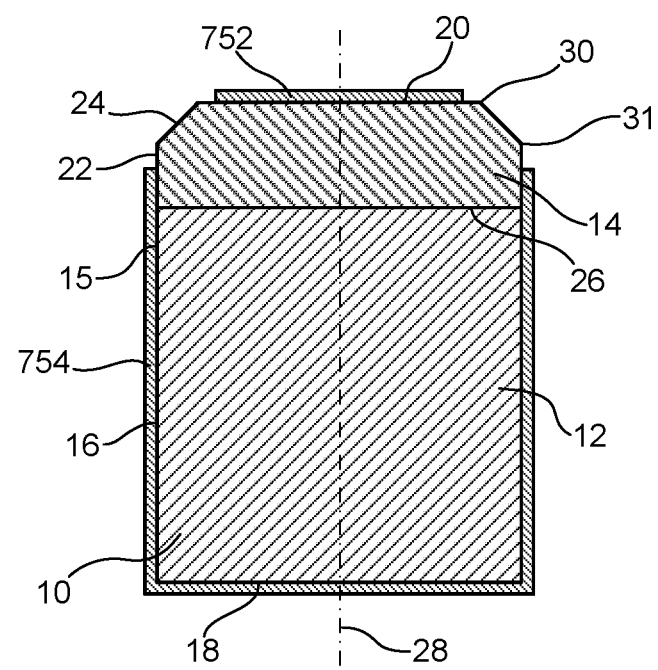
FIG. 15B is a cross-sectional side view of an exemplary superabrasive element coated with a masking layer according to at least one embodiment.
Figure 15C:
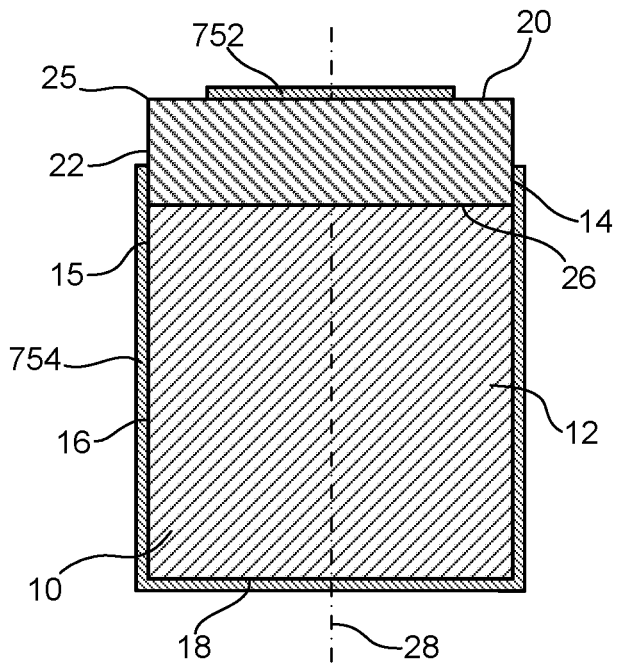
FIG. 15C is a cross-sectional side view of an exemplary superabrasive element coated with a masking layer according to at least one embodiment.
Figure 15D:
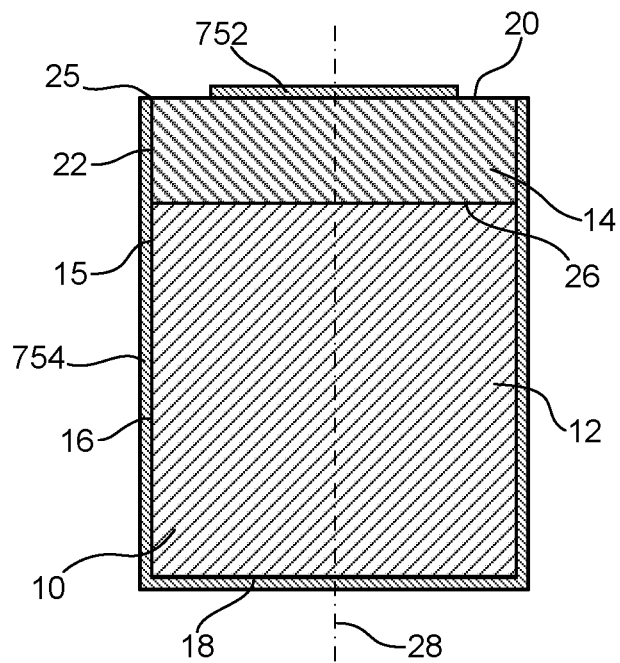
FIG. 15D is a cross-sectional side view of an exemplary superabrasive element coated with a masking layer according to at least one embodiment.
Figure 16:
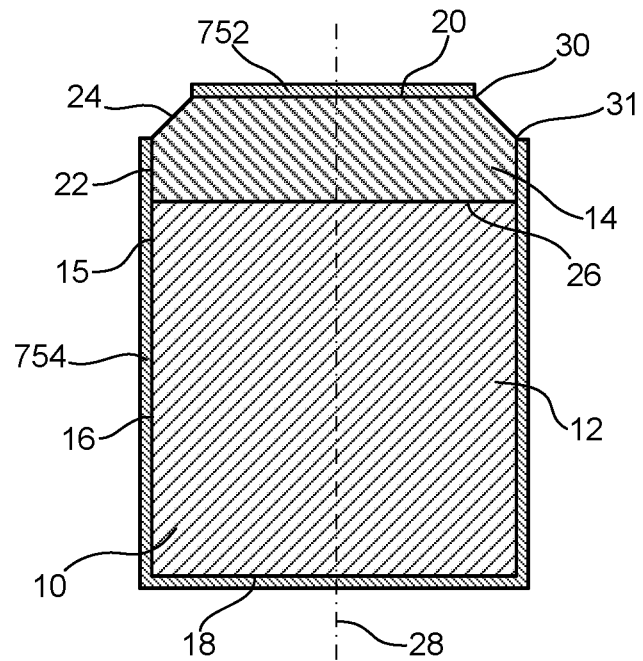
FIG. 16 is a cross-sectional side view of an exemplary superabrasive element coated with a masking layer according to at least one embodiment.

As shown in FIGS. 15A-16, first masking layer 752 may be disposed on at least a portion of superabrasive face 20, such as a central portion of superabrasive face 20 surrounding central axis 28. Second masking layer 754 may be disposed on at least a portion of peripheral surface 15 and rear surface 18 of superabrasive element 10 so as to surround at least a portion of superabrasive table 14 and/or substrate 12. First masking layer 752 and second masking layer 754 may prevent damage to selected portions of superabrasive element 10 and may provide a desired leach profile when superabrasive element 10 is exposed to various leaching agents. For example, first masking layer 752 and/or second masking layer 754 may prevent or delay a leaching solution from contacting certain portions of superabrasive element 10, such as portions of substrate 12, portions of superabrasive table 14, or both, during leaching.

In various examples, first masking layer 752 and/or second masking layer 754 may comprise one or more materials that are substantially inert and/or otherwise resistant and/or impermeable to acids, bases, and/or other reactive compounds present in a leaching solution used to leach superabrasive element 10. Optionally, first masking layer 752 and/or second masking layer 754 may comprise a material that breaks down in the presence of a leaching agent, such as a material that is at least partially degraded (e.g., at least partially dissolved) at a selected rate during exposure to the leaching agent.

In some embodiments, first masking layer 752 and second masking layer 754 may comprise one or more materials exhibiting significant stability during exposure to a leaching agent. According to various embodiments, first masking layer 752 and second masking layer 754 may comprise any suitable material, including metals, alloys, polymers, carbon allotropes, oxides, carbides, glass materials, ceramics, composites, membrane materials (e.g. permeable or semi-permeable materials), and/or any combination of the foregoing, without limitation. First masking layer 752 and second masking layer 754 may be affixed to superabrasive element 10 through any suitable mechanism, without limitation, including, for example, direct bonding, bonding via an intermediate layer, such as an adhesive or braze joint, mechanical attachment, such as mechanical fastening, frictional attachment, and/or interference fitting. In some embodiments, first masking layer 752 and/or second masking layer 754 may comprise a coating or layer of material that is formed on or otherwise adhered to at least a portion of superabrasive element 10. In additional embodiments, first masking layer 752 and/or second masking layer 754 may comprise a material that is temporarily fixed to superabrasive element 10. For example, first masking layer 752 may comprise a polymer member (e.g., o-ring, gasket, disk) that is mechanically held in place (e.g., by clamping) during exposure to a leaching agent.

First masking layer 752 and second masking layer 754 may be formed over any suitable portions superabrasive element 10. For example, as illustrated in FIGS. 15A and 15B, first masking layer 752 may be formed over a central portion of superabrasive face 20 about central axis 28. First masking layer 752 may be separated from superabrasive chamfer 24. For example, first masking layer 752 may not be directly adjacent to and/or in contact with edge 30 formed at the intersection of superabrasive face 20 and superabrasive chamfer 24. Second masking layer 754 may be formed over at least a portion of substrate 12 and superabrasive table 14. For example, as shown in FIGS. 15A and 15B, second masking layer 754 may be formed over rear surface 18 and substrate side surface 16 of substrate 12 so as to substantially surround substrate 12. Additionally, second masking layer 754 may be formed over a portion of superabrasive side surface 22. In some embodiments, second masking layer 754 may also be separated from superabrasive chamfer 24. For example, second masking layer 754 may not be directly adjacent to and/or in contact with edge 31 formed at the intersection of superabrasive side surface 22 and superabrasive chamfer 24.

FIGS. 15C and 15D illustrate masking layers formed over portions of a superabrasive element 10 having an edge 25 formed at the intersection of superabrasive face 20 and superabrasive side surface 22. As illustrated, for example, in FIGS. 15C and 15D, first masking layer 752 may be formed over a central portion of superabrasive face 20 about central axis 28. First masking layer 752 may not be directly adjacent to and/or in contact with edge 25. In additional embodiments, first masking layer 752 may be formed adjacent to and/or in contact with edge 25. Second masking layer 754 may be formed over at least a portion of substrate 12 and superabrasive table 14. For example, as shown in FIGS. 15C and 15D, second masking layer 754 may be formed over rear surface 18 and substrate side surface 16 of substrate 12 so as to substantially surround substrate 12. Additionally, second masking layer 754 may be formed over a portion of superabrasive side surface 22. In some embodiments, second masking layer 754 may not be directly adjacent to and/or in contact with edge 25, as shown in FIG. 15C. In additional embodiments, second masking layer 754 may be disposed adjacent to and/or in contact with edge 25, as shown in FIG. 15D.

According to some embodiments, first masking layer 752 and/or second masking layer 754 may be disposed adjacent to and/or in contact with at least a portion of superabrasive chamfer 24. For example, as illustrated in FIG. 16, first masking layer 752 may substantially cover superabrasive face 20 such that first masking layer 752 is formed adjacent to edge 30 of superabrasive table 14. Additionally, second masking layer 754 may substantially cover superabrasive side surface 22 such that second masking layer 754 is formed adjacent to edge 31 of superabrasive table 14. In some embodiments, first masking layer 752 and/or second masking layer 754 may be formed over at least a portion superabrasive chamfer 24.

The configuration illustrated in FIGS. 15A-16 may enable selective leaching of portions of superabrasive element 10 to form a desired leach profile within superabrasive table 14. For example, a volume of superabrasive table 14 adjacent to an uncovered region between first masking layer 752 and second masking layer 754 may be leached to a greater depth than surrounding portions of superabrasive table 14 covered by first masking layer 752 and second masking layer 754. The configurations illustrated in FIGS. 15A-16 may result in the formation of leached volumes in portions of superabrasive table 14 located near superabrasive chamfer 24 during leaching.

Following exposure to a leaching solution, first masking layer 752 and/or second masking layer 754 may be substantially removed from superabrasive table 14 and/or substrate 12 using any suitable technique, including, for example, lapping, grinding, and/or removal using suitable chemical agents. According to certain embodiments, first masking layer 752 and/or second masking layer 754 may be peeled, cut, ground, lapped, and/or otherwise physically or chemically removed from superabrasive element 10. In some embodiments, following or during removal of first masking layer 752 and/or second masking layer 754, one or more surfaces of superabrasive table 14 and/or substrate 12 may be processed to form a desired surface texture and/or finish using any suitable technique, including, for example, lapping, grinding, and/or otherwise physically and/or chemically treating the one or more surfaces.

Figure 17:
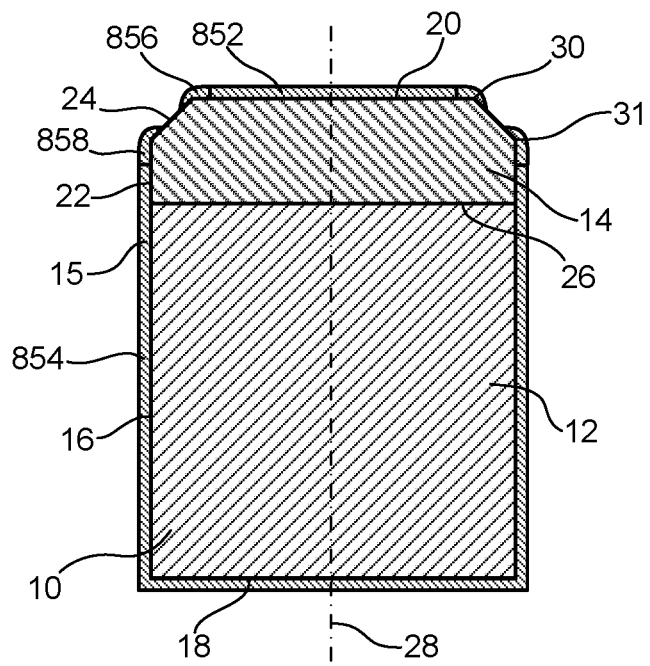
FIG. 17 is a cross-sectional side view of an exemplary superabrasive element coated with masking layers according to at least one embodiment.

FIG. 17 is a cross-sectional side view of an exemplary superabrasive element 10 coated with masking layers according to at least one embodiment. As shown in FIG. 17, superabrasive element 10 may be coated with various masking layers that prevent and/or delay a leaching agent from contacting selected regions of superabrasive element 10 during leaching. According to some embodiments, a first protective masking layer 852 and a second protective masking layer 854 may be formed on at least a portion of superabrasive element 10. Additionally, a first at least partially degrading masking layer 856 and a second at least partially degrading masking layer 858 may be formed on at least a portion of superabrasive element 10.

As shown in FIG. 17, first protective masking layer 852 may be formed on at least a portion of superabrasive face 20, such as a central portion of superabrasive face 20 surrounding central axis 28. Second protective masking layer 854 may be formed on at least a portion of peripheral surface 15 and rear surface 18 of superabrasive element 10 so as to surround at least a portion of superabrasive table 14 and/or substrate 12. First protective masking layer 852 and second protective masking layer 854 may prevent damage to selected portions of superabrasive element 10 and may provide a desired leach profile when superabrasive element 10 is exposed to various reactive agents. For example, first protective masking layer 852 and/or second protective masking layer 854 may prevent or delay a leaching solution from contacting certain portions of superabrasive element 10, such as portions of substrate 12, portions of superabrasive table 14, or both, during leaching. In various examples, first protective masking layer 852 and/or second protective masking layer 854 may comprise one or more materials that are substantially inert and/or otherwise resistant and/or impermeable to acids, bases, and/or other reactive compounds present in a leaching solution used to leach superabrasive element 10.

First degrading masking layer 856 may be formed on at least a portion of superabrasive element 10 adjacent to first protective masking layer 852. For example, first degrading masking layer 856 may be formed on portions of superabrasive face 20 and/or superabrasive chamfer 24. Second degrading masking layer 858 may be formed on at least a portion of superabrasive element 10 adjacent to second protective masking layer 854. For example, second degrading masking layer 858 may be formed on portions of superabrasive side surface 22 and/or superabrasive chamfer 24. As shown in FIG. 17, first degrading masking layer 856 may be separated from second degrading masking layer 858. For example, a space between first degrading masking layer 856 and second degrading masking layer 858 may be formed over at least a portion of superabrasive table 14, such as, for example, at least a portion of superabrasive chamfer 24. Optionally, a space between first degrading masking layer 856 and second degrading masking layer 858 may also be formed over a portion of superabrasive face 20 and/or superabrasive side surface 22.

According to at least one embodiment, first degrading masking layer 856 and/or second degrading masking layer 858 may comprise a material that breaks down in the presence of a leaching agent. First degrading masking layer 856 and/or second degrading masking layer 858 may comprise, for example, a polymeric material that breaks down at a desired rate during exposure to the leaching agent. As first degrading masking layer 856 and second degrading masking layer 858 disintegrate during leaching, portions of superabrasive element 10 that were covered by first degrading masking layer 856 and second degrading masking layer 858 may become exposed to the leaching agent. According to additional embodiments, first degrading masking layer 856 and/or second degrading masking layer 858 may comprise a material that is more permeable to a leaching agent than first protective masking layer 852 and/or second protective masking layer 854. In at least one embodiment, first degrading masking layer 856 and/or second degrading masking layer 858 may be not substantially degrade when exposed to a leaching agent but may be semi-permeable or permeable to the leaching agent.

First protective masking layer 852, second protective masking layer 854, first degrading masking layer 856, and second degrading masking layer 858 may each comprise any suitable material, including metals, alloys, polymers, carbon allotropes, oxides, carbides, glass materials, ceramics, composites, membrane materials (e.g. permeable or semi-permeable materials), and/or any combination of the foregoing, without limitation. Additionally, first protective masking layer 852, second protective masking layer 854, first degrading masking layer 856, and second degrading masking layer 858 may be affixed to superabrasive element 10 through any suitable mechanism, without limitation, including, for example, direct bonding, bonding via an intermediate layer, such as an adhesive or braze joint, mechanical attachment, such as mechanical fastening, frictional attachment, and/or interference fitting.

The configuration illustrated in FIG. 17 may enable selective leaching of portions of superabrasive element 10 to form a desired leach profile within superabrasive table 14. For example, a volume of superabrasive table 14 adjacent to an uncovered region between first degrading masking layer 856 and second degrading masking layer 858 may be leached to a greater depth than surrounding portions of superabrasive table 14. As first degrading masking layer 856 and second degrading masking layer 858 are degraded during leaching, portions of superabrasive table 14 that were covered by first degrading masking layer 856 and second degrading masking layer 858 may subsequently be exposed to the leaching agent. Accordingly, volumes of superabrasive table 14 adjacent to the regions previously covered by first degrading masking layer 856 and second degrading masking layer 858 may be exposed to the leaching agent upon degradation of first degrading masking layer 856 and second degrading masking layer 858.

Accordingly, the regions of superabrasive table 14 that were originally adjacent to first degrading masking layer 856 and second degrading masking layer 858 may have a shallower leach depth than regions of superabrasive table 14 that were adjacent to the uncovered region between first degrading masking layer 856 and second degrading masking layer 858. For example, the configuration illustrated in FIG. 17 may result in a leach profile having a maximum leach depth in the volume of superabrasive table 14 adjacent to a central portion of superabrasive chamfer 24.

Figure 18:
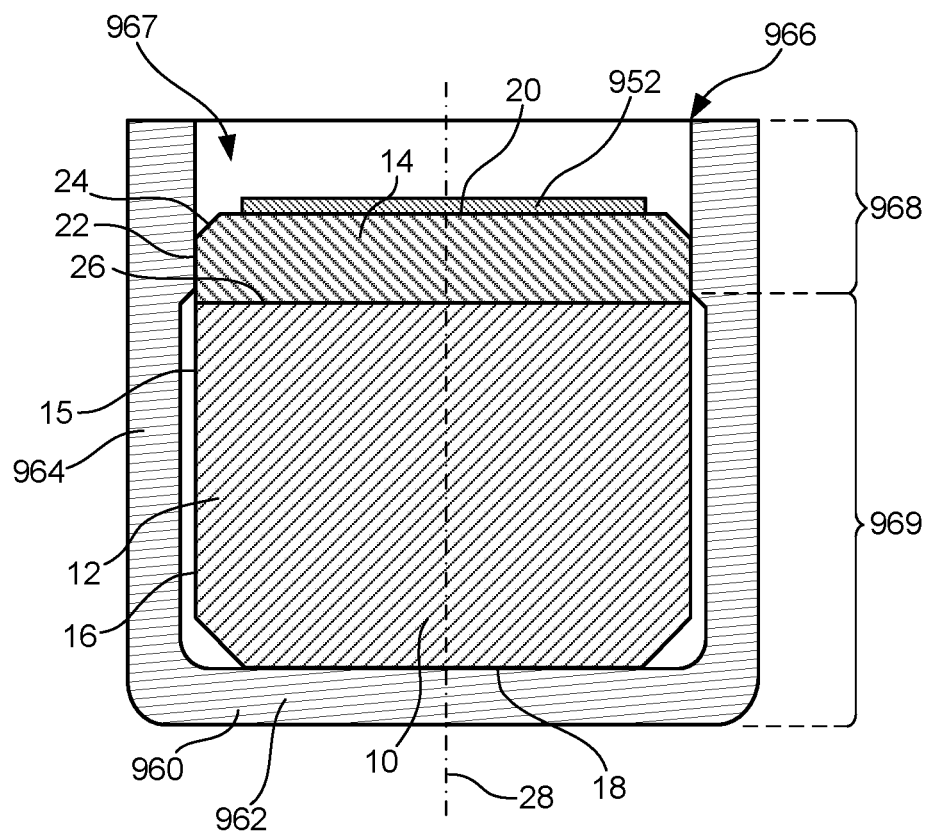
FIG. 18 is a cross-sectional side view of an exemplary superabrasive element positioned within a leaching cup according to at least one embodiment.

FIG. 18 is a cross-sectional side view of an exemplary superabrasive element 10 coated with a masking layer and positioned within a leaching cup 960 according to at least one embodiment. As illustrated in FIG. 18, a masking layer 952 may be formed on or disposed adjacent to at least a portion of superabrasive face 20, such as a central portion of superabrasive face 20 surrounding central axis 28. According to at least one embodiment, masking layer 952 may comprise one or more materials that are substantially inert and/or otherwise resistant and/or impermeable to acids, bases, and/or other reactive compounds present in a leaching solution used to leach superabrasive element 10.

Protective leaching cup 960 may comprise a rear wall 962 and a side wall 964 defining a cavity 967 extending from opening 966. Protective leaching cup 960 may be formed of any suitable material, without limitation. For example, protective leaching cup 960 may comprise a flexible, elastic, malleable, and/or otherwise deformable material configured to surround and/or contact at least a portion of superabrasive element 10. Protective leaching cup 960 may prevent damage to superabrasive element 10 when at least a portion of superabrasive element 10 is exposed to various leaching agents. For example, protective leaching cup 960 may prevent a leaching solution from chemically contacting and/or damaging certain portions of superabrasive element 10, such as portions of substrate 12, portions of superabrasive table 14, or both, during leaching.

In various embodiments, protective leaching cup 960 may comprise one or more materials that are substantially inert and/or otherwise resistant to acids, bases, and/or other reactive components present in a leaching solution used to leach superabrasive element 10. In some embodiments, protective leaching cup 960 may comprise one or more materials exhibiting significant stability at various temperatures and/or pressures, including elevated temperatures and/or pressures used in leaching and/or otherwise processing superabrasive element 10. In some embodiments, protective leaching cup 960 may include one or more polymeric materials, such as, for example, nylon, polytetrafluoroethylene (PTFE), polyethylene, polypropylene, rubber, silicone, and/or other polymers, and/or a combination of any of the foregoing, without limitation. For example, protective leaching cup 960 may comprise PTFE blended with one or more other polymeric materials. Protective leaching cup 960 may be formed using any suitable technique. For example, protective leaching cup 960 may comprise a polymeric material that is shaped through a molding process (e.g., injection molding, blow molding, compression molding, drawing, etc.) and/or a machining process (e.g., grinding, lapping, milling, boring, etc.).

In at least one embodiment, protective leaching cup 960 may comprise a material that is configured to conform to an exterior portion of superabrasive element 10. For example, protective leaching cup 960 may include a malleable and/or elastically deformable material that conforms to an exterior shape of a portion of superabrasive table 14 abutting protective leaching cup 960, such as superabrasive side surface 22. According to some embodiments, protective leaching cup 960 may comprise a material, such as a polymeric material (e.g., elastomer, rubber, plastic, etc.), that conforms to surface imperfections of superabrasive side surface 22 and/or substrate side surface 16. Heat and/or pressure may be applied to protective leaching cup 960 to cause a portion of protective leaching cup 960 abutting superabrasive side surface 22 to more closely conform to superabrasive side surface 22. Accordingly, a seal between superabrasive side surface 22 and a portion of protective leaching cup 960 abutting superabrasive side surface 22 may be improved, thereby inhibiting passage of a leaching agent between superabrasive element 10 and protective leaching cup 960.

Protective leaching cup 960 may comprise any suitable size, shape and/or geometry, without limitation. In at least one embodiment, portions of protective leaching cup 960 may have a substantially cylindrical outer periphery surrounding central axis 28. Rear wall 962 and side wall 964 may define a cavity 967 within protective leaching cup 960. Cavity 967 may be shaped to surround at least a portion of superabrasive element 10. Opening 966 may be defined in a portion of protective leaching cup 960 opposite rear wall 962 such that cavity 967 extends between opening 966 and rear wall 962. According to various embodiments, protective leaching cup 960 may comprise a seal region 968 and an encapsulating region 969. Seal region 968 may be adjacent to opening 966 and encapsulating region 969 may extend from seal region 968 and may include rear wall 962. According to some embodiments, a portion of side wall 964 in seal region 968 may have an inner diameter that is less than a portion of side wall 964 in encapsulating region 969.

When superabrasive element 10 is positioned within protective leaching cup 960, at least a portion of superabrasive element 10, such as superabrasive table 14 and/or substrate 12, may be positioned adjacent to and/or contacting a portion of protective leaching cup 960. For example, at least a portion of seal region 968 of protective leaching cup 960 may be configured to contact at least a portion of peripheral surface 15 of superabrasive element 10, forming a seal between protective leaching cup 960 and superabrasive element 10 that is partially or fully impermeable to various fluids, such as a leaching agent. As shown in FIG. 18, superabrasive element 10 may be positioned within protective leaching cup 960 so that at least a portion of seal region 968 of protective leaching cup 960 contacts and forms a seal with at least a portion of peripheral surface 15, such as at least a portion of superabrasive side surface 22 and/or at least a portion of substrate side surface 16.

The configuration illustrated in FIG. 18 may enable selective leaching of portions of superabrasive element 10 to form a desired leach profile within superabrasive table 14. For example, a volume of superabrasive table 14 adjacent to an uncovered region between masking layer 952 and seal region 968 of protective leaching cup 960 may be leached to a greater depth than surrounding portions of superabrasive table 14 covered by masking layer 952 or seal region 968. Leaching such a configuration may result in the formation of leached volumes in portions of superabrasive table 14 located near superabrasive chamfer 24 during leaching.

FIGS. 19-27 illustrate superabrasive elements having various leach profiles according to some embodiments. While the superabrasive elements shown in FIGS. 19-27 are each illustrated as comprising a superabrasive table detached from a substrate, a superabrasive element having a superabrasive table joined to a substrate (see, e.g., FIGS. 1 and 2) may be configured in the same or similar manner as described herein with reference to FIGS. 19-27. The configurations illustrated in each of FIGS. 19-27 may reduce or eliminate undesired spalling, cracking, and/or thermal damage of the illustrated superabrasive elements during drilling.

Figure 19:
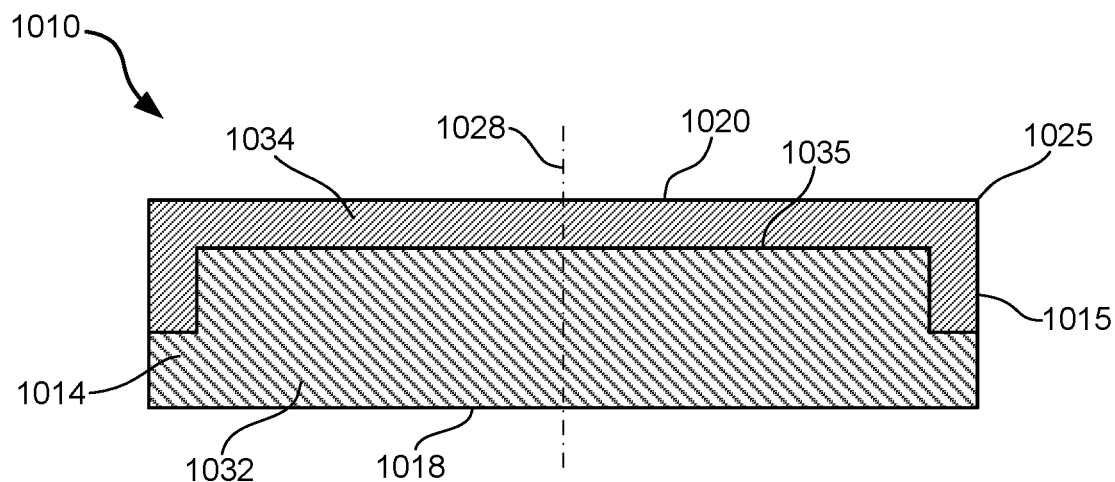
FIG. 19 is a cross-sectional side view of an exemplary superabrasive element according to at least one embodiment.

FIG. 19 shows an exemplary superabrasive element 1010 comprising a superabrasive table 1014 having a rear surface 1018, a superabrasive face 1020, and a peripheral surface 1015. Superabrasive element 1010 may also comprise an edge 1025 (i.e., sloped or angled) and/or any other suitable surface shape at the intersection of peripheral surface 1015 and superabrasive face 1020, including, without limitation, an arcuate surface (e.g., a radius, an ovoid shape, or any other rounded shape), a sharp edge, multiple chamfers/radii, a honed edge, and/or combinations of the foregoing. Peripheral surface 1015 of superabrasive element 1010 may radially surround a central axis 1028 of superabrasive element 1010.

Superabrasive element 1010 may include a first volume 1032 comprising an interstitial material and a second volume 1034 having a lower concentration of the interstitial material than first volume 1032. Portions of superabrasive table 1014, such as second volume 1034, may be leached or otherwise processed to remove interstitial materials, such as a metal-solvent catalyst, from the interstitial regions. A boundary region 1035 may extend between first volume 1032 and second volume 1034 so as to border at least a portion of first volume 1032 and second volume 1034. Boundary region 1035 may include amounts of an interstitial material varying between an amount of the interstitial material in first volume 1032 and an amount of the interstitial material in second volume 1034. In other embodiments, the boundary may be well defined (i.e., boundary region 1035 may be thin compared to a depth of second volume 1034).

As shown in FIG. 19, first volume 1032 may extend between rear surface 1018 and boundary region 1035. Second volume 1034 may be formed adjacent to a substantial portion of superabrasive face 1020. For example, as shown in FIG. 19, second volume 1034 may extend along the entire diameter of second volume 1024. Boundary region 1035 bordering second volume 1034 may extend in a direction generally parallel to superabrasive face 1020. Additionally, a portion of second volume 1034 may extend along at least a portion of peripheral surface 1015 so as to radially surround at least a portion of first volume 1032. A portion of boundary region 1035 may extend in a direction generally parallel to peripheral surface 1015. According to some embodiments, boundary region 1035 may have a substantially consistent thickness along peripheral surface 1015 and/or along superabrasive face 1020.

Figure 20:
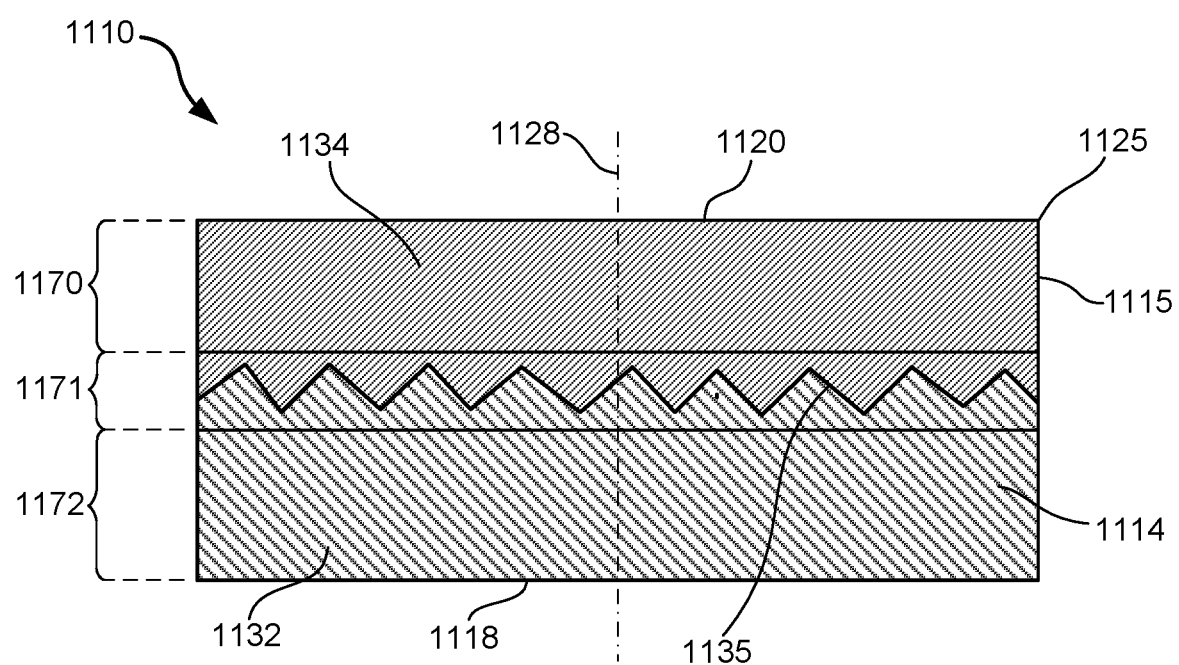
FIG. 20 is a cross-sectional side view of an exemplary superabrasive element according to at least one embodiment.

FIG. 20 shows an exemplary superabrasive element 1110 comprising a superabrasive table 1114 having a rear surface 1118, a superabrasive face 1120, and a peripheral surface 1115. Superabrasive element 1110 may also comprise an edge 1125 at the intersection of peripheral surface 1115 and superabrasive face 1120. Peripheral surface 1115 of superabrasive element 1110 may radially surround a central axis 1128 of superabrasive element 1110.

Superabrasive element 1110 may include a first volume 1132 comprising an interstitial material and a second volume 1134 having a lower concentration of the interstitial material than first volume 1132. Portions of superabrasive table 1114, such as second volume 1134 may be leached or otherwise processed to remove interstitial materials, such as a metal-solvent catalyst, from the interstitial regions. A boundary region 1135 may extend between first volume 1132 and second volume 1134 so as to border at least a portion of first volume 1132 and second volume 1134. Boundary region 1135 may include amounts of an interstitial material varying between an amount of the interstitial material in first volume 1132 and an amount of the interstitial material in second volume 1134.

As shown in FIG. 20, first volume 1132 may extend between rear surface 1118 and boundary region 1135. Second volume 1134 may be formed adjacent to a substantial portion of superabrasive face 1120 and may extend between boundary region 1135 and superabrasive face 1120. Boundary region 1135 bordering second volume 1134 may extend along an undulating, zig-zag, and/or any/other suitable non-linear profile. Superabrasive element 1110 may be leached and/or otherwise processed in any suitable manner to form second volume 1134.

Superabrasive element 1110 may comprise distinct layers, including a more leachable layer 1170, a less leachable layer 1172, and a composite layer 1171. More leachable layer 1170 may comprise a superabrasive material, such as polycrystalline diamond, that is susceptible to leaching at a faster rate than a superabrasive material forming less leachable layer 1172. Various factors, such as, for example, diamond grain size, interstitial materials, processing conditions (temperature, pressure, etc.), and/or porosity may be selected to form each of more leachable layer 1170 and less leachable layer 1172 having desired leaching characteristics. Examples of superabrasive elements comprising more leachable layers and less leachable layers may be found in U.S. Patent Publication No. 2011/0023375, the disclosure of which is incorporated herein, in its entirety, by this reference. Composite layer 1171 may comprise both portions of the superabrasive material forming more leachable layer 1170 and portions of the superabrasive material forming less leachable layer 1172. Such materials forming each of more leachable layer 1170 and less leachable layer 1172 may be intermixed in any suitable manner in composite layer 1171. For example, as illustrated in FIG. 20, composite layer 1171 may include an undulating or otherwise uneven boundary region 1135 extending between the superabrasive materials forming each of more leachable layer 1170 and less leachable layer 1172, respectively. Composite layer 1171 may serve to distribute or transfer a stress gradient between the leached and unleached portions (i.e. more leachable layer 1170 and less leachable layer 1172) of superabrasive element 1110.

Figure 21:
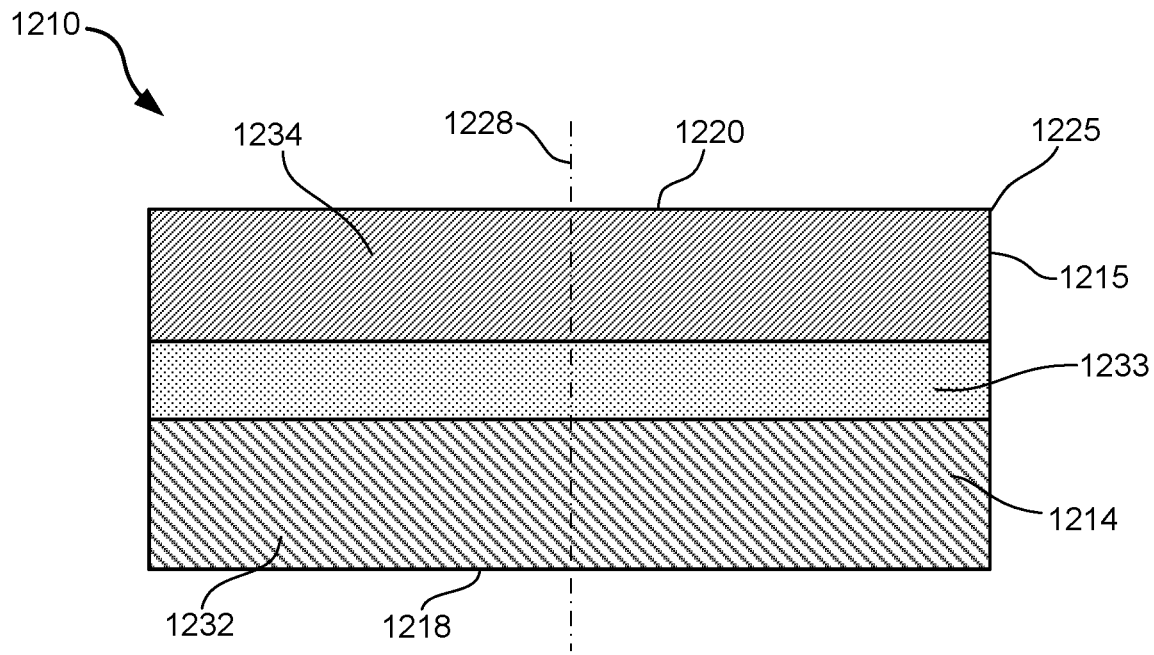
FIG. 21 is a cross-sectional side view of an exemplary superabrasive element according to at least one embodiment.

FIG. 21 illustrates an exemplary superabrasive element 1210 comprising a superabrasive table 1214 having a rear surface 1218, a superabrasive face 1220, and a peripheral surface 1215. Superabrasive element 1210 may also comprise an edge 1225 at the intersection of peripheral surface 1215 and superabrasive face 1220. Peripheral surface 1215 of superabrasive element 1210 may radially surround a central axis 1228 of superabrasive element 1210.

Superabrasive element 1210 may include a first volume 1232 comprising an interstitial material, a second volume 1233 having a lower concentration of the interstitial material than first volume 1232, and a third volume 1234 having a lower concentration of the interstitial material than second volume 1233. Portions of superabrasive table 1214, such as third volume 1234 and second volume 1233 may be leached or otherwise processed to remove interstitial materials, such as a metal-solvent catalyst, from the interstitial regions. As shown in FIG. 21, first volume 1232 may be located adjacent to rear surface 1218, third volume 1234 may be located adjacent to superabrasive face 1220, and second volume 1233 may be located between first volume 1232 and third volume 1234.

Superabrasive element 1210 may be leached and/or otherwise processed in any suitable manner to form second volume 1233 and third volume 1234. According to at least one embodiment, superabrasive element 1210 may be exposed to a leaching agent for a length of time sufficient to substantially leach an interstitial material, such as a metal-solvent catalyst, from both third volume 1234 and second volume 1233. Subsequently, an interstitial material may be introduced into second volume 1233 using any suitable technique. For example, following leaching, superabrasive element 1210 may be heat treated to extrude or otherwise remove at least some of a solvent-metal catalyst and/or other metals or interstitial materials from first volume 1232 to second volume 1233. As the metal-solvent catalyst flows from first volume 1232 into second volume 1233, the metal-solvent catalyst may at least partially occupy interstitial spaces within second volume 1233.

Following the heated extrusion of the metal-solvent catalyst into second volume 1233, superabrasive element 1210 may be cooled to solidify the metal-solvent catalyst within superabrasive element 1210. The concentration of metal-solvent catalyst in second volume 1233 may be lower than the metal-solvent catalyst concentration in the unleached first volume 1232 and higher than the metal-solvent catalyst concentration in the leached third volume 1234. Second volume 1233 may serve as a transition for the stress gradient between the leached and unleached portions (i.e. third volume 1234 and first volume 1232) of superabrasive element 1110, thereby reducing or eliminating undesired spalling, cracking, and/or thermal damage of the illustrated superabrasive elements during drilling.

Generally, combinations of the features, methods, and embodiments described herein may be utilized to create a desired size and/or shape of the leached region of a superabrasive element. For example, superabrasive elements may be processed according to any combination of features, methods, or embodiments described herein (e.g., leachability, masking, removing material prior to and/or following leaching). In some embodiments, superabrasive a superabrasive element may be leached and/or processed according to one or more methods described herein, and subsequently leached and/or processed at least one additional time to obtain a desired leach profile.

Figure 22:
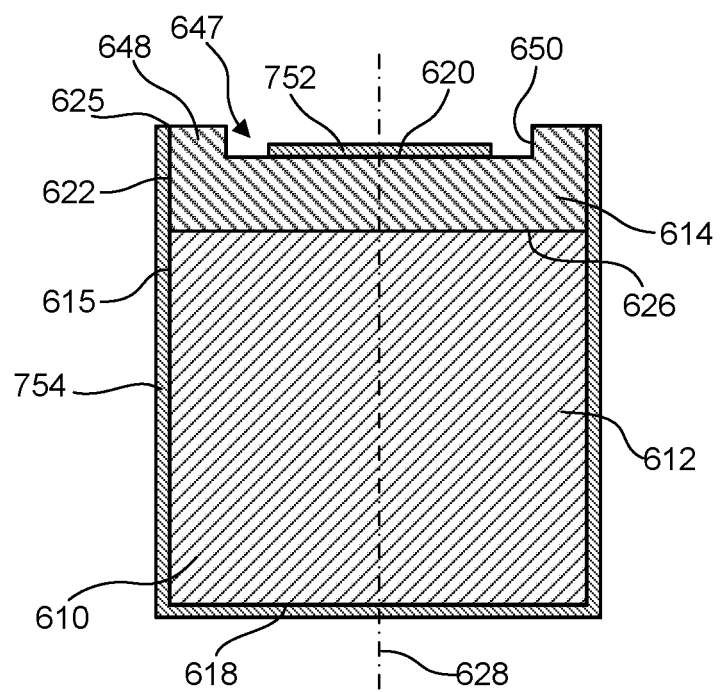
FIG. 22 is a cross-sectional side view of an exemplary superabrasive element coated with a masking layer according to at least one embodiment.

FIG. 22 illustrates an exemplary superabrasive element 610 that is processed according to a combination of features, methods, and/or embodiments described herein. Superabrasive element 610 may comprise a superabrasive table 614 having a rear surface 618, a superabrasive face 620, and a peripheral surface 615 (see, e.g., superabrasive element 610 illustrated in FIG. 14A). Superabrasive table 614 is bonded to substrate 612 along interface 626, which may be a planar or nonplanar interface. Superabrasive element 610 may be formed to include a central recess 647 defined in at least a portion of superabrasive table 614. According to at least one example, as shown in FIG. 22, central recess 647 may be defined by superabrasive face 620 and a peripheral rim 648 extending circumferentially around at least a portion of central recess 647. Peripheral rim 648 may comprise a side surface 650 extending upward from superabrasive face 620.

One or more masking layers (see, e.g., masking layers illustrated in FIGS. 15A-18) may be used to cover portions of superabrasive element 610 so as to prevent and/or delay a leaching agent from contacting selected regions of superabrasive element 10 during leaching, thereby creating a desired size and/or shape of the leached region of superabrasive table 614. For example, as shown in FIG. 22, a first masking layer 752 and a second masking layer 754 may be formed on or disposed abutting at least a portion of superabrasive element 610. According to at least one embodiment, first masking layer 752 may be disposed on at least a portion of superabrasive face 620 within central recess 647. Second masking layer 754 may be disposed on at least a portion of peripheral surface 615 and rear surface 618 of superabrasive element 610 so as to surround at least a portion of superabrasive table 614 and/or substrate 612. For example, as shown in FIG. 22, second masking layer 754 may extend to an upper edge 625 of peripheral rim 648. According to various embodiments, first masking layer 752 and second masking layer 754 may be disposed in any other suitable configuration over any other desired regions of superabrasive element 610, without limitation.

Following exposure to a leaching solution, first masking layer 752 and/or second masking layer 754 may be substantially removed from superabrasive table 14 and/or substrate 12 using any suitable technique, including, for example, lapping, grinding, and/or removal using suitable chemical agents. According to certain embodiments, first masking layer 752 and/or second masking layer 754 may be peeled, cut, ground, lapped, and/or otherwise physically or chemically removed from superabrasive element 10. In some embodiments, following or during removal of first masking layer 752 and/or second masking layer 754, one or more surfaces of superabrasive table 14 and/or substrate 12 may be processed to form a desired surface texture and/or finish using any suitable technique, including, for example, lapping, grinding, and/or otherwise physically and/or chemically treating the one or more surfaces.

According to various embodiments, superabrasive element 610 may be further processed (either prior to or following removal of first masking layer 752 and/or second masking layer 754) using any suitable material removal technique, without limitation. For example, portions of superabrasive element 610 may be smoothed and/or polished using any suitable mechanical, chemical, electrical, and/or laser processing technique, including grinding, lapping, milling, polishing, and/or any other suitable mechanical processing technique. According to at least one embodiment, peripheral rim 648 may be removed so that superabrasive face 620 is the top-most portion of superabrasive element 610 and/or a chamfer may be formed on a portion of superabrasive table 614 between superabrasive face 620 and superabrasive side surface 622 (see, e.g., FIGS. 14C-14F).

FIGS. 23A-25 illustrate exemplary superabrasive elements 1310 having leached volumes formed adjacent to chamfered portions of the superabrasive elements 1310. Superabrasive element 1310 may include a substrate 1312 and a superabrasive table 1314 forming a rear surface 1318, a superabrasive face 1320, and a peripheral surface 1315. Superabrasive table 1314 may also form a chamfer 1324 and one or more cutting edges, such as edge 1330 and edge 1331, adjacent to chamfer 1324.

Superabrasive table 1314 may include a first volume 1332 comprising an interstitial material and a second volume 1334 having a lower concentration of the interstitial material than first volume 1332. Portions of superabrasive table 1314, such as second volume 1334 may be leached or otherwise processed to remove interstitial materials, such as a metal-solvent catalyst, from the interstitial regions. Second volume 1334 may be created during leaching of superabrasive table 1314 according to any suitable leaching technique. For example, portions of superabrasive element 1310 may be masked and/or otherwise covered during at least part of a leaching process to prevent a leaching solution from contacting selected portions of superabrasive element 1310 (see, e.g., FIGS. 15A-18). In some embodiments, superabrasive element 1310 may first be leached, after which portions of superabrasive element 1310 may be removed to modify the shape of first volume 1332 and/or second volume 1334 according to one or more methods discussed herein (see, e.g., FIGS. 7-14B).

A boundary region 1335 may extend between first volume 1332 and second volume 1334. Boundary region 1335 may include amounts of metal-solvent catalyst varying between an amount of metal-solvent catalyst in first volume 1332 and an amount of metal-solvent catalyst in second volume 1334. As illustrated in FIGS. 23A-25, first volume 1332 may be located adjacent to a central portion of superabrasive face 1320. For example, first volume 1332 may be disposed about central axis 1328. First volume 1332 may extend between rear surface 1318 and superabrasive face 1320 with first volume 1332 forming at least a portion of superabrasive face 1320 such that at least a central portion of superabrasive face 1320 located about central axis 1328 is defined by first volume 1332.

Second volume 1334 may be formed adjacent to superabrasive chamfer 1324 so as to surround at least a portion of first volume 1332. For example, second volume 1334 may be generally formed in an annular shape surrounding at least a portion of first volume 1332. First volume 1332, second volume 1334, and boundary region 1335 may be formed to any suitable size and/or shape within superabrasive table 1314, without limitation. For example, boundary region 1335 may extend along a generally straight, angular, curved, and/or variable (e.g., zigzag, undulating) profile between first volume 1332 and second volume 1334.

Figure 23A:
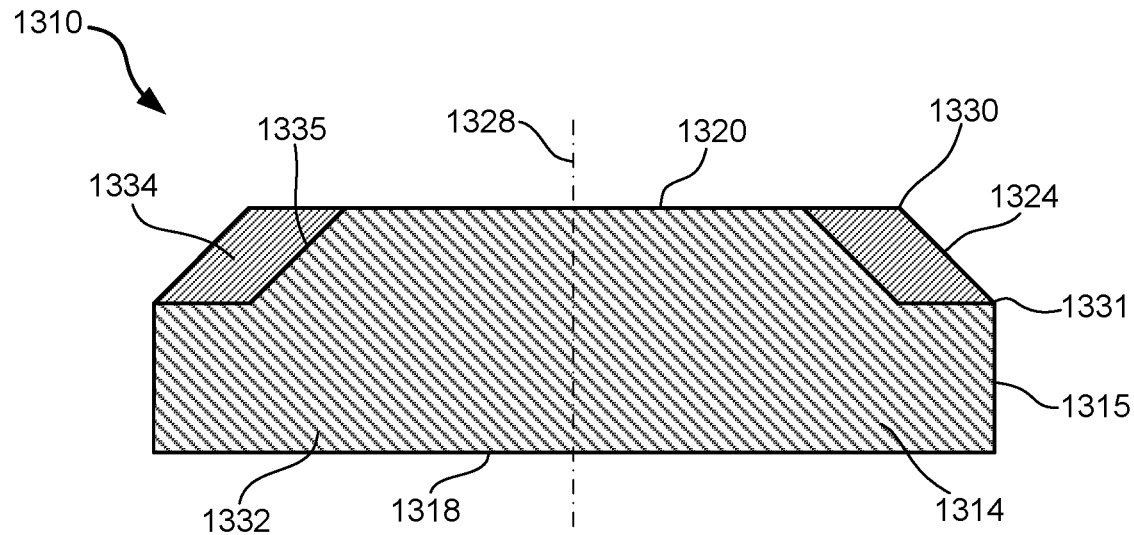
FIG. 23A is a cross-sectional side view of an exemplary superabrasive element according to at least one embodiment.
Figure 23B:
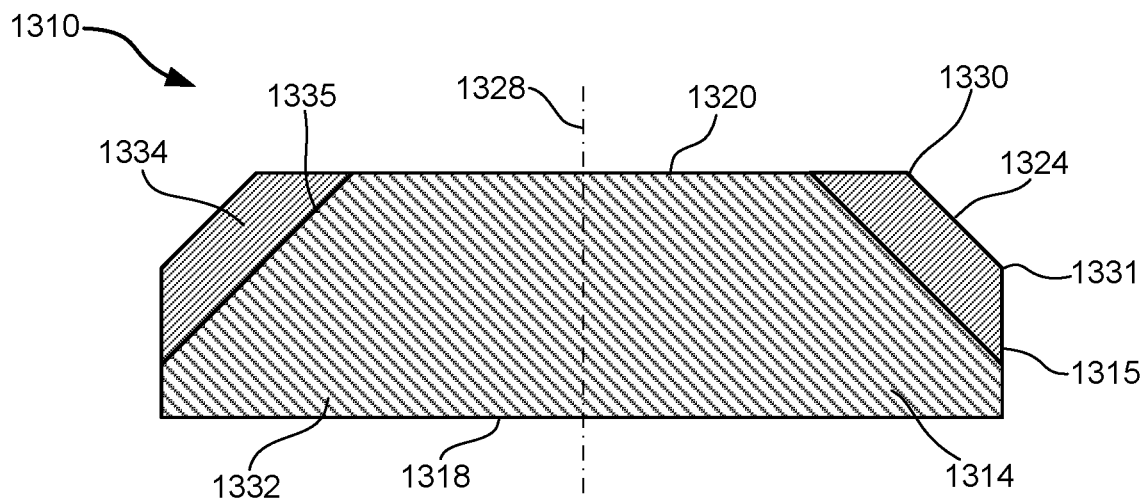
FIG. 23B is a cross-sectional side view of an exemplary superabrasive element according to at least one embodiment.

As shown in FIG. 23A, second volume 1334 may be formed adjacent to superabrasive chamfer 1324 and superabrasive face 1320, and boundary region 1335 may extend from superabrasive face 1320 to edge 1331 formed at the intersection of superabrasive chamfer 1324 and peripheral surface 1315, with a portion of boundary region 1335 extending generally parallel to superabrasive chamfer 1324. According to some embodiments, as shown in FIG. 23B, second volume 1334 may be formed adjacent to superabrasive chamfer 1324, superabrasive face 1320, and peripheral surface 1315, and boundary region 1335 may extend generally parallel to superabrasive chamfer 1324 from superabrasive face 1320 to peripheral surface 1315.

Figure 24:
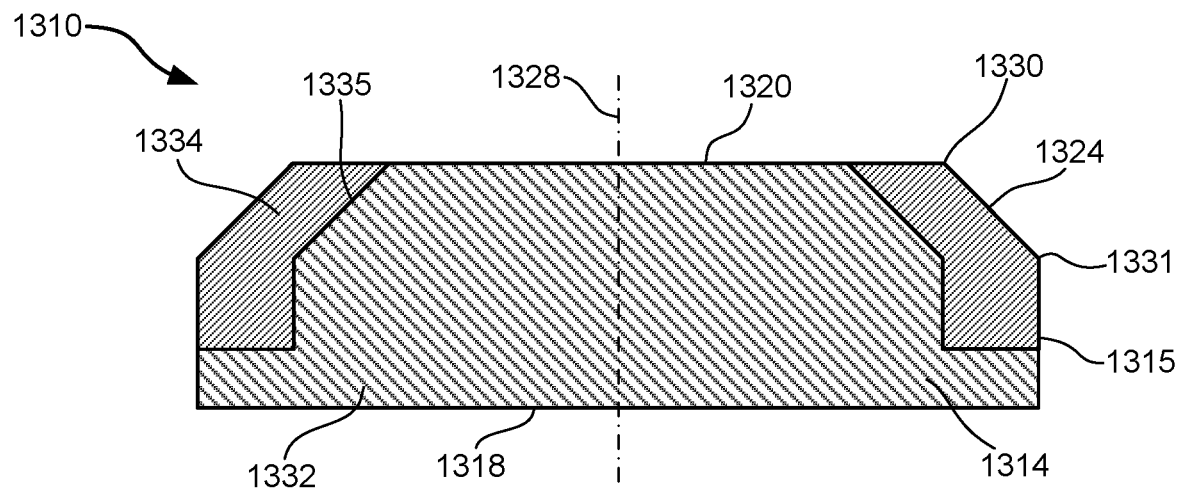
FIG. 24 is a cross-sectional side view of an exemplary superabrasive element according to at least one embodiment.

According to various embodiments, as shown in FIG. 24, second volume 1334 may be formed adjacent to superabrasive chamfer 1324, superabrasive face 1320, and peripheral surface 1315, and boundary region 1335 may extend from superabrasive face 1320 to peripheral surface 1315, with a portion of boundary region 1335 extending generally parallel to superabrasive chamfer 1324 and another portion of boundary region 1335 extending generally parallel to peripheral surface 1315.

Figure 25:
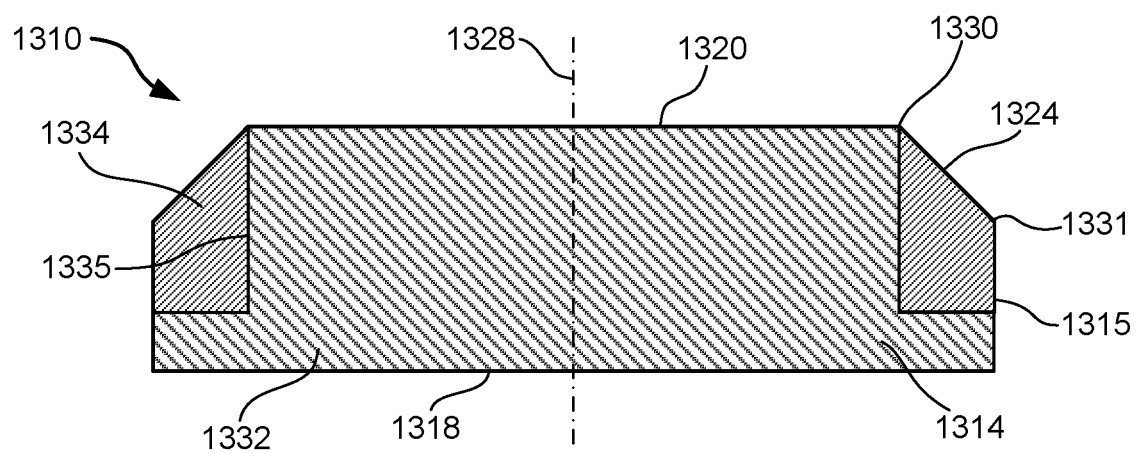
FIG. 25 is a cross-sectional side view of an exemplary superabrasive element according to at least one embodiment.

According to some embodiments, as shown in FIG. 25, second volume 1334 may be formed adjacent to superabrasive chamfer 1324 and peripheral surface 1315, and boundary region 1335 may extend from edge 1330 formed at the intersection of superabrasive chamfer 1324 and superabrasive face 1320 to peripheral surface 1315, with a portion of boundary region 1335 extending generally parallel to peripheral surface 1315.

Figure 26A:
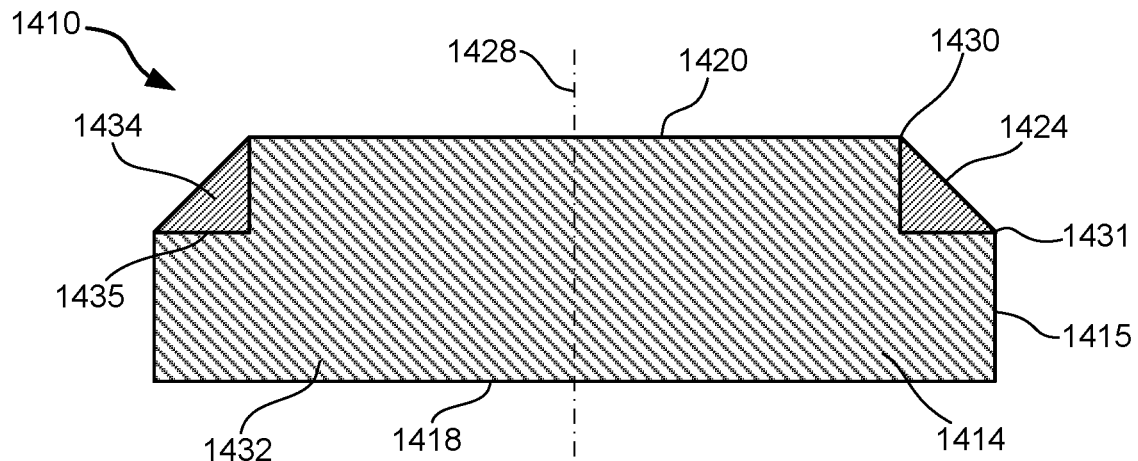
FIG. 26A is a cross-sectional side view of an exemplary superabrasive element according to at least one embodiment.
Figure 26B:
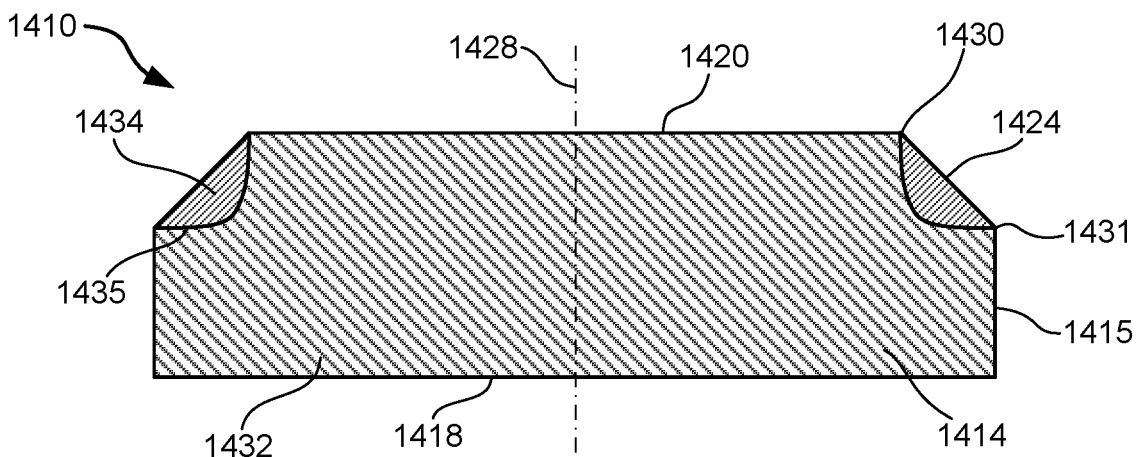
FIG. 26B is a cross-sectional side view of an exemplary superabrasive element according to at least one embodiment.

FIGS. 26A and 26B illustrate exemplary superabrasive elements 1410 having leached volumes formed adjacent to chamfered portions of the superabrasive elements 1410. Superabrasive element 1410 may include a substrate 1412 and a superabrasive table 1414 forming a rear surface 1418, a superabrasive face 1420, and a peripheral surface 1415. Superabrasive table 1414 may also form a chamfer 1424 and one or more cutting edges, such as edge 1430 and edge 1431, adjacent to chamfer 1424.

Superabrasive table 1414 may include a first volume 1432 comprising an interstitial material and a second volume 1434 having a lower concentration of the interstitial material than first volume 1432. Portions of superabrasive table 1414, such as second volume 1434 may be leached or otherwise processed to remove interstitial materials, such as a metal-solvent catalyst, from the interstitial regions. Second volume 1434 may be created during leaching of superabrasive table 1414 according to any suitable leaching technique. For example, portions of superabrasive element 1410 may be masked and/or otherwise covered during at least part of a leaching process to prevent a leaching solution from contacting selected portions of superabrasive element 1410 (see, e.g., FIGS. 15A-18). In some embodiments, superabrasive element 1410 may first be leached, after which portions of superabrasive element 1410 may be removed to modify the shape of first volume 1432 and/or second volume 1434 according to one or more methods discussed herein (see, e.g., FIGS. 7-14B).

A boundary region 1435 may extend between first volume 1432 and second volume 1434. Boundary region 1435 may include amounts of metal-solvent catalyst varying between an amount of metal-solvent catalyst in first volume 1432 and an amount of metal-solvent catalyst in second volume 1434. As illustrated in FIGS. 26A and 26B, first volume 1432 may be located adjacent to a central portion of superabrasive face 1420. For example, first volume 1432 may be disposed about central axis 1428. First volume 1432 may extend between rear surface 1418 and superabrasive face 1420, with first volume 1432 forming substantially all of superabrasive face 1420 such that a central portion of superabrasive face 1420 located about central axis 1428 is defined by first volume 1432. Additionally, first volume 1432 may form substantially all of peripheral surface 1415.

Second volume 1434 may be formed adjacent to superabrasive chamfer 1424 so as to surround at least a portion of first volume 1432. For example, second volume 1434 may be generally formed in an annular shape surrounding at least a portion of first volume 1432. First volume 1432, second volume 1434, and boundary region 1435 may be formed to any suitable size and/or shape within superabrasive table 1414, without limitation. For example, boundary region 1435 may extend along a generally straight, angular, curved, and/or variable (e.g., zigzag, undulating) profile between first volume 1432 and second volume 1434.

As shown in FIGS. 26A and 26B, second volume 1434 may be formed adjacent to superabrasive chamfer 1424 and boundary region 1435 may extend from edge 1430 to edge 1431, which are each adjacent to superabrasive chamfer 1424. Boundary region 1435 may extend along any suitable profile between edge 1430 and edge 1431, without limitation. According to some embodiments, boundary region 1435 may comprise an angular profile, as illustrated in FIG. 26A. In additional embodiments, boundary region 1435 may comprise an arcuate profile, as illustrated in FIG. 26B. A thickness or depth of second volume 1434, as measured perpendicular to a surface of superabrasive chamfer 1424, may be maximum generally near the center of superabrasive chamfer 1424.

Figure 27A:
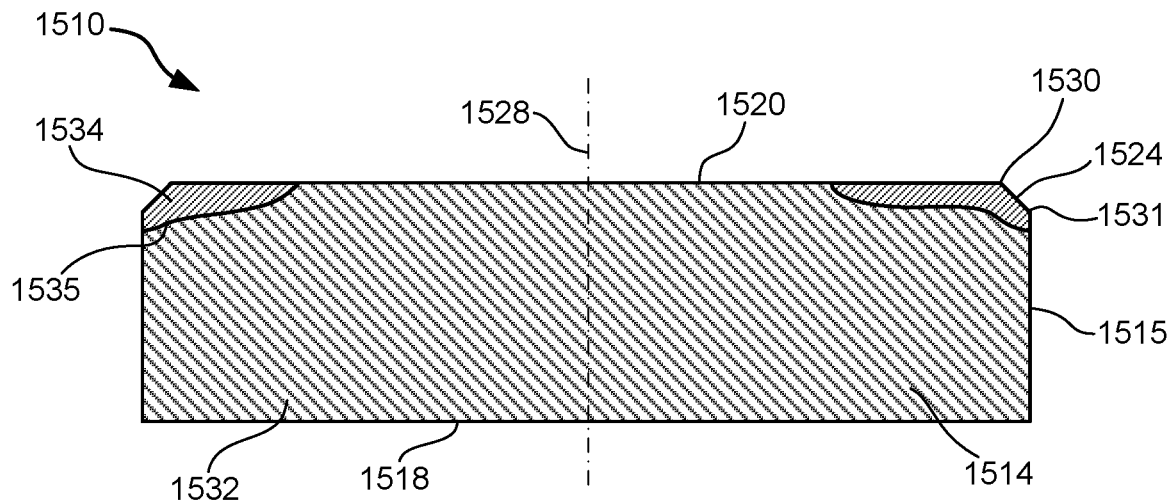
FIG. 27A is a cross-sectional side view of an exemplary superabrasive element according to at least one embodiment.
Figure 27B:
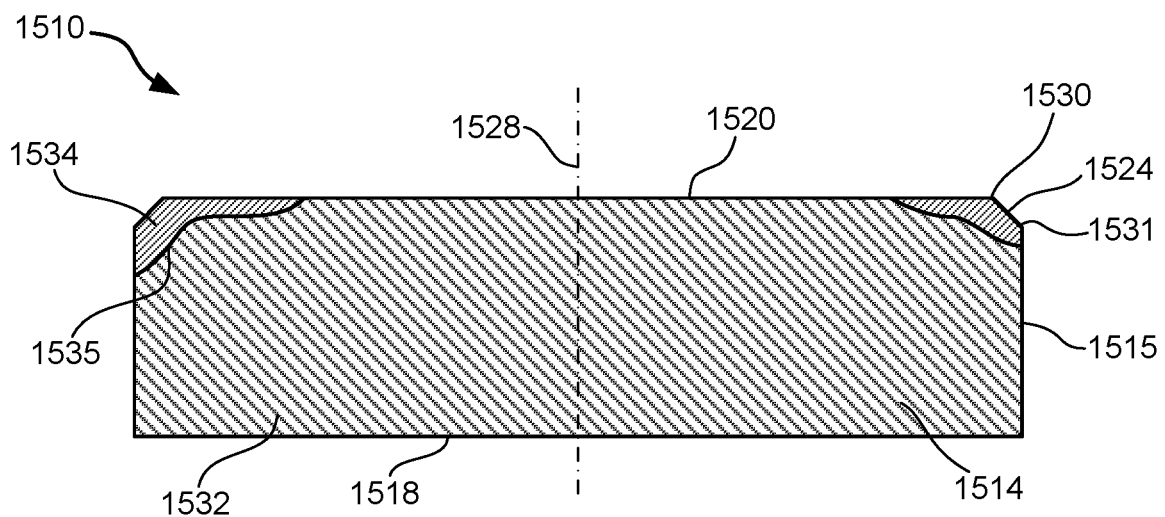
FIG. 27B is a cross-sectional side view of an exemplary superabrasive element according to at least one embodiment.

FIGS. 27A and 27B illustrate exemplary superabrasive elements 1510 having leached volumes formed adjacent to chamfered portions of the superabrasive elements 1510. Superabrasive element 1510 may include a substrate 1512 and a superabrasive table 1514 forming a rear surface 1518, a superabrasive face 1520, and a peripheral surface 1515. Superabrasive table 1514 may also form a chamfer 1524 and one or more cutting edges, such as edge 1530 and edge 1531, adjacent to chamfer 1524.

Superabrasive table 1514 may include a first volume 1532 comprising an interstitial material and a second volume 1534 having a lower concentration of the interstitial material than first volume 1532. Portions of superabrasive table 1514, such as second volume 1534 may be leached or otherwise processed to remove interstitial materials, such as a metal-solvent catalyst, from the interstitial regions. Second volume 1534 may be created during leaching of superabrasive table 1514 according to any suitable leaching technique. For example, portions of superabrasive element 1510 may be masked and/or otherwise covered during at least part of a leaching process to prevent a leaching solution from contacting selected portions of superabrasive element 1510 (see, e.g., FIGS. 15A-18). In some embodiments, superabrasive element 1510 may first be leached, after which portions of superabrasive element 1510 may be removed to modify the shape of first volume 1532 and/or second volume 1534 according to one or more methods discussed herein (see, e.g., FIGS. 7-14B).

A boundary region 1535 may extend between first volume 1532 and second volume 1534. Boundary region 1535 may include amounts of metal-solvent catalyst varying between an amount of metal-solvent catalyst in first volume 1532 and an amount of metal-solvent catalyst in second volume 1534. As illustrated in FIGS. 27A and 27B, first volume 1532 may be located adjacent to a central portion of superabrasive face 1520. For example, first volume 1532 may be disposed about central axis 1528. First volume 1532 may extend between rear surface 1518 and superabrasive face 1520, with first volume 1532 forming substantially all of superabrasive face 1520 such that a central portion of superabrasive face 1520 located about central axis 1528 is defined by first volume 1532. Additionally, first volume 1532 may form substantially all of peripheral surface 1515.

Second volume 1534 may be formed adjacent to superabrasive chamfer 1524 so as to surround at least a portion of first volume 1532. For example, second volume 1534 may be generally formed in an annular shape surrounding at least a portion of first volume 1532. First volume 1532, second volume 1534, and boundary region 1535 may be formed to any suitable size and/or shape within superabrasive table 1514, without limitation. For example, boundary region 1535 may extend along a generally straight, angular, curved, and/or variable (e.g., zigzag, undulating) profile between first volume 1532 and second volume 1534.

As shown in FIGS. 27A and 27B, second volume 1534 may be formed adjacent to superabrasive chamfer 1524 and boundary region 1535 may extend from superabrasive face 1520 to peripheral surface 1515. Boundary region 1535 may extend along any suitable profile between superabrasive face 1520 and peripheral surface 1515, without limitation. Boundary region 1535 may comprise, for example, a profile that generally slopes between superabrasive face 1520 and peripheral surface 1515. For example, boundary region 1535 may extend from a region of peripheral surface 1515 near edge 1531 to a region of superabrasive face 1520 disposed apart from edge 1530. According to some embodiments, as shown in FIGS. 27A and 27B, the generally annular-shaped second volume 1534 may comprise a generally ring-shaped volume that is not perfectly symmetric but is irregular in one or more dimensions. For example, second volume 1534 may vary in leach depth and/or profile shape, as defined by boundary region 1535, at different peripheral regions about central axis 1528.

FIGS. 28-31 illustrate exemplary superabrasive elements 1610 during and following drilling of a formation 1674. Superabrasive elements 1610 used as cutting elements may be oriented on a drill bit so as to prevent spalling and/or other wear or damage to the superabrasive elements 1610. For example, a superabrasive element 1610 having a first volume 1632 comprising an interstitial material and a second volume 1634 having a lower concentration of the interstitial material than first volume 1632, may be mounted on a drill bit such that the orientation of superabrasive element 1610 relative to formation 1674 results in a desired wear pattern during drilling. Such a wear pattern may result in reduced spalling and/or increased superabrasive element life.

Figure 28:
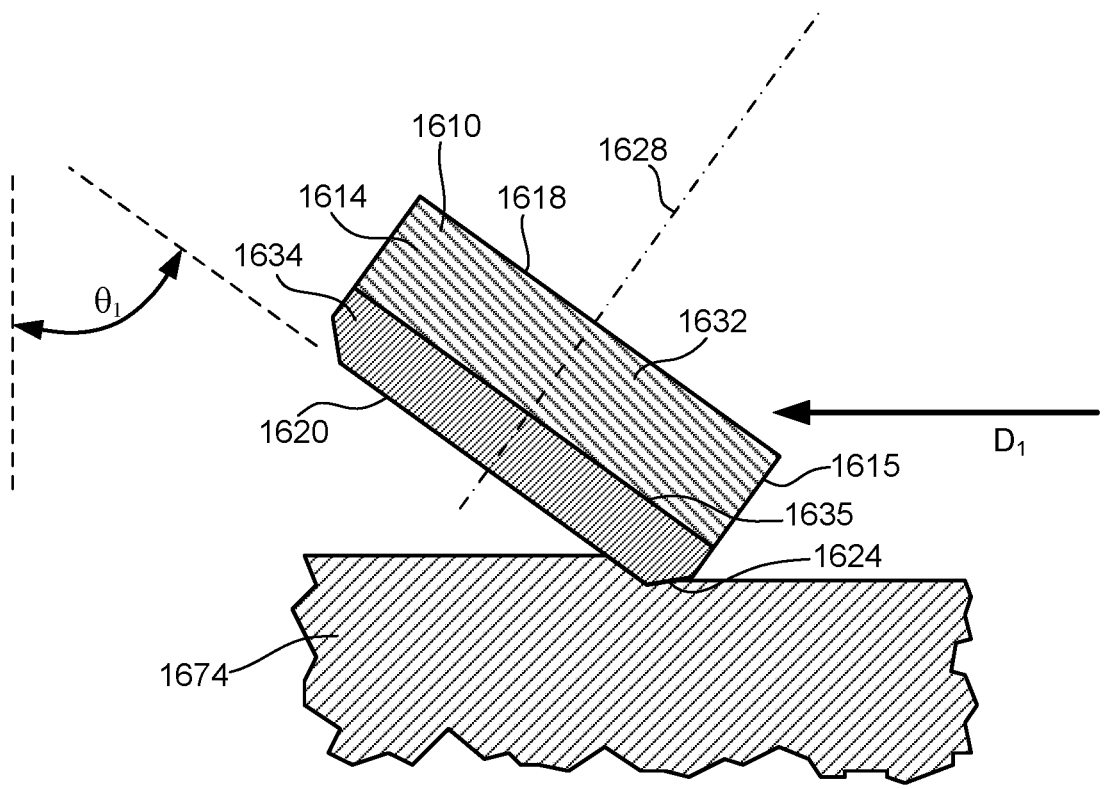
FIG. 28 is a cross-sectional side view of an exemplary superabrasive element contacting a formation during drilling according to at least one embodiment.

As illustrated in FIG. 28, a superabrasive element 1610 used as a cutting element may be mounted to a drill bit (e.g., drill bit 80 illustrated in FIG. 32) at a back rake angle $\theta_1$ (i.e., the angle between superabrasive face 1620 and a line perpendicular to formation 1674). With superabrasive element 1610 mounted at back rake angle $\theta_1$, a portion of superabrasive face 1620 and superabrasive chamfer 1624 may contact and cut through a layer of formation 1674, such as a subterranean formation, during a drilling operation. Over time, as superabrasive element 1610 is used for drilling formations, at least a portion of superabrasive element 1610 may become worn through use.

Figure 29:
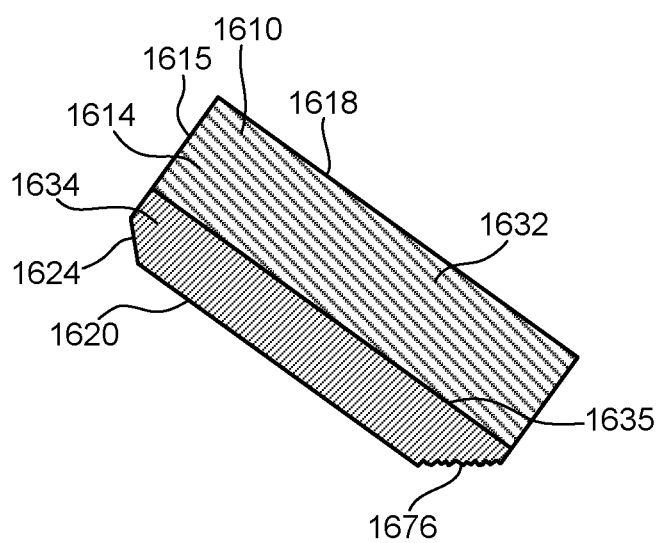
FIG. 29 is a cross-sectional side view of an exemplary superabrasive element according to at least one embodiment.

FIG. 29 shows superabrasive element 1610 following a period of use drilling through materials, such as formation 1674 illustrated in FIG. 28. Following extended amounts of drilling, a portion of superabrasive element 1610 may become worn down through direct contact with formation 1674, thereby forming a wear scar 1676 on superabrasive element 1610. Even after drilling for a significant period of time, wear scar 1676 may not intersect with boundary region 1635 or first volume 1632. Mounting superabrasive element 1610 at back rake angle $\theta_1$ may extend the usable life of superabrasive element 1610 and/or may prevent spalling of superabrasive element 1610 by delaying or altogether preventing wear scar 1676 from intersecting boundary region 1635 during the usable life of a drill bit comprising superabrasive element 1610.

Figure 30:
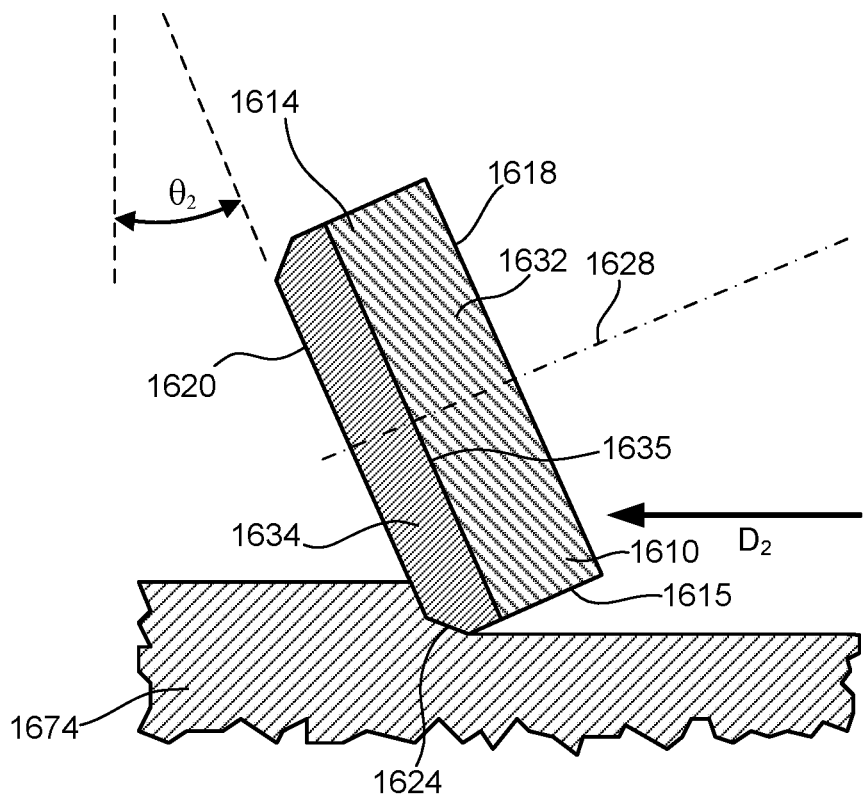
FIG. 30 is a cross-sectional side view of an exemplary superabrasive element contacting a formation during drilling according to at least one embodiment.
Figure 31:
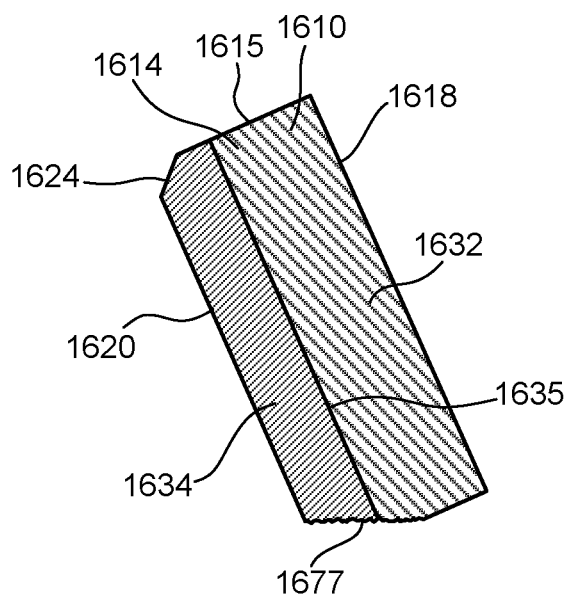
FIG. 31 is a cross-sectional side view of an exemplary superabrasive element according to at least one embodiment.

In comparison, as illustrated in FIGS. 30 and 31, a superabrasive element 1610 may be mounted to a drill bit at a back rake angle $\theta_2$ (i.e., the angle between superabrasive face 1620 and a line perpendicular to formation 1674). Back rake angle $\theta_2$ is smaller than back rake angle $\theta_1$ illustrated in FIGS. 28 and 29. As shown in FIG. 31, a portion of superabrasive element 1610 may become worn down through direct contact with formation 1674 to form a wear scar 1677 on superabrasive element 1610. In comparison to wear scar 1676 illustrated in FIG. 29, wear scar 1677 illustrated in FIG. 31 may intersect with boundary region 1635 and first volume 1632 following an equivalent amount of drilling under the same conditions and for the same period of time as superabrasive element 1610 shown in FIG. 29. The intersection of wear scar 1677 with boundary region 1635 and first volume 1632, as illustrated in FIG. 31, may lead to increased spalling and/or other undesirable wear in comparison with the configuration and orientation of superabrasive element 1610 illustrated in FIGS. 28 and 29. Accordingly, mounting superabrasive element 1610 to a drill bit at a back rake angle $\theta_1$ that is larger than back rake $\theta_2$ may result in reduced spalling and/or other wear and increased usable life of superabrasive element 1610.

Figure 32:
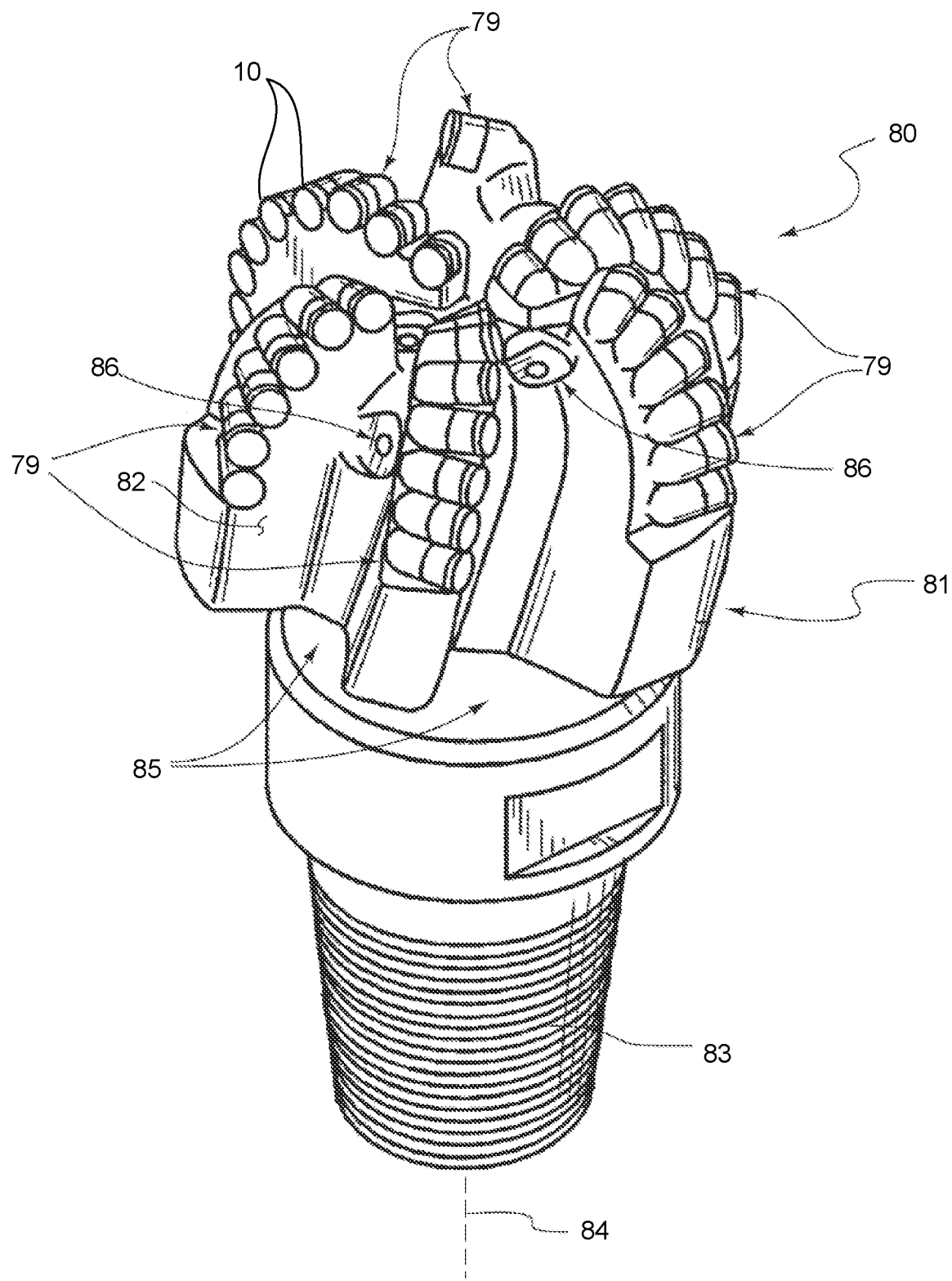
FIG. 32 is a perspective view of an exemplary drill bit according to at least one embodiment.

FIG. 32 is a perspective view of an exemplary drill bit 80 according to at least one embodiment. Drill bit 80 may represent any type or form of earth-boring or drilling tool, including, for example, a rotary drill bit. As illustrated in FIG. 32, drill bit 80 may comprise a bit body 81 having a longitudinal axis 84. Bit body 81 may define a leading end structure for drilling into a subterranean formation by rotating bit body 81 about longitudinal axis 84 and applying weight to bit body 81. Bit body 81 may include radially and longitudinally extending blades 79 with leading faces 82 and a threaded pin connection 83 for connecting bit body 81 to a drill string.

At least one superabrasive element 10 and/or at least one superabrasive element 310 may be coupled to bit body 81. For example, as shown in FIG. 32, a plurality of superabrasive elements 10 may be coupled to blades 79. Drill bit 80 may utilize any of the disclosed superabrasive elements 10 as cutting elements. Circumferentially adjacent blades 79 may define so-called junk slots 85 therebetween. Junk slots 85 may be configured to channel debris, such as rock or formation cuttings, away from superabrasive elements 10 during drilling. Drill bit 80 may also include a plurality of nozzle cavities 86 for communicating drilling fluid from the interior of drill bit 80 to superabrasive elements 10.

FIG. 32 depicts an example of a drill bit 80 that employs at least one cutting element 10. Drill bit 80 may additionally represent any number of earth-boring tools or drilling tools, including, for example, core bits, roller-cone bits, fixed-cutter bits, eccentric bits, bicenter bits, reamers, reamer wings, and/or any other downhole tools comprising superabrasive cutting elements and/or discs, without limitation. Superabrasive elements 10 disclosed herein may also be utilized in applications other than cutting technology. For example, embodiments of superabrasive elements 10 disclosed herein may also form all or part of heat sinks, wire dies, bearing elements, cutting elements, cutting inserts (e.g., on a roller cone type drill bit), machining inserts, or any other article of manufacture, as known in the art. According to some examples, superabrasive elements 10, as disclosed herein, may be employed in medical device applications, including, without limitation, hip joints, back joints, or any other suitable medical joints. Thus, superabrasive elements 10, as disclosed herein, may be employed in any suitable article of manufacture. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. By way of example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements 10 as disclosed herein.

Figure 33:
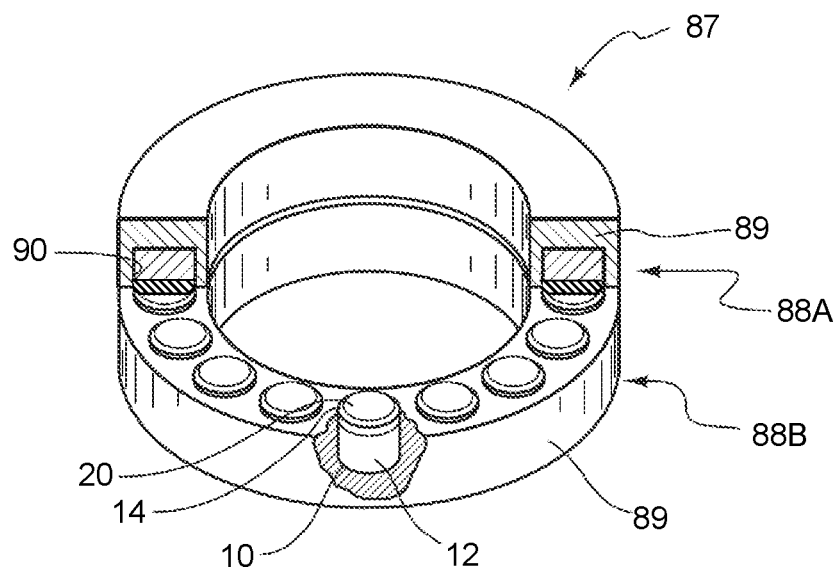
FIG. 33 is a partial cut-away perspective view of an exemplary thrust bearing apparatus according to at least one embodiment.

FIG. 33 is partial cross-sectional perspective view of an exemplary thrust-bearing apparatus 87 according to at least one embodiment. Thrust-bearing apparatus 87 may utilize any of the disclosed superabrasive elements 10 and/or superabrasive elements 310 as bearing elements. Thrust-bearing apparatus 87 may also include bearing assemblies 88A and 88B. Each of bearing assembly 88A and 88B may include a support ring 89 fabricated from a material, such as steel, stainless steel, or any other suitable material, without limitation.

Each support ring 89 may include a plurality of recesses 90 configured to receive corresponding superabrasive elements 10. Each superabrasive element 10 may be mounted to a corresponding support ring 89 within a corresponding recess 90 by brazing, welding, press-fitting, using fasteners, or any another suitable mounting technique, without limitation. In at least one embodiment, one or more of superabrasive elements 10 may be configured according to any of the superabrasive element embodiments described herein. For example, each superabrasive element 10 may include a substrate 12 and a superabrasive table 14 comprising a PCD material. Each superabrasive table 14 may form a superabrasive face 20 that is utilized as a bearing surface.

Superabrasive faces 20 of bearing assembly 88A may bear against opposing superabrasive faces 20 of bearing assembly 88B in thrust-bearing apparatus 87, as illustrated in FIG. 33. For example, bearing assembly 88A of thrust-bearing apparatus 87 may be termed a "rotor." The rotor may be operably coupled to a rotational shaft. Bearing assembly 88B of thrust-bearing apparatus 87 may be held substantially stationary relative to the bearing assembly 88A and may be termed a "stator."

Figure 34:
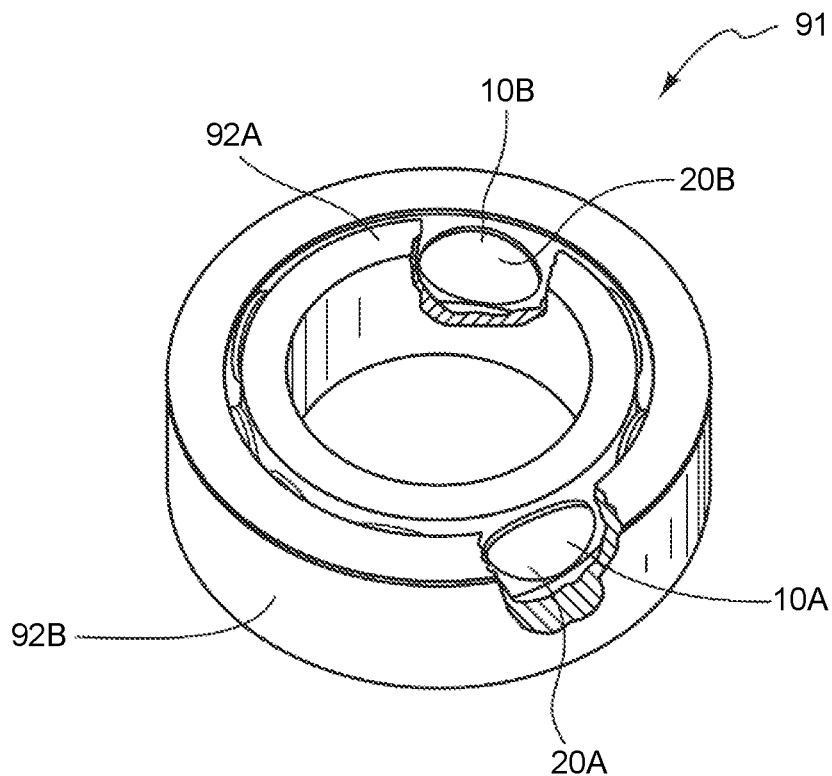
FIG. 34 is a partial cut-away perspective view of an exemplary radial bearing apparatus according to at least one embodiment.

FIG. 34 is a perspective view of a radial bearing apparatus 91 according to another embodiment. Radial bearing apparatus 91 may utilize any of the disclosed superabrasive element embodiments as bearing elements 10A and 10B. Radial bearing apparatus 91 may include an inner race 92A positioned generally within an outer race 92B. Inner race 92A may include a plurality of bearing elements 10A affixed thereto, and outer race 92B may include a plurality of corresponding bearing elements 10B affixed thereto. One or more of bearing elements 10A and 10B may be configured in accordance with any of the superabrasive element embodiments disclosed herein.

Inner race 92A may be positioned generally within outer race 92B. Thus, inner race 92A and outer race 92B may be configured such that bearing surfaces 20A defined by bearing elements 10A and bearing surfaces 20B defined by bearing elements 10B may at least partially contact one another and move relative to one another as inner race 92A and outer race 92B rotate relative to each other. According to various embodiments, thrust-bearing apparatus 87 and/or radial bearing apparatus 91 may be incorporated into a subterranean drilling system.

Figure 35:
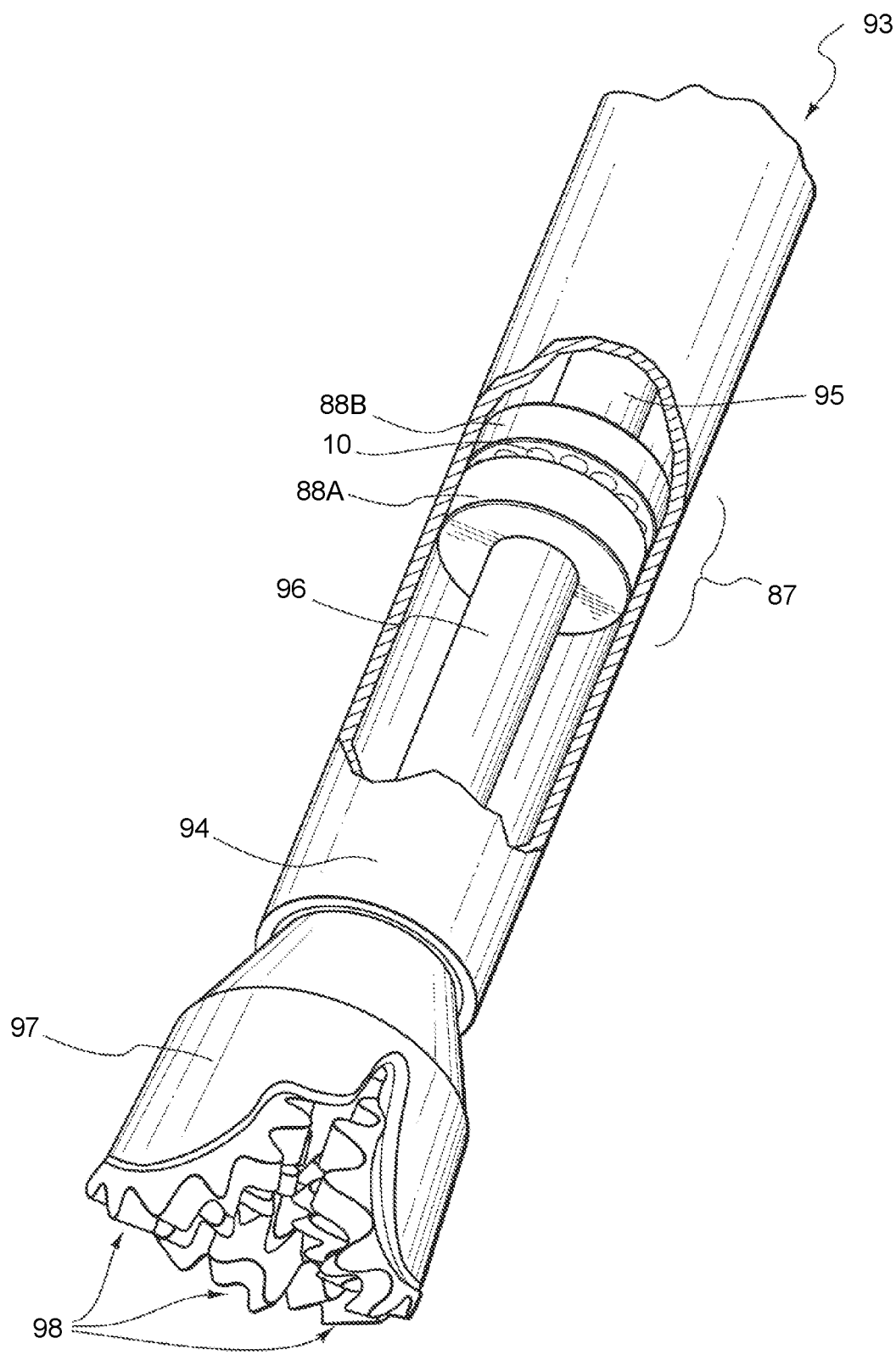
FIG. 35 is a partial cut-away perspective view of an exemplary subterranean drilling system according to at least one embodiment.

FIG. 35 is a partial cross-sectional perspective view of an exemplary subterranean drilling system 93 that includes a thrust-bearing apparatus 87, as shown in FIG. 33, according to at least one embodiment. The subterranean drilling system 93 may include a housing 94 enclosing a downhole drilling motor 95 (i.e., a motor, turbine, or any other suitable device capable of rotating an output shaft, without limitation) that is operably connected to an output shaft 96.

The thrust-bearing apparatus 87 shown in FIG. 33 may be operably coupled to downhole drilling motor 95. A rotary drill bit 97, such as a rotary drill bit configured to engage a subterranean formation and drill a borehole, may be connected to output shaft 96. As illustrated in FIG. 35, rotary drill bit 97 may be a roller cone bit comprising a plurality of roller cones 98. According to additional embodiments, rotary drill bit 97 may comprise any suitable type of rotary drill bit, such as, for example, a so-called fixed-cutter drill bit. As a borehole is drilled using rotary drill bit 97, pipe sections may be connected to subterranean drilling system 93 to form a drill string capable of progressively drilling the borehole to a greater depth within a subterranean formation.

A thrust-bearing assembly 88A in thrust-bearing apparatus 87 may be configured as a rotor that is attached to output shaft 96 and a thrust-bearing assembly 88B in thrust-bearing apparatus 87 may be configured as a stator. During a drilling operation using subterranean drilling system 93, the rotor may rotate in conjunction with output shaft 96 and the stator may remain substantially stationary relative to the rotor.

According to various embodiments, drilling fluid may be circulated through downhole drilling motor 95 to generate torque and effect rotation of output shaft 96 and rotary drill bit 97 attached thereto so that a borehole may be drilled. A portion of the drilling fluid may also be used to lubricate opposing bearing surfaces of superabrasive elements 10 on thrust-bearing assemblies 88A and 88B.

Figure 36:
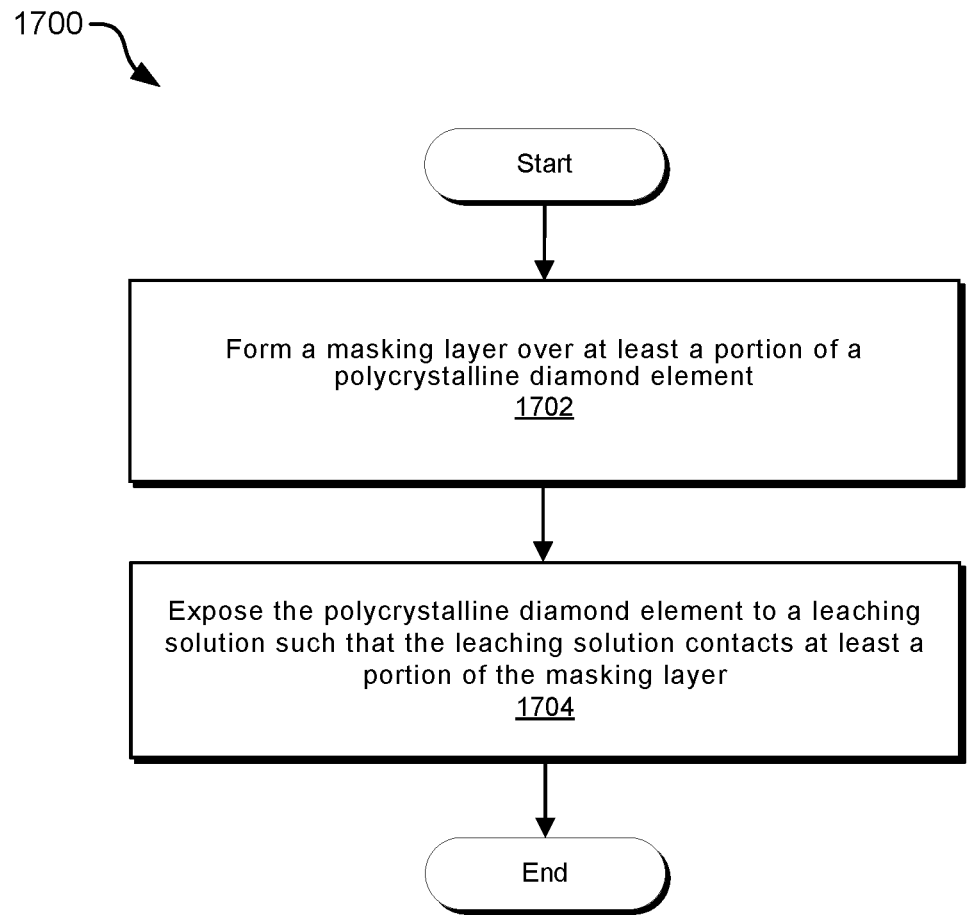
FIG. 36 is a flow diagram of an exemplary method of processing a polycrystalline diamond element according to at least one embodiment.

FIG. 36 illustrates an exemplary method 1700 for processing a polycrystalline diamond element according to at least one embodiment. As shown in FIG. 36, a masking layer may be formed over at least a portion of a polycrystalline diamond element (process 1702). In some embodiments, for example, a first masking layer 752 and/or a second masking layer 754 may be formed on at least a portion of a superabrasive element 10, as illustrated in FIGS. 15A-16. Superabrasive element 10 may comprise an element face (i.e., superabrasive face 20) and a peripheral surface 15 extending around an outer periphery of superabrasive face 20. According to some embodiments, the masking layer may be formed over at least a central portion of superabrasive face 20.

In at least one embodiment, the masking layer may include a first masking portion and second masking portion formed over a separate portion of the polycrystalline diamond element than the first masking portion. For example, as illustrated in FIG. 17, first and second degrading masking layers 856 and 858 may be formed over separate portions of superabrasive element 10 than first protective masking layer 852 and second protective masking layer 854.

The polycrystalline diamond element may be exposed to a leaching solution such that the leaching solution contacts at least a portion of the masking layer (process 1704). For example, superabrasive element 10 and first masking layer 752 and/or a second masking layer 754, as shown in FIGS. 15A-16, may be exposed to a leaching solution in any suitable manner. According to various embodiments, superabrasive element 10 and first masking layer 752 and/or a second masking layer 754 may be at least partially submerged in a leaching agent that is suitable for leaching interstitial materials from exposed portions of superabrasive table 14. In at least one embodiment, a corrosive leaching agent may be used to remove a metal-solvent catalyst from interstitial spaces between diamond grains in superabrasive table 14 of element 10.

Figure 37:
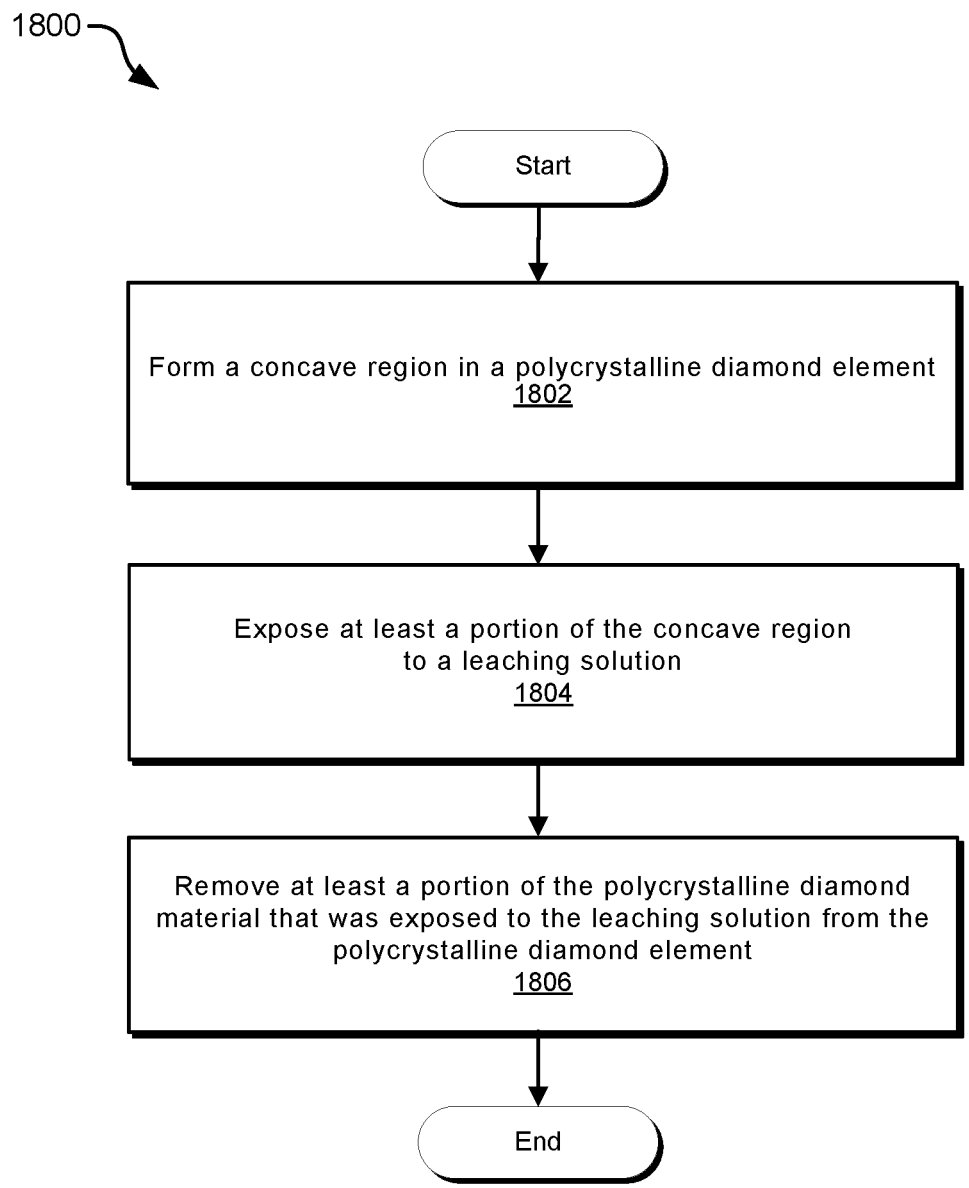
FIG. 37 is a flow diagram of an exemplary method of processing a polycrystalline diamond element according to at least one embodiment.

FIG. 37 illustrates an exemplary method 1800 for processing a polycrystalline diamond element according to at least one embodiment. As shown in FIG. 37, a concave region may be formed in a polycrystalline diamond element (process 1802). For example, a peripheral recess 442 may be formed in a polycrystalline diamond element 410 at an intersection of peripheral surface 415 and superabrasive face 420, as shown in FIGS. 7-9.

At least a portion of the concave region may be exposed to a leaching solution (process 1804). For example, a region of superabrasive element 410 that includes peripheral recess 442, as shown in FIGS. 7-9, may be exposed to a corrosive leaching agent to remove a metal-solvent catalyst from interstitial spaces between diamond grains in superabrasive table 414 of element 410.

At least a portion of the polycrystalline diamond material that was exposed to the leaching solution may be removed from the polycrystalline diamond element (process 1806). For example, superabrasive element 410 may be smoothed and/or polished using any suitable mechanical, chemical, electrical, and/or laser processing technique to remove portions of exterior polycrystalline diamond material, as illustrated in FIGS. 10 and 11.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of processing a polycrystalline diamond element, comprising:
    laser ablating at least a portion of a polycrystalline diamond element to form a laser-shaped nonplanar surface;
    exposing at least a portion of the laser-shaped nonplanar surface to a leaching solution to define a leached volume of the polycrystalline diamond element and an unleached polycrystalline of the polycrystalline diamond element; and
    removing at least a portion of the leached volume of the polycrystalline diamond element from the polycrystalline diamond element.

2. The method of claim 1, wherein laser ablating the at least a portion of the polycrystalline diamond element comprises removing a portion of a peripheral rim extending from a cutting face of the polycrystalline diamond element.

3. The method of claim 1, wherein laser ablating the at least a portion of the polycrystalline diamond element comprises defining a peripheral recess in the polycrystalline diamond element.

4. The method of claim 1, further comprising shaping the laser-shaped nonplanar surface to define a central recess in a cutting face of the polycrystalline diamond element.

5. The method of claim 1, further comprising, prior to the laser ablating, sintering a diamond particle volume to form the polycrystalline diamond element.

6. The method of claim 5, further comprising defining a central recess in a cutting face of the polycrystalline diamond element during the sintering of the diamond particle volume.

7. The method of claim 5, further comprising defining a peripheral rim extending from a cutting face of the polycrystalline diamond element during the sintering of the diamond particle volume.

8. The method of claim 7, further comprising leaving a portion of the peripheral rim after laser ablating the at least a portion of the polycrystalline diamond element.

9. The method of claim 1, wherein laser ablating the at least a portion of the polycrystalline diamond element comprises removing material from at least a region adjacent to a peripheral surface of the polycrystalline diamond element.

10. The method of claim 1, wherein removing the at least a portion of the leached volume comprises grinding at least a portion of the leached volume.

11. A method of processing a superabrasive element, comprising:
    sintering a diamond particle volume to form a superabrasive element;
    laser ablating at least a portion of the superabrasive element to form a laser-shaped surface having an at least partially nonplanar section;
    exposing at least a portion of the laser-shaped surface to a leaching solution to define a leached volume of the superabrasive element; and
    removing at least a portion of the leached volume of the superabrasive element from the superabrasive element.

12. The method of claim 11, further comprising defining a recess in the superabrasive element at a peripheral rim of the superabrasive element.

13. The method of claim 11, wherein removing the at least a portion of the leached volume comprises grinding at least a portion of the leached volume.

14. The method of claim 11, further comprising forming a peripheral rim extending from a face of the superabrasive element during the sintering of the diamond particle volume.

15. The method of claim 14, further comprising removing a portion of the peripheral rim extending from the face of the superabrasive element during the laser ablating of the at least a portion of the superabrasive element.

16. The method of claim 11, further comprising forming at least a portion of a peripheral rim extending from a face of the superabrasive element during the laser ablating of the superabrasive element.

17. The method of claim 11, further comprising forming a central recess in a face of the superabrasive element during at least one of the sintering of the diamond particle volume or the laser ablating of the superabrasive element.

18. A method of processing a polycrystalline diamond element, comprising:
   sintering a diamond particle volume to form a polycrystalline diamond element;
   forming a peripheral rim extending from a face of the polycrystalline diamond element during the sintering of the diamond particle volume;
   laser ablating at least a portion of the polycrystalline diamond element to form a laser-shaped surface;
   exposing at least a portion of the laser-shaped surface to a leaching solution to define a leached volume of the polycrystalline diamond element and an unleached volume of the polycrystalline diamond element; and
   defining a recess in the polycrystalline diamond element by removing at least a portion of the leached volume of the polycrystalline diamond element from the polycrystalline diamond element.

19. The method of claim 18, further comprising defining the recess in the polycrystalline diamond element in the peripheral rim.

20. The method of claim 18, further comprising removing a portion of the peripheral rim extending from the face of the polycrystalline diamond element during the laser ablating of the at least a portion of the polycrystalline diamond element.

* * * * *